(12) United States Patent
Hirata

(10) Patent No.: US 12,313,939 B2
(45) Date of Patent: May 27, 2025

(54) LIQUID CRYSTAL DISPLAY APPARATUS

(71) Applicant: SAKAI DISPLAY PRODUCTS CORPORATION, Sakai (JP)

(72) Inventor: Mitsuaki Hirata, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 18/594,517

(22) Filed: Mar. 4, 2024

(65) Prior Publication Data

US 2024/0353715 A1 Oct. 24, 2024

(30) Foreign Application Priority Data

Apr. 20, 2023 (JP) .................................. 2023-069061

(51) Int. Cl.
*G02F 1/1343* (2006.01)
*G02F 1/1337* (2006.01)

(52) U.S. Cl.
CPC .. *G02F 1/133742* (2021.01); *G02F 1/134309* (2013.01)

(58) Field of Classification Search
CPC ......... G02F 1/134309; G02F 1/133742; G02F 1/134345; G02F 1/133707; G02F 1/133757; G02F 1/1393; G02F 1/139
See application file for complete search history.

(56) References Cited

U.S. PATENT DOCUMENTS

| | | | |
|---|---|---|---|
| 11,181,781 B2 | 11/2021 | Hirata et al. | |
| 11,347,115 B2 | 5/2022 | Hirata et al. | |
| 2009/0284703 A1* | 11/2009 | Shoraku | G02F 1/1337 349/129 |
| 2012/0002144 A1* | 1/2012 | Shoraku | G02F 1/133753 349/110 |
| 2015/0036073 A1* | 2/2015 | Im | G02F 1/134336 349/110 |
| 2016/0246135 A1* | 8/2016 | Tae | G02F 1/133707 |

(Continued)

FOREIGN PATENT DOCUMENTS

| | | |
|---|---|---|
| CN | 102183859 A | 9/2011 |
| JP | 2015-031961 A | 2/2015 |

(Continued)

*Primary Examiner* — Mariam Qureshi
(74) *Attorney, Agent, or Firm* — ScienBiziP, P.C.

(57) ABSTRACT

Each pixel includes first through fourth liquid crystal domains. The first through fourth liquid crystal domains are arranged in this order along the pixel longitudinal direction. The reference alignment direction of the second liquid crystal domain and the reference alignment direction of the third liquid crystal domain are respectively essentially the 135° direction and essentially the 315° direction, or respectively essentially the 45° direction and essentially the 225° direction. The pixel electrode includes a first through fourth slitted regions corresponding to the first through fourth liquid crystal domains, and a boundary region located between the second and third slitted regions. The boundary region includes n boundary slits (where n≥3) extending essentially in parallel to the pixel transverse direction; (n-1) first bridging portions each located between two adjacent boundary slits; and (n-2) dent patterns each located between two adjacent first bridging portions.

16 Claims, 42 Drawing Sheets

(56) References Cited

U.S. PATENT DOCUMENTS

| | | | |
|---|---|---|---|
| 2020/0064696 A1 | 2/2020 | Watanabe et al. | |
| 2020/0379303 A1* | 12/2020 | Hirata | G02F 1/133788 |
| 2021/0318580 A1* | 10/2021 | Hirata | G02F 1/133742 |
| 2021/0389617 A1* | 12/2021 | Hirata | G02F 1/1337 |
| 2022/0252946 A1* | 8/2022 | Hirata | G02F 1/134345 |
| 2022/0326575 A1* | 10/2022 | Hirata | G02F 1/136218 |
| 2022/0382110 A1* | 12/2022 | Wang | H01L 27/1259 |

FOREIGN PATENT DOCUMENTS

| | | |
|---|---|---|
| WO | 2006/132369 A1 | 12/2006 |
| WO | 2020/044557 A1 | 3/2020 |

* cited by examiner

LIQUID CRYSTAL DISPLAY APPARATUS

BACKGROUND

1. Technical Field

The present invention relates to liquid crystal display apparatuses, and more particularly to a liquid crystal display apparatus including a liquid crystal layer of vertical alignment type, such that pretilt directions of liquid crystal molecules are defined by alignment films.

2. Description of the Related Art

A technique for improving the viewing angle characteristics of a liquid crystal display apparatus of VA (Vertical Alignment) mode is based on an alignment division structure in which a plurality of liquid crystal domains are created within a single pixel. As an approach to forming the alignment division structure, a 4D-RTN (Reverse Twisted Nematic) mode has been proposed in the recent years.

Under the 4D-RTN mode, pretilt directions of liquid crystal molecules are defined by alignment films, whereby an alignment division structure is formed. A liquid crystal display apparatus of 4D-RTN mode is disclosed in International Publication No. 2006/132369 (hereinafter "Patent Document 1"), for example. In the liquid crystal display apparatus disclosed in Patent Document 1, a four-split alignment structure is formed by using alignment films to define pretilt directions. That is, when a voltage is applied across the liquid crystal layer, four liquid crystal domains are created within one pixel. A four-split alignment structure as such may simply be referred to as a 4D structure.

Moreover, in the liquid crystal display apparatus of Patent Document 1, regarding a pair of alignment films opposing each other via a liquid crystal layer interposed therebetween, there is a difference of essentially 90° between the pretilt direction that is defined by one alignment film and the pretilt direction defined by the other alignment film. Therefore, under an applied voltage, the liquid crystal molecules take a twist alignment. As will be understood from the disclosure of Patent Document 1, under the 4D-RTN mode, typically, the four liquid crystal domains are arranged in two rows and two columns within the pixel.

International Publication No. 2020/044557 (hereinafter "Patent Document 2") also discloses a VA mode liquid crystal display apparatus in which an alignment division structure is formed by using alignment films to define pretilt directions. In the liquid crystal display apparatus disclosed in Patent Document 2, the pretilt direction that is defined by one of a pair of alignment films and the pretilt direction that is defined by the other alignment film are antiparallel. Therefore, under an applied voltage, liquid crystal molecules do not take a twist alignment. The display mode that is disclosed in Patent Document 2 is referred to as a 4D-ECB (Electrically Controlled Birefringence) mode.

In the liquid crystal display apparatus of Patent Document 2, the four liquid crystal domains within a pixel are arranged in four rows and one column. FIG. 34 shows a domain arrangement that is disclosed in Patent Document 2. A pixel 900P shown in FIG. 34 includes four liquid crystal domains A, B, C and D. FIG. 34 schematically depicts a director (reference alignment direction) of each liquid crystal domain in a pin shape. Assuming that the display surface is the face of a clock, the 3 o'clock direction being an azimuth angle of 0°, and the counterclockwise direction being positive, the directors of the liquid crystal domains A, B, C and D are the 315° direction, the 45° direction, the 225° direction, and the 135° direction, respectively.

Within the pixel 900P, the liquid crystal domains A, B, C and D are arranged in this order from above to below (i.e., along the longitudinal direction of the pixel). Between the liquid crystal domain A and the liquid crystal domain B, the azimuth of the director differs by 90°. Between the liquid crystal domain B and the liquid crystal domain C, the azimuth of the director differs by 180°. Between the liquid crystal domain C and the liquid crystal domain D, the azimuth of the director differs by 90°.

FIG. 35 shows a pixel electrode 911 that is disclosed in Patent Document 2. The pixel electrode 911 includes a first pixel electrode portion 911P1 corresponding to the liquid crystal domains A and B and a second pixel electrode portion 911P2 corresponding to the liquid crystal domains C and D.

The first pixel electrode portion 911P1 includes a first slitted region 911R1, which is a region corresponding to the liquid crystal domain A, and a second slitted region 911R2, which is a region corresponding to the liquid crystal domain B. In the first slitted region 911R1, a plurality of slits 911s1 extending in parallel to the director of the liquid crystal domain A are formed. In the second slitted region 911R2, a plurality of slits 911s2 extending in parallel to the director of the liquid crystal domain B are formed.

The second pixel electrode portion 911P2 includes a third slitted region 911R3, which is a region corresponding to the liquid crystal domain C, and a fourth slitted region 911R4, which is a region corresponding to the liquid crystal domain D. In the third slitted region 911R3, a plurality of slits 911s3 extending in parallel to the director of the liquid crystal domain C are formed. In the fourth slitted region 911R4, a plurality of slits 911s4 extending in parallel to the director of the liquid crystal domain D are formed.

Because the slits 911s1, 911s2, 911s3 and 911s4 as aforementioned are formed in the pixel electrode 911, dark lines occurring within the pixel 900P are reduced in width, whereby transmittance can be improved.

The pixel electrode 911 further includes a bridging portion 911P3 and a pair of recesses 911u that are provided between the first pixel electrode portion 911P1 and the second pixel electrode portion 911P2. The bridging portion 911P3 is located in the middle portion of the pixel electrode 911 along the width direction (i.e., the transverse direction of the pixel 900P), and interconnects the first pixel electrode portion 911P1 and the second pixel electrode portion 911P2. The pair of recesses 911u are formed on opposite sides of the bridging portion 911P3.

When a voltage is applied across the liquid crystal layer and the four liquid crystal domains A, B, C and D as shown in FIG. 34 are created, double dark lines occur between the liquid crystal domain B and the liquid crystal domain C, i.e., between the first pixel electrode portion 911P1 and the second pixel electrode portion 911P2. In the liquid crystal display apparatus of Patent Document 2, the recesses 911u provided between the first pixel electrode portion 911P1 and the second pixel electrode portion 911P2 help the area of the double dark lines to be reduced. Moreover, a disclination (discontinuous point in liquid crystal alignment) of double dark lines will occur above the bridging portion 911P3 (i.e., positions of the disclinations will be fixed), thus resulting in a stable alignment.

SUMMARY

However, according to a detailed study by the inventor, adopting the electrode structure disclosed in Patent Document 2 may still allow new disclination(s) to occur on the recess 911u when the pixel size is relatively large and recesses 911u are long. Because new disclination(s) will vary in position, it may cause displaying problems such as afterimages. While it may be possible to shade the recesses 911u with a black matrix or the like, doing so will result in poorer transmittance.

The present invention has been made in view of the above problems, and an objective thereof is to suppress displaying problems associated with discontinuous points in liquid crystal alignment in a VA mode liquid crystal display apparatus in which an alignment division structure is formed by using alignment films to define pretilt directions.

The present specification discloses liquid crystal display apparatuses as recited in the following Items.

[Item 1]

A liquid crystal display apparatus comprising:
a first substrate and a second substrate opposing each other; and
a liquid crystal layer of vertical alignment type interposed between the first substrate and the second substrate,
the liquid crystal display apparatus having a plurality of pixels, wherein:
the first substrate includes a pixel electrode provided in each of the plurality of pixels, and a first alignment film provided between the pixel electrode and the liquid crystal layer;
the second substrate includes a counter electrode opposing the pixel electrode, and a second alignment film provided between the counter electrode and the liquid crystal layer;
each of the plurality of pixels includes a first liquid crystal domain, a second liquid crystal domain, a third liquid crystal domain, and a fourth liquid crystal domain, each liquid crystal domain having a reference alignment direction defined by the first alignment film and the second alignment film, and the first to fourth liquid crystal domains having respectively different reference alignment directions;
a longitudinal direction and a transverse direction of each of the plurality of pixels respectively define a pixel longitudinal direction and a pixel transverse direction of that pixel, and the reference alignment directions of the first liquid crystal domain, the second liquid crystal domain, the third liquid crystal domain, and the fourth liquid crystal domain respectively define a first direction, a second direction, a third direction, and a fourth direction;
the first direction, the second direction, the third direction, and the fourth direction each make an angle which is essentially equal to an odd multiple of 45° with respect to the pixel transverse direction of each pixel;
the first liquid crystal domain, the second liquid crystal domain, the third liquid crystal domain, and the fourth liquid crystal domain are arranged in this order along the pixel longitudinal direction of the pixel;
the second direction and the third direction are respectively essentially the 135° direction and essentially the 315° direction, or respectively essentially the 45° direction and essentially the 225° direction, wherein an azimuth angle of the pixel transverse direction defines 0°;
the pixel electrode includes
a first slitted region which is a region corresponding to the first liquid crystal domain, and in which a plurality of first slits extending essentially in parallel to the first direction are formed,
a second slitted region which is a region corresponding to the second liquid crystal domain, and in which a plurality of second slits extending essentially in parallel to the second direction are formed,
a third slitted region which is a region corresponding to the third liquid crystal domain, and in which a plurality of third slits extending essentially in parallel to the third direction are formed,
a fourth slitted region which is a region corresponding to the fourth liquid crystal domain, and in which a plurality of fourth slits extending essentially in parallel to the fourth direction are formed, and
a boundary region located between the second slitted region and the third slitted region; and
the boundary region includes
n boundary slits (where n is an integer equal to or greater than 3) each extending essentially in parallel to the pixel transverse direction, the n boundary slits being arranged along the pixel transverse direction,
(n-1) first bridging portions each being located between two adjacent boundary slits among the n boundary slits, the (n-1) first bridging portions interconnecting the second slitted region and the third slitted region, and
(n-2) dent patterns each being located between two adjacent first bridging portions among the (n-1) first bridging portions, and each including a first dent formed so as to be dented into the second slitted region from the boundary slit that is located between the two first bridging portions and a second dent formed so as to be dented into the third slitted region from the boundary slit that is located between the two first bridging portions.

[Item 2]

The liquid crystal display apparatus of Item 1, wherein a distance from each of the (n-2) dent patterns to each of two first bridging portions that are adjacent to the dent pattern is not less than 10 μm and not more than 30 μm.

[Item 3]

The liquid crystal display apparatus of Item 1 or 2, wherein a width of each of the (n-1) first bridging portions along the pixel transverse direction is not less than 2.5 μm and not more than 3.5 μm.

[Item 4]

The liquid crystal display apparatus of any of Items 1 to 3, wherein a length of each of the first dent and the second dent along the pixel longitudinal direction is 1.5 μm or more.

[Item 5]

The liquid crystal display apparatus of any of Items 1 to 4, wherein the boundary region further includes two second bridging portions being located at opposite ends of the pixel electrode along the pixel transverse direction and interconnecting the second slitted region and the third slitted region.

[Item 6]

The liquid crystal display apparatus of Item 5, wherein a width of each of the two second bridging portions along the pixel transverse direction is 6.0 μm or more.

[Item 7]

A liquid crystal display apparatus comprising:
a first substrate and a second substrate opposing each other; and
a liquid crystal layer of vertical alignment type interposed between the first substrate and the second substrate,
the liquid crystal display apparatus having a plurality of pixels, wherein:

the first substrate includes a pixel electrode provided in each of the plurality of pixels, and a first alignment film provided between the pixel electrode and the liquid crystal layer;

the second substrate includes a counter electrode opposing the pixel electrode, and a second alignment film provided between the counter electrode and the liquid crystal layer;

each of the plurality of pixels includes a first liquid crystal domain, a second liquid crystal domain, a third liquid crystal domain, and a fourth liquid crystal domain, each liquid crystal domain having a reference alignment direction defined by the first alignment film and the second alignment film, and the first to fourth liquid crystal domains having respectively different reference alignment directions;

a longitudinal direction and a transverse direction of each of the plurality of pixels respectively define a pixel longitudinal direction and a pixel transverse direction of that pixel, and the reference alignment directions of the first liquid crystal domain, the second liquid crystal domain, the third liquid crystal domain, and the fourth liquid crystal domain respectively define a first direction, a second direction, a third direction, and a fourth direction;

the first direction, the second direction, the third direction, and the fourth direction each make an angle which is essentially equal to an odd multiple of 45° with respect to the pixel transverse direction of each pixel;

the first liquid crystal domain, the second liquid crystal domain, the third liquid crystal domain, and the fourth liquid crystal domain are arranged in this order along the pixel longitudinal direction of the pixel;

the second direction and the third direction are respectively essentially the 135° direction and essentially the 315° direction, or respectively essentially the 45° direction and essentially the 225° direction, wherein an azimuth angle of the pixel transverse direction defines 0°;

the pixel electrode includes
 a first slitted region which is a region corresponding to the first liquid crystal domain, and in which a plurality of first slits extending essentially in parallel to the first direction are formed,
 a second slitted region which is a region corresponding to the second liquid crystal domain, and in which a plurality of second slits extending essentially in parallel to the second direction are formed,
 a third slitted region which is a region corresponding to the third liquid crystal domain, and in which a plurality of third slits extending essentially in parallel to the third direction are formed,
 a fourth slitted region which is a region corresponding to the fourth liquid crystal domain, and in which a plurality of fourth slits extending essentially in parallel to the fourth direction are formed, and
 a boundary region located between the second slitted region and the third slitted region;

the boundary region includes
 n boundary slits (where n is an integer equal to or greater than 3) each extending essentially in parallel to the pixel transverse direction, the n boundary slits being arranged along the pixel transverse direction, and
 (n-1) first bridging portions each being located between two adjacent boundary slits among the n boundary slits, the (n-1) first bridging portions interconnecting the second slitted region and the third slitted region; and a boundary slit that is located between two adjacent first bridging portions among the n boundary slits includes a first portion extending essentially in parallel to the pixel transverse direction, and a second portion extending essentially in parallel to the pixel transverse direction and being offset in position from the first portion along the pixel longitudinal direction.

[Item 8]
The liquid crystal display apparatus of Item 7, wherein,
 the second direction and the third direction are essentially the 45° direction and essentially the 225° direction, respectively;
 the second portion adjoins the first portion in essentially the 0° direction; and
 along the pixel longitudinal direction, the second portion is offset in position in the 90° direction from the first portion.

[Item 9]
The liquid crystal display apparatus of Item 7, wherein,
 the second direction and the third direction are essentially the 135° direction and essentially the 315° direction, respectively;
 the second portion adjoins the first portion in essentially the 0° direction; and
 along the pixel longitudinal direction, the second portion is offset in position in the 270° direction from the first portion.

[Item 10]
The liquid crystal display apparatus of any of Items 7 to 9, wherein a length of each of the first portion and the second portion along the pixel transverse direction is not less than 10 μm and not more than 30 μm.

[Item 11]
The liquid crystal display apparatus of any of Items 7 to 10, wherein a width of each of the (n-1) first bridging portions along the pixel transverse direction is not less than 2.5 μm and not more than 3.5 μm.

[Item 12]
The liquid crystal display apparatus of any of Items 7 to 11, wherein an amount of offset in position between the first portion and the second portion along the pixel longitudinal direction is 1.5 μm or more.

[Item 13]
The liquid crystal display apparatus of any of Items 7 to 12, wherein the boundary region further includes two second bridging portions being located at opposite ends of the pixel electrode along pixel the transverse direction and interconnecting the second slitted region and the third slitted region.

[Item 14]
The liquid crystal display apparatus of Item 13, wherein a width of each of the two second bridging portions along the pixel transverse direction is 6.0 μm or more.

[Item 15]
The liquid crystal display apparatus of any of Items 1 to 14, wherein each of the first alignment film and the second alignment film is a photo-alignment film.

[Item 16]
The liquid crystal display apparatus of any of Items 1 to 15, wherein in each of the first liquid crystal domain, the second liquid crystal domain, the third liquid crystal domain, and the fourth liquid crystal domain, a pretilt direction that is defined by the first alignment film and a pretilt direction that is defined by the second alignment film are essentially antiparallel.

According to embodiments of the present invention, it is possible to suppress displaying problems associated with discontinuous points in liquid crystal alignment in a VA mode liquid crystal display apparatus in which an alignment division structure is formed by using alignment films to define pretilt directions.

DETAILED DESCRIPTION

[Terminology]

First, certain essential terms used in the present specification will be explained.

In the present specification, a "liquid crystal layer of vertical alignment type" means a liquid crystal layer in which liquid crystal molecules are aligned essentially perpendicularly to the surface of an alignment film (vertical alignment film) (e.g., at an angle of about 85° or more). The liquid crystal molecules contained in the liquid crystal layer of vertical alignment type have a negative anisotropy of dielectric constant. Displaying under the normally black mode can be achieved by combining a liquid crystal layer of vertical alignment type and a pair of polarizers which are placed in crossed Nicols (i.e., so that their respective transmission axes are essentially orthogonal to each other), such that the polarizers oppose each other via the liquid crystal layer.

In the present specification, a "pixel" means smallest unit that expresses a certain gray scale level in displaying; in the case of color displaying, a "pixel" corresponds to a unit that expresses respective gray scale levels of R, G, and B, for example. A combination of an R pixel, a G pixel, and a B pixel constitutes one color displaying pixel. Moreover, in the present specification, any region of a liquid crystal display apparatus that corresponds to a "pixel" in terms of displaying (pixel region) is also referred to as a "pixel".

A "pretilt direction" means an alignment direction of a liquid crystal molecule that is defined by an alignment film, referring to an azimuthal direction within the display surface. Herein, an angle that the liquid crystal molecule makes with the surface of the alignment film is referred to as a "pretilt angle". As will be described later, an alignment treatment for an alignment film (i.e., a treatment for conferring the alignment film an ability to define a pretilt direction in a predetermined direction) is preferably achieved through a photo-alignment treatment.

By changing the combination of pretilt directions that are realized by a pair of alignment films opposing each other with a liquid crystal layer interposed therebetween, a four-split structure can be formed. By definition, a pixel (pixel region) that has been divided into four portions has four liquid crystal domains.

Figure 3A:
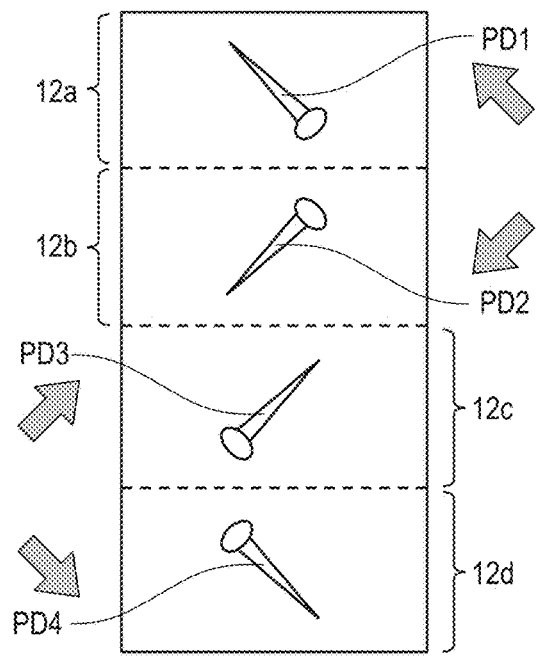
FIG. 3A is a diagram for describing a method for obtaining the alignment division structure of the pixel P, showing pretilt directions PD1, PD2, PD3 and PD4 which are defined by a first alignment film 12 of an active matrix substrate 10.
Figure 3B:
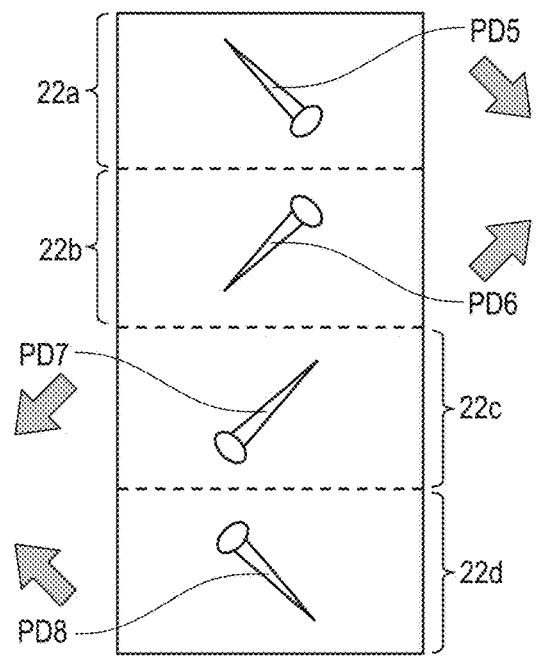
FIG. 3B is a diagram for describing a method for obtaining the alignment division structure of the pixel P, showing pretilt directions PD5, PD6, PD7 and PD8 which are defined by a second alignment film 22 provided on a counter substrate 20.
Figure 3C:
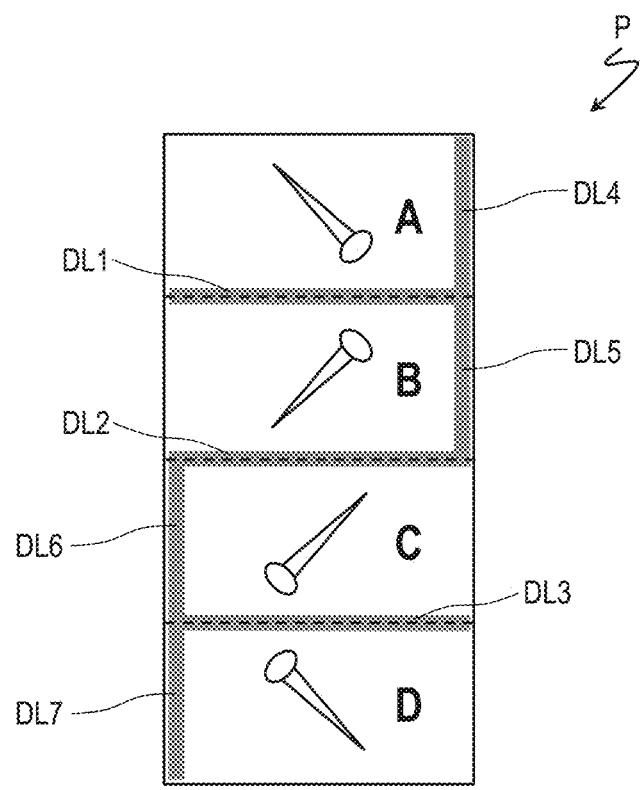
FIG. 3C is a diagram for describing a method for obtaining the alignment division structure of the pixel P, showing, after the active matrix substrate 10 and the counter substrate 20 are attached together, tilt directions (directors) occurring when a voltage is applied across a liquid crystal layer 30.

Each liquid crystal domain is characterized by the tilt direction (which may also be referred to as the "reference alignment direction") of liquid crystal molecules existing near the center of the layer plane of the liquid crystal layer and of its thickness direction when a voltage is applied across liquid crystal layer. This tilt direction (reference alignment direction) governs the viewing angle dependence of the domain. Regarding a tilted liquid crystal molecule, when one considers a vector from an end of the liquid crystal molecule that is closer to the rear-side substrate to its farther end (which is an end that is closer to the front-side substrate) (i.e., a vector from the tip end to the head of a pin that is illustrated in FIG. 3C discussed later), the "tilt direction" of the liquid crystal molecule is an orientation of a component of this vector within the substrate plane (i.e., a projection onto the substrate plane), which is an azimuthal direction. The azimuthal direction is to be referenced against the display surface as the horizontal direction, such that the direction of turning left reads positive (i.e., if the display surface were the face of a clock, the 3 o'clock direction would be an azimuth angle of 0°, and the counterclockwise direction would be positive). When the tilt directions of the four liquid crystal domains are set to four directions such that the angle between any two directions is essentially equal to an integer multiple of 90° (e.g., the 10:30 direction, the 7:30 direction, the 4:30 direction, the 1:30 direction), the viewing angle characteristics will be averaged out, and good displaying can be achieved. From the standpoint of uniformity of viewing angle characteristics, it is preferable that the respective areas which the four liquid crystal domains account for in the pixel region are essentially equal to one another.

A liquid crystal layer of vertical alignment type that is illustrated in any of the following embodiments contains liquid crystal molecules having negative anisotropy of dielectric constant (i.e., a nematic liquid crystal material having a negative anisotropy of dielectric constant), such that the pretilt direction defined by one alignment film and the pretilt direction defined by the other alignment film are essentially antiparallel to each other. In connection with these two pretilt directions, the aforementioned tilt direction (reference alignment direction) is defined to be an azimuthal direction essentially identical with the pretilt direction that is ascribable to the rear-side alignment film, and when a voltage is applied across the liquid crystal layer, the liquid crystal molecules do not take a twist alignment. Preferably, the respective pretilt angles that are defined by the pair of alignment films are essentially equal to each other.

From the standpoint of mass producibility, a preferable alignment treatment for each alignment film is a photo-alignment treatment. Moreover, a photo-alignment treatment can be carried out without involving any physical contact, and therefore it does not induce any static electricity associated with friction, as would be caused by a rubbing treatment; thus, deteriorations in production yield can be prevented. Furthermore, use of a photo-alignment film containing a photosensitive group will help variations in the pretilt angle to be reduced.

Hereinafter, embodiments of the present invention will be described with reference to the drawings. Note that the present invention is not limited to the following embodiments.

Embodiment 1

Figure 1:
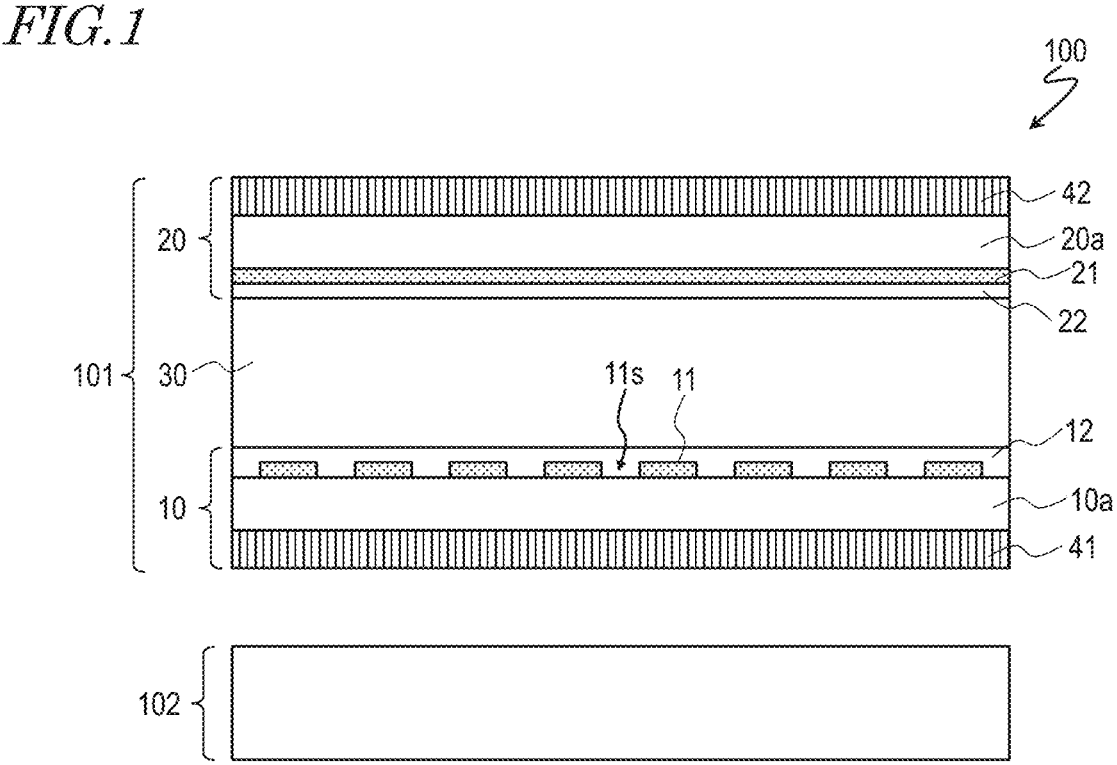
FIG. 1 is a cross-sectional view schematically showing a liquid crystal display apparatus 100 according to an embodiment of the present invention.

With reference to FIG. 1, a liquid crystal display apparatus 100 according to the present embodiment will be described. FIG. 1 is a cross-sectional view schematically showing the liquid crystal display apparatus 100.

Figure 9:
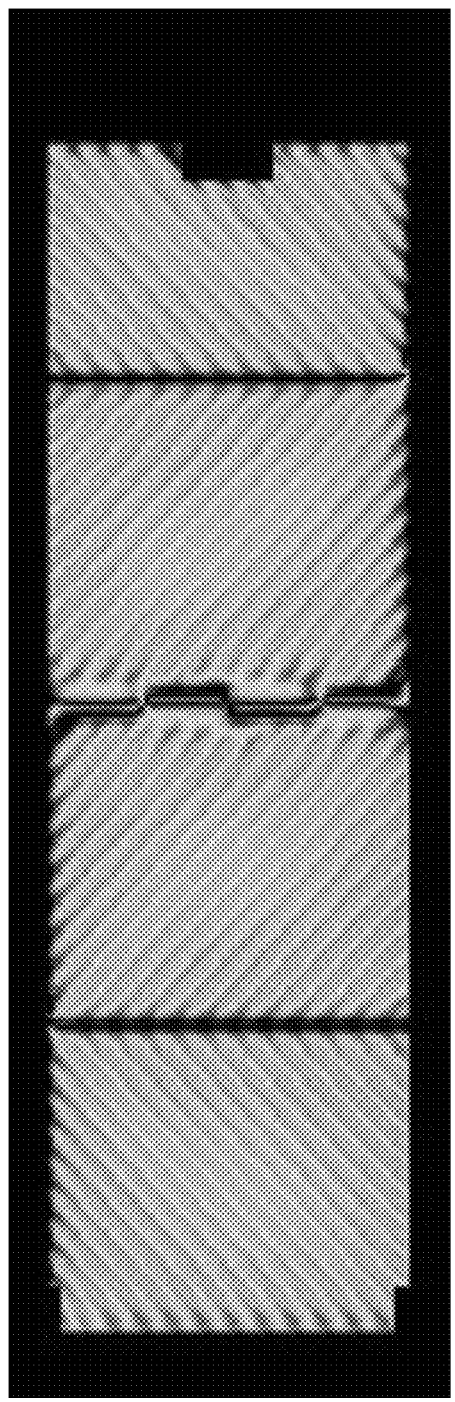
FIG. 9 is a diagram showing a transmittance distribution within the pixel P in a white displaying state, as resulting from a simulation with respect to the liquid crystal display apparatus 100.

As shown in FIG. 9, the liquid crystal display apparatus 100 includes a liquid crystal display panel 101 and a backlight (lighting device) 102. The liquid crystal display panel 101 includes an active matrix substrate (first substrate) 10 and a counter substrate (second substrate) 20 opposing each other, and a liquid crystal layer of vertical alignment type 30 interposed therebetween. The backlight 102 is disposed on the rear side (the opposite side to the viewer) of the liquid crystal display panel 101. Moreover, the liquid crystal display apparatus 100 includes a plurality of pixels arranged in a matrix.

The active matrix substrate 10 includes a pixel electrode 11, which is one of a plurality that are respectively formed for the plurality of pixels, and a first alignment film 12 that is provided between the pixel electrode 11 and the liquid crystal layer 30 (i.e., on the outermost surface of the active matrix substrate 10 facing toward the liquid crystal layer 30). The pixel electrode 11 and the first alignment film 12 are provided in this order, on the surface of the substrate 10a facing toward the liquid crystal layer 30. In other words, the pixel electrode 11 and the first alignment film 12 are supported by the substrate 10a.

The substrate 10a is transparent and electrically insulative. The substrate 10a may be a glass substrate or a plastic substrate, for example.

The pixel electrode 11 is made of a transparent electrically conductive material (e.g., ITO). The pixel electrode 11 has a plurality of slits 11s.

Although not shown herein, other than the aforementioned pixel electrode 11 and first alignment film 12, the active matrix substrate 10 includes, corresponding to one pixel P: a thin film transistor (TFT) electrically connected to the pixel electrode 11, a gate line for supplying a scanning signal (gate signal) to the TFT, a source line for supplying a display signal (source signal) to the TFT, and the like.

The counter substrate 20 includes a counter electrode 21 opposing the pixel electrode 11, and a second alignment film 22 interposed between the counter electrode 21 and the liquid crystal layer 30 (i.e., on the outermost surface of the counter substrate 20 facing toward the liquid crystal layer 30). The counter electrode 21 and the second alignment film 22 are provided in this order, on the surface of the substrate 20a facing toward the liquid crystal layer 30. In other words, the counter electrode 21 and the second alignment film 22 are supported by the substrate 20a.

The substrate 20a is transparent and electrically insulative. The substrate 20a may be a glass substrate or a plastic substrate, for example.

The counter electrode 21 is made of a transparent electrically conductive material (e.g., ITO). The counter electrode 21 may be a continuous electrically conductive film that is formed across the entire display region. In other words, the counter electrode 21 may be a common electrode that is capable of supplying a common potential to all pixels.

Although not shown herein, in addition to the aforementioned counter electrode 21 and second photo-alignment film 22, the counter substrate 20 also includes a color filter layer and a light shielding layer (black matrix). The color filter layer may typically include red color filters, green color filters, and blue color filters.

The first alignment film 12 and the second alignment film 22 each have an alignment regulating force for aligning liquid crystal molecules essentially perpendicularly to their respective surface. In the present embodiment, the first alignment film 12 and the second alignment film 22 have been subjected to photo-alignment treatments. In other words, each of the first alignment film 12 and the second alignment film 22 is a photo-alignment film.

The liquid crystal display apparatus 100 further includes a pair of polarizers 41 and 42 opposing each other via the liquid crystal layer 30. The pair of polarizers 41 and 42 are disposed so that their respective transmission axes are essentially orthogonal to each other (i.e., in crossed Nicols).

Next, with reference to FIG. 2, an alignment division structure in each pixel P of the liquid crystal display apparatus 100 will be described.

In the present embodiment, each pixel P has an essentially rectangular shape defined by a longitudinal direction D1 and a transverse direction D2. Hereinafter, the longitudinal direction D1 and the transverse direction D2 of the pixel P may respectively be referred to as the "pixel longitudinal direction D1" and the "pixel transverse direction D2".

Figure 2:
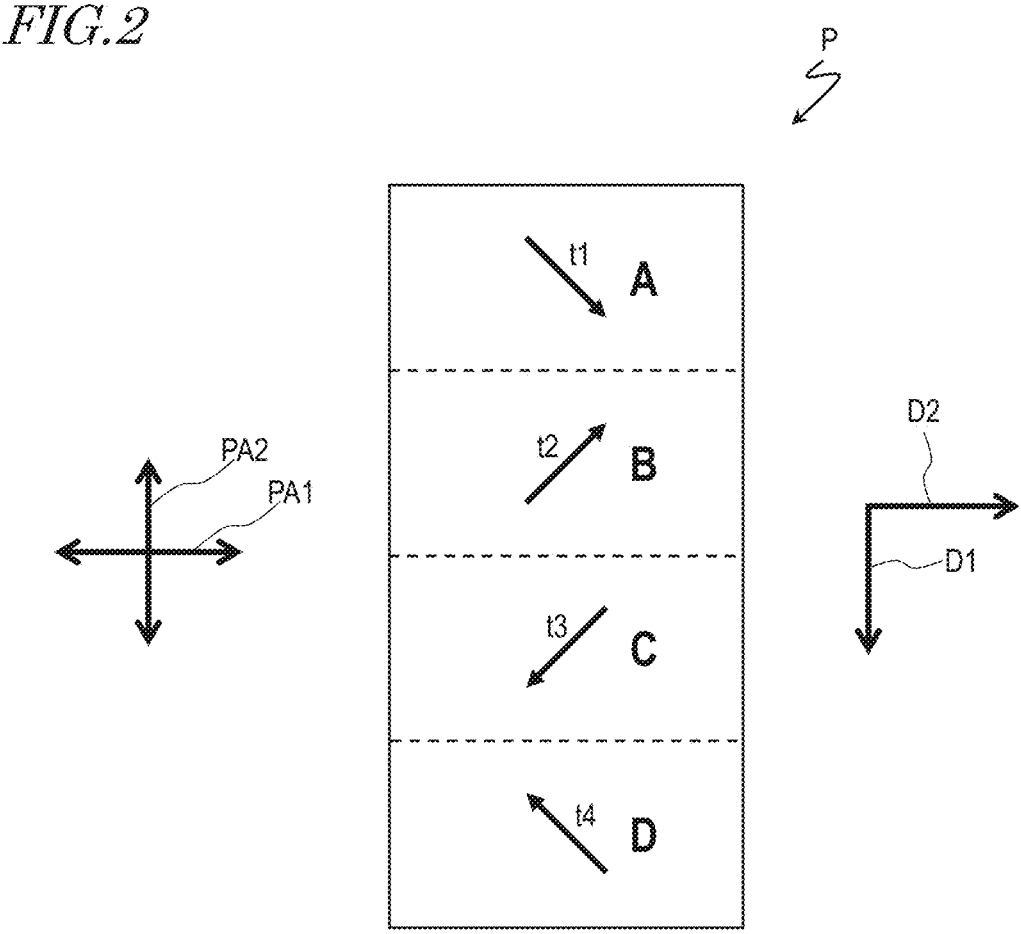
FIG. 2 is a diagram showing an alignment division structure of a pixel P of the liquid crystal display apparatus 100.

When a voltage is applied between the pixel electrode 11 and the counter electrode 21, four liquid crystal domains A, B, C and D are created in the liquid crystal layer 30 within each pixel P, as shown in FIG. 2. Four directors (reference alignment directions) t1, t2, t3 and t4 which are the respective representative alignment directions of the liquid crystal molecules contained in the liquid crystal domains A, B, C and D have different azimuths from one another. The directors of the liquid crystal domains A, B, C and D are defined by the first alignment film 12 and the second alignment film 22.

Given that the azimuth angle (3 o'clock direction) of the horizontal direction on the display surface is 0°, then the azimuth of the director t1 of the liquid crystal domain A is essentially the 315° direction, the azimuth of the director t2 of the liquid crystal domain B is essentially the 45° direction, the azimuth of the director t3 of the liquid crystal domain C is essentially the 225° direction, and the azimuth of the director t4 of the liquid crystal domain D is essentially the 135° direction. In other words, the difference between any two among the azimuths of the four directors t1, t2, t3 and t4 of the liquid crystal domains A, B, C and D is essentially equal to an integer multiple of 90°. Note that, in the present specification, "essentially the 45° direction", "essentially the 135° direction", "essentially the 225° direction", and "essentially the 315° direction" respectively mean: "a 40° to 50° direction"; "a 130° to 140° direction"; "a 220° to 230° direction"; and "a 310° to 320° direction". Moreover, the directors t1, t2, t3 and t4 of the liquid crystal domains A, B, C and D each make an angle which is essentially equal to an odd multiple of 45° with respect to the pixel transverse direction D2.

In the example shown in FIG. 2, within the pixel P, the four liquid crystal domains A, B, C and D are arranged in four rows and one column. More specifically, within the pixel P, the liquid crystal domains A, B, C and D are arranged in this order from above to below (i.e., along the pixel longitudinal direction D1). Hereinafter, the four liquid crystal domains as counted consecutively from above (i.e., the liquid crystal domains A, B, C and D) may respectively be referred to as the "first liquid crystal domain", the "second liquid crystal domain", the "third liquid crystal domain", and the "fourth liquid crystal domain". Regarding the liquid crystal domains A, B, C and D, between any two adjacent liquid crystal domains, the azimuth of the director differs by essentially 90° or essentially 180°. More specifically, between the first liquid crystal domain (liquid crystal domain A) and the second liquid crystal domain (liquid crystal domain B), the azimuth of the director differs by essentially 90°. Between the second liquid crystal domain (liquid crystal domain B) and the third liquid crystal domain (liquid crystal domain C), the azimuth of the director differs by essentially 180°. Between the third liquid crystal domain (liquid crystal domain C) and the fourth liquid crystal domain (liquid crystal domain D), the azimuth of the director differs by essentially 90°.

One of the transmission axes (polarization axes) PA1 and PA2 of the pair of polarizers 41 and 42 is parallel to the horizontal direction on the display surface, while the other transmission axis is parallel to the vertical direction on the display surface. Therefore, the transmission axes PA1 and PA2 of the polarizers 41 and 42 make an angle of essentially 45° with the azimuths of directors t1, t2, t3 and t4 of the liquid crystal domains A, B, C and D.

Although FIG. 2 illustrates a case where the areas which the four liquid crystal domains A, B, C and D occupy within the pixel P are equal to one another, the areas of the four liquid crystal domains A, B, C and D may not be equal to one another. However, from the standpoint of uniformity of viewing angle characteristics, the difference between the areas of the four liquid crystal domains A, B, C and D is preferably as small as possible. The example of FIG. 2 merely illustrates an example of a most preferable (i.e., ideal) four-split structure in terms of viewing angle characteristics.

Next, with reference to FIG. 3A, FIG. 3B, and FIG. 3C, a method of alignment division for obtaining the alignment division structure of the pixel P will be described. FIG. 3A shows pretilt directions PD1, PD2, PD3 and PD4 which are defined by the first alignment film 12 provided on the active matrix substrate 10, whereas FIG. 3B shows pretilt directions PD5, PD6, PD7 and PD8 which are defined by the second alignment film 22 provided on the counter substrate 20. FIG. 3C shows, after the active matrix substrate 10 and the counter substrate 20 are attached together, tilt directions (directors) established when a voltage is applied across the liquid crystal layer 30. In FIG. 3A, FIG. 3B, and FIG. 3C, the active matrix substrate, the counter substrate, and the liquid crystal layer are illustrated as seen from the viewer's side. Therefore, in FIG. 3A, the alignment film is located frontward of the plane of the figure relative to the substrate; in FIG. 3B, the alignment film is located rearward of the plane of the figure relative to the substrate. Moreover, each pretilt direction or tilt direction is schematically represented as a pin shape, such that the head (i.e., the end having a larger area) of the pin represents the end at the front side (the viewer's side) of the liquid crystal molecule, while the tip end (i.e., the end having a smaller area) of the pin represents the end at the rear side of the liquid crystal molecule.

As shown in FIG. 3A, within each pixel P, the first alignment film 12 includes a first pretilt region 12a, a second pretilt region 12b, a third pretilt region 12c, and a fourth pretilt region 12d, respectively defining the mutually different first pretilt direction PD1, second pretilt direction PD2, third pretilt direction PD3, and fourth pretilt direction PD4. Specifically, the region of the first alignment film 12 corresponding to one pixel P is divided into four portions along the top-bottom direction; these portions (the first pretilt region, second pretilt region, third pretilt region and fourth pretilt region) 12a, 12b, 12c and 12d have been subjected to photo-alignment treatments so as to define respectively as different pretilt directions (the first pretilt direction, second pretilt direction, third pretilt direction and fourth pretilt direction) PD1, PD2, PD3 and PD4. Herein, the photo-alignment treatments have been performed by obliquely radiating ultraviolet (e.g., linearly-polarized ultraviolet) from respective directions indicated by arrows.

As shown in FIG. 3B, within each pixel P, the second alignment film 22 includes a fifth pretilt region 22a, a sixth pretilt region 22b, a seventh pretilt region 22c, and an eighth pretilt region 22d, respectively defining the mutually different fifth pretilt direction PD5, sixth pretilt direction PD6, seventh pretilt direction PD7, and eighth pretilt direction PD8. Specifically, the region of the second alignment film 22 corresponding to one pixel P is divided into four portions along the top-bottom direction; these portions (the fifth pretilt region, sixth pretilt region, seventh pretilt region and eighth pretilt region) 22a, 22b, 22c and 22d have been subjected to photo-alignment treatments so as to define respectively as to different pretilt directions (the fifth pretilt direction, sixth pretilt direction, seventh pretilt direction and eighth pretilt direction) PD5, PD6, PD7 and PD8. Herein, the photo-alignment treatments have been performed by obliquely radiating ultraviolet (e.g., linearly-polarized ultraviolet) from respective directions indicated by arrows.

By attaching together the active matrix substrate 10 and the counter substrate 20 which have been subjected to photo-alignment treatments as illustrated in FIG. 3A and FIG. 3B, a pixel P having an alignment division as shown in FIG. 3C can be formed. For each of liquid crystal domains A through D, the pretilt direction defined by the first alignment film 12 on the active matrix substrate 10 and the pretilt direction defined by the second alignment film 22 on the counter substrate 20 are essentially antiparallel to each other. In each of liquid crystal domains A through D, the liquid crystal molecules have a twist angle of substantially 0°.

Within the pixel P having an alignment division structure, dark lines DL1 through DL7 occur. Specifically, the dark lines DL1, DL2 and DL3 occur at the boundaries between adjacent liquid crystal domains, whereas the dark lines DL4, DL5, DL6 and DL7 occur near the edges of the pixel electrode 11. The reasons for the occurrence of dark lines are described in Patent Documents 1 and 2 and the description thereof is omitted. The domain arrangement illustrated in FIG. 2 is one of the arrangements where the dark lines occurring in the pixel P have a minimum total area.

Figure 4:
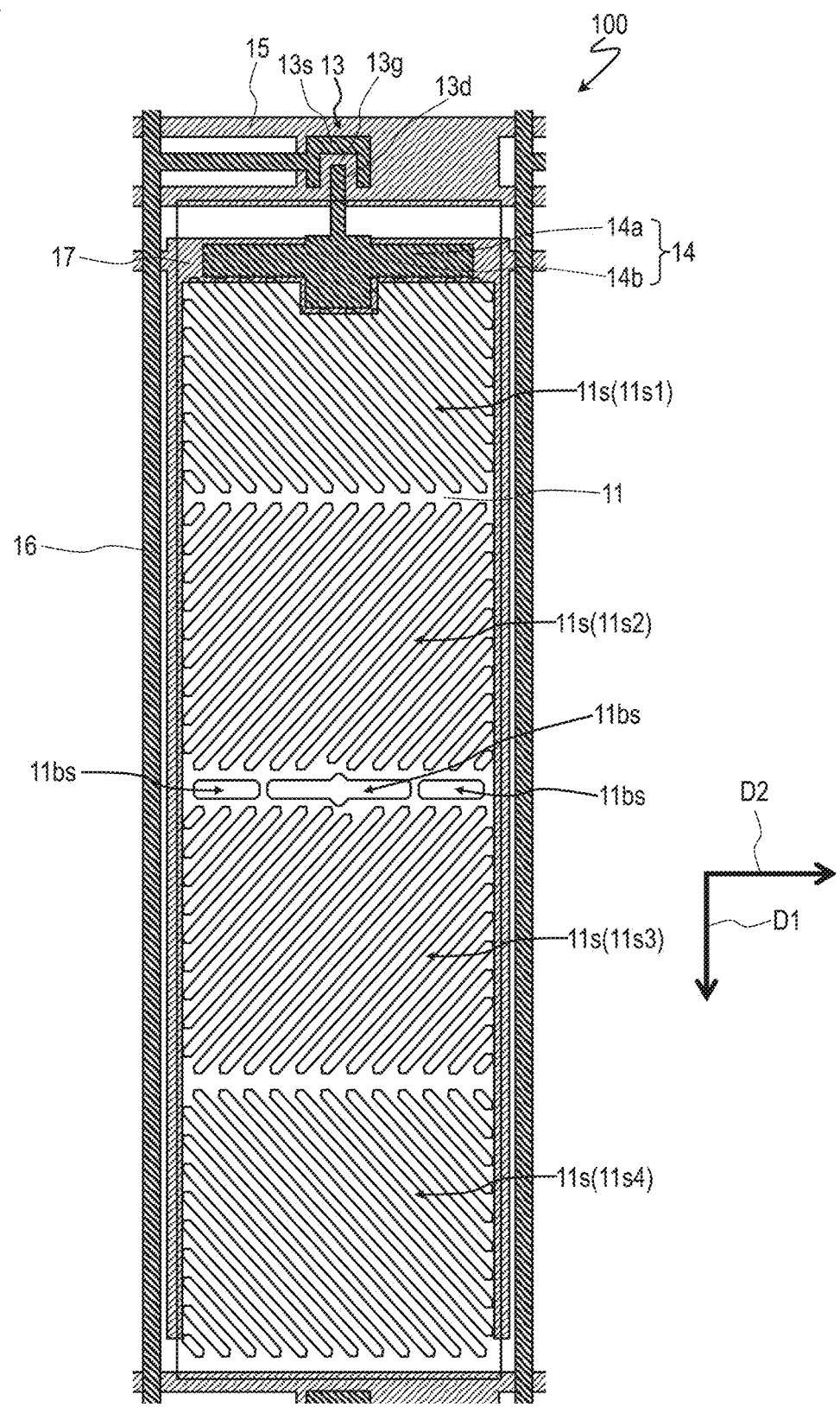
FIG. 4 is a plan view schematically showing the liquid crystal display apparatus 100, showing a region corresponding to one pixel P.

Next, with reference to FIG. 4, the structure of the liquid crystal display apparatus 100 will be described in more detail. FIG. 4 is a plan view showing a region of the liquid crystal display apparatus 100 corresponding to one pixel P.

In addition to the aforementioned pixel electrode 11 and first alignment film 12, the active matrix substrate 10 of the liquid crystal display apparatus 100 also includes a TFT 13, a storage capacitor 14, a gate line 15, a source line 16, and a storage capacitor line 17.

The gate line 15 extends along a row direction, whereas the source line 16 extends along a column direction. The storage capacitor line 17 generally extends along the row direction.

The TFT 13 includes a gate electrode 13g, a gate insulating layer (not shown), a semiconductor layer (not shown), a source electrode 13s, and a drain electrode 13d. The gate electrode 13g is electrically connected to the gate line 15. In the example shown, a portion of the gate line 15 (i.e., a portion overlapping the semiconductor layer) functions as the gate electrode 13g. The source electrode 13s is electrically connected to the source line 16. In the example shown, the source electrode 13s extends from the source line 16. The drain electrode 13d is electrically connected to the pixel electrode 11.

The storage capacitor 14 includes a first capacitor electrode 14a that is electrically connected to the drain electrode 13d of the TFT 13, and a second capacitor electrode 14b that overlaps the first capacitor electrode 14a via the gate insulating layer. In the example shown, the first capacitor electrode 14a extends from the drain electrode 13d of the TFT 13. Also, in the example shown, a portion of the storage capacitor line 17 (i.e., a portion overlapping the first capacitor electrode 14a) functions as the second capacitor electrode 14b.

Figure 5:
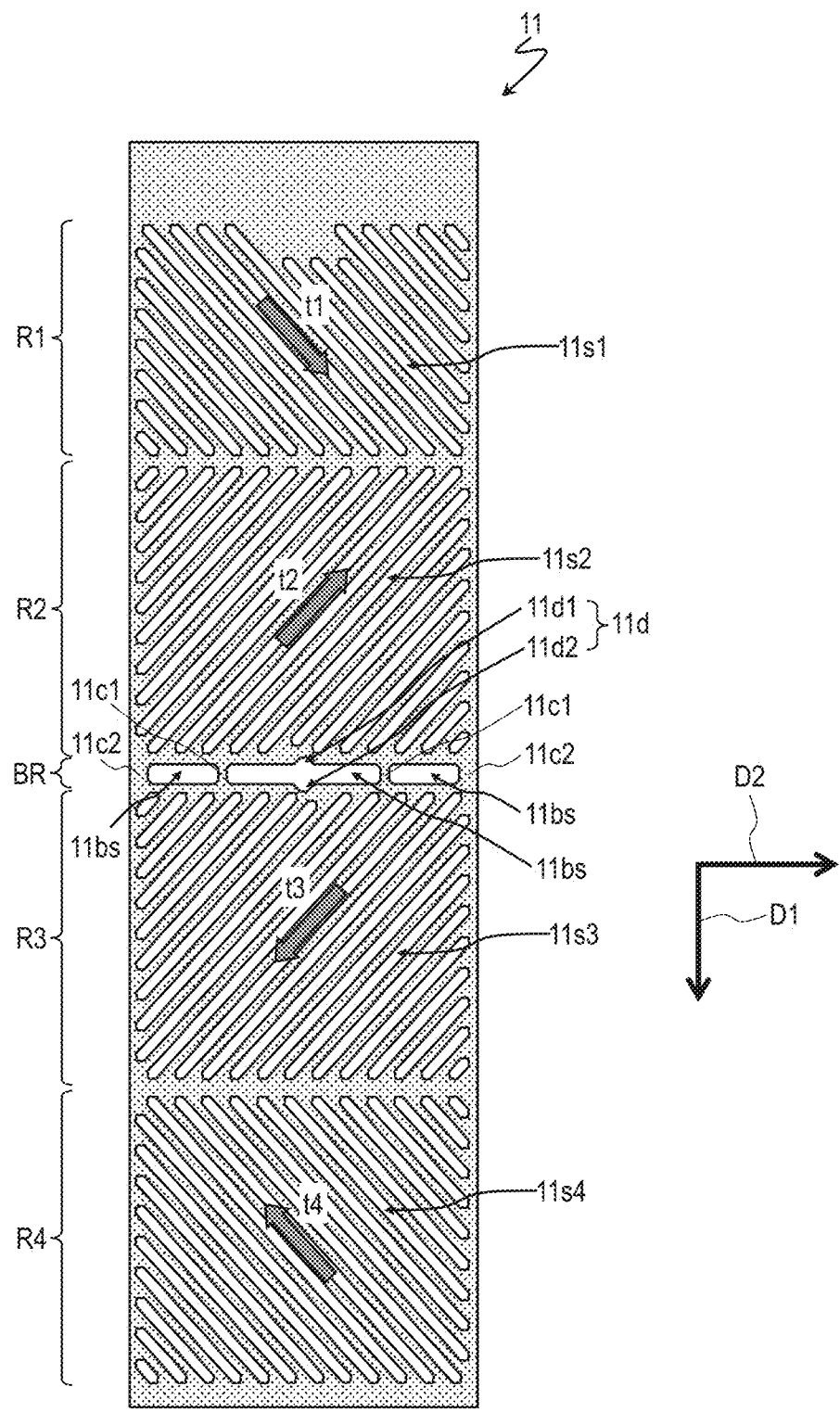
FIG. 5 is a plan view schematically showing a pixel electrode 11 of the liquid crystal display apparatus 100.

As has already been described, the pixel electrode 11 includes a plurality of slits 11s. With reference to FIG. 5, a more specific configuration of the pixel electrode 11 will be described. FIG. 5 is a plan view showing the pixel electrode 11.

As shown in FIG. 5, the pixel electrode 11 includes: a first slitted region R1, which is a region corresponding to the liquid crystal domain A (first liquid crystal domain); a second slitted region R2, which is a region corresponding to the liquid crystal domain B (second liquid crystal domain); a third slitted region R3, which is a region corresponding to the liquid crystal domain C (third liquid crystal domain); and a fourth slitted region R4, which is a region corresponding to the liquid crystal domain D (fourth liquid crystal domain).

In the first slitted region R1, a plurality of first slits 11s1 extending essentially in parallel to the tilt direction (director t1) of the liquid crystal domain A are formed. In the second slitted region R2, a plurality of second slits 11s2 extending essentially in parallel to the tilt direction (director t2) of the liquid crystal domain B are formed. In the third slitted region R3, a plurality of third slits 11s3 extending essentially in parallel to the tilt direction (director t3) of the liquid crystal domain C are formed. In the fourth slitted region R4, a plurality of fourth slits 11s4 extending essentially in parallel to the tilt direction (director t4) of the liquid crystal domain D are formed.

Because the aforementioned slits 11s extending essentially in parallel to the tilt directions of the corresponding liquid crystal domains are formed in the pixel electrode 11, the dark lines occurring within the pixel P as aforementioned can be reduced in width, whereby transmittance can be improved.

Note that the arrangement and number of slits 11s are not limited to those exemplified in FIG. 4 and FIG. 5. Although FIG. 4 and FIG. 5 illustrate an example where the slits 11s are disposed over essentially the entire pixel P (i.e., over essentially the entire pixel electrode 11), the slits 11s may be disposed only in a portion(s) of the pixel P. Although there is no particular limitation to the width of each slit 11s or the interval between two adjacent slits 11s, typically, each slit 11s has a width of not less than 2 µm and not more than 4 µm, and the interval between two adjacent slits 11s is not less than 2 µm and not more than 4 µm.

Figure 6:
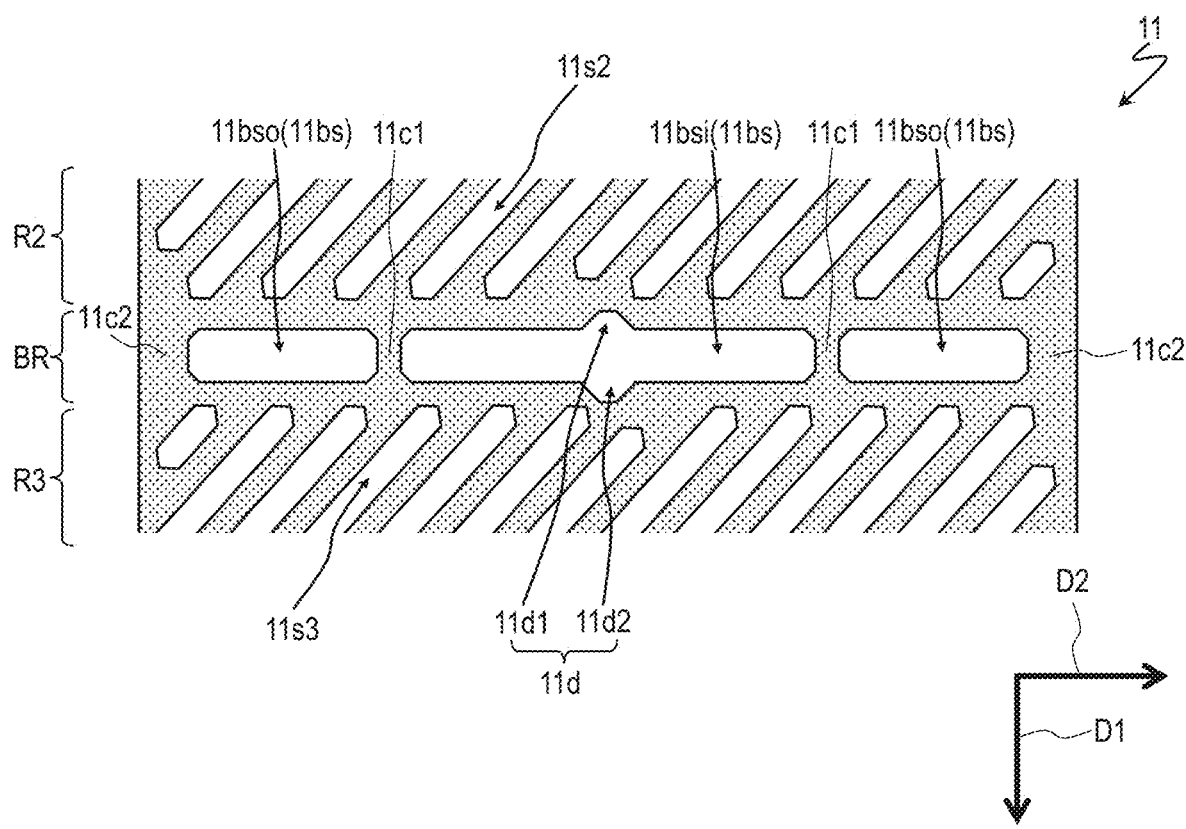
FIG. 6 is a plan view showing enlarged the neighborhood of a boundary region BR of the pixel electrode 11.

The pixel electrode 11 further includes a boundary region BR located between the second slitted region R2 and the third slitted region R3. Hereinafter, with additional reference to FIG. 6, the structure near the boundary region BR of the pixel electrode 11 will be described. FIG. 6 is a diagram showing enlarged the neighborhood of the boundary region BR of the pixel electrode 11.

As shown in FIG. 6, the boundary region BR includes n boundary slits 11bs (where n is an integer equal to or greater than 3), (n-1) first bridging portions 11c1, two second bridging portions 11c2, and (n-2) dent patterns 11d. A case where n=3 is illustrated herein. In other words, there are three boundary slits 11bs, two first bridging portions 11c1, and one dent pattern 11d.

The three boundary slits 11bs each extend essentially in parallel to the pixel transverse direction D2. Moreover, the three boundary slits 11bs are arranged along the pixel transverse direction D2.

Each of two first bridging portions 11c1 is located between two adjacent boundary slits 11bs among the three boundary slits 11bs. The first bridging portions 11c1 interconnect the second slitted region R2 and the third slitted region R3.

The two second bridging portions 11c2 are located at opposite ends of the pixel electrode 11 along the pixel transverse direction D2. The second bridging portions 11c2 interconnect the second slitted region R2 and the third slitted region R3, as do the first bridging portions 11c1.

Among the three boundary slits 11bs, a pair of boundary slits 11bso that are the outermost along the pixel transverse direction D2 are referred to as "outer boundary slits", whereas the other boundary slit 11bsi is referred to as an "inner boundary slit". The inner boundary slit 11bsi is located between two first bridging portions 11c1.

The dent pattern 11d includes a first dent 11d1 and a second dent 11d2. The first dent 11d1 is formed so as to be dented into the second slitted region R2 from the inner boundary slit 11bsi. On the other hand, the second dent 11d2 is formed so as to be dented into the third slitted region R3 from the inner boundary slit 11bsi. Thus, each of the first dent 11d1 and the second dent 11d2 is a recess that is continuous with the inner boundary slit 11bsi; and the first and second dents 11d1 and 11d2 are collectively referred to as the dent pattern 11d.

In the example shown, the first dent 11d1 has a trapezoidal shape whose width becomes narrower from the inner boundary slit 11bsi toward the second slitted region R2, whereas the second dent 11d2 has a trapezoidal shape whose width becomes narrower from the inner boundary slit 11bsi toward the third slitted region R3.

Also, in the example shown, the positions of the first dent 11d1 and the second dent 11d along the pixel transverse direction D2 are essentially identical (i.e., they are substantially aligned). Furthermore, in the example shown, the position of the dent pattern 11d along the pixel transverse direction D2 is essentially the center of the inner boundary slit 11bsi along its length, and a position that essentially bisects the inner boundary slit 11bsi.

Because the dent pattern 11d includes the first dent 11d1 and the second dent 11d2 being continuous with the inner boundary slit 11bsi, they are naturally located between two adjacent first bridging portions 11c1. In other words, the first bridging portions 11*c*1, the dent pattern 11*d*, and the first bridging portions 11*c*1 are arranged along the pixel transverse direction D2.

Because the boundary region BR of the pixel electrode 11 has the aforementioned structure, displaying problems associated with discontinuous points in liquid crystal alignment can be suppressed in the liquid crystal display apparatus 100 according to the present embodiment. Hereinafter, the reasons thereof will be described.

Because the alignment of liquid crystal molecules within the pixel P is point symmetric, there will always be a discontinuous point in alignment (i.e., a point where four dark lines meet) in essentially the center of the pixel P. This discontinuous point does not always occur at a fixed place, and may move its position depending on the applied voltage at the pixel P or any surrounding pixel(s) P (i.e., it may occur in varying places), which may cause displaying problems such as afterimages.

Figure 35:
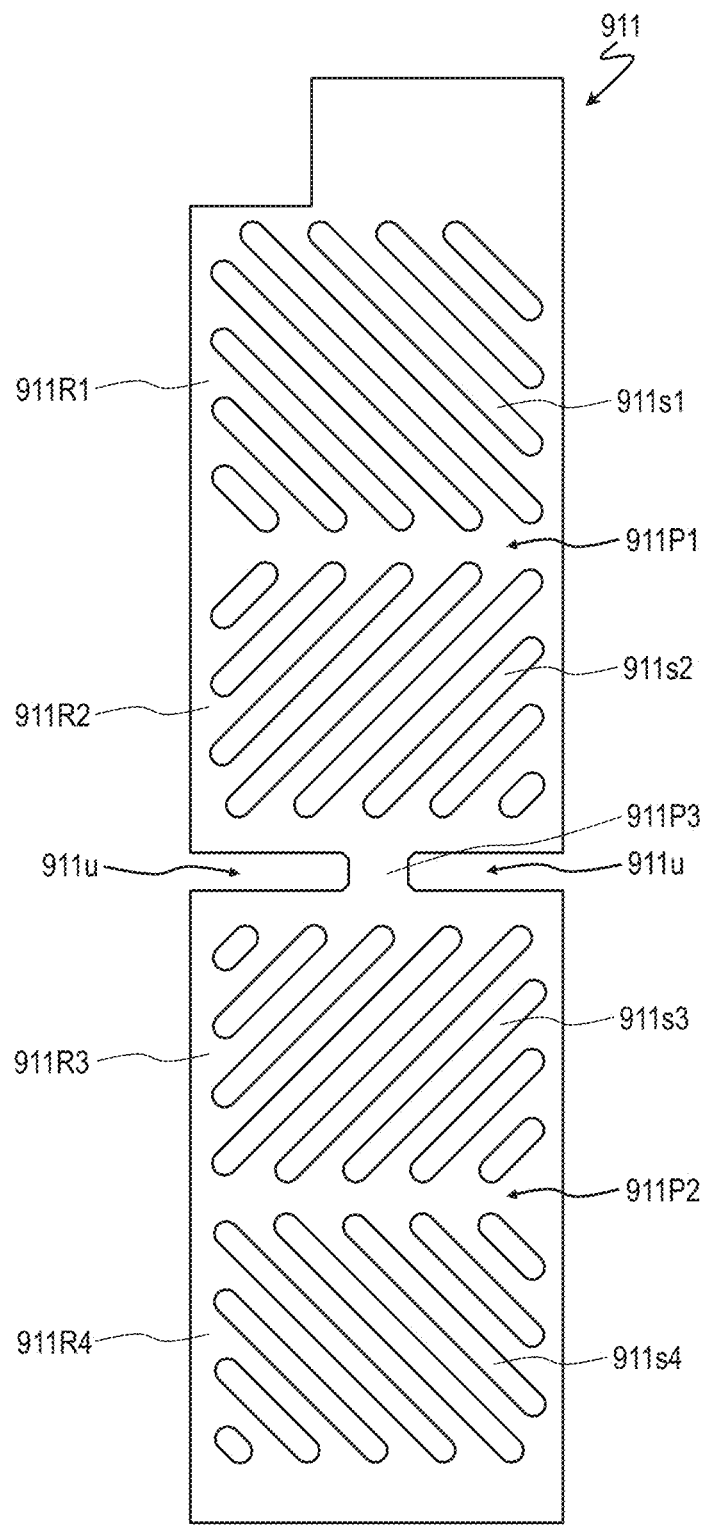
FIG. 35 is a plan view showing a pixel electrode 911 disclosed in Patent Document 2.

In the electrode structure disclosed in Patent Document 2, as is shown FIG. 35, the bridging portion 911P3 that is provided between the first pixel electrode portion 911P1 and the second pixel electrode portion 911P2 may serve as a structure for fixing the discontinuous point (which hereinafter will be referred to as an "alignment stabilizing pattern"); however, as the pixel size increases and the recesses 911*u* become longer, a new discontinuous point(s) may occur above the recesses 911*u*.

As has already been described, the azimuth of the director t2 of the liquid crystal domain B is essentially the 45° direction, and the azimuth of the director t3 of the liquid crystal domain C is essentially the 225° direction; thus, the azimuth of the director differs by essentially 180° between the liquid crystal domain B and the liquid crystal domain C. Therefore, in order for the liquid crystal molecules to be aligned in a continuous manner, a discontinuous point at which four dark lines (a schlieren pattern) meet exist in the boundary region BR. As has already been described, the boundary slits 11*bs* are formed in the boundary region BR, and therefore the liquid crystal molecules above the boundary slits 11*bs* will fall in either of the two directions that are essentially parallel to the direction in which the boundary slits 11*bs* extend. Accordingly, there may be two types of discontinuous points existing in the boundary region BR: a type shown in FIG. 7A and a type shown in FIG. 7B. In each of FIG. 7A and FIG. 7B, a discontinuous point is located in essentially the center of the figure.

Figure 7A:
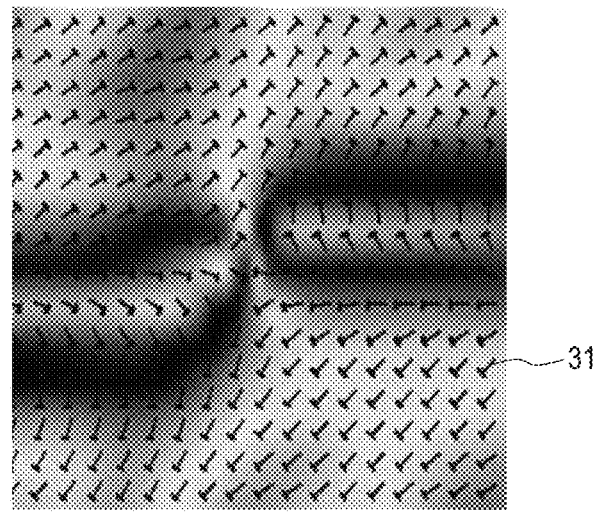
FIG. 7A is a diagram showing an alignment state of liquid crystal molecules 31 near a discontinuous point, regarding one of two types of discontinuous points in liquid crystal alignment.

In the type shown in FIG. 7A, the liquid crystal molecules 31 fall inwards (i.e., toward the discontinuous point) on the right and left sides of the discontinuous point, and outwards in other places. On the other hand, in the type shown in FIG. 7B, the liquid crystal molecules 31 fall radially outwards around the discontinuous point (i.e., the liquid crystal molecules fall outwards even on the right and left sides of the discontinuous point).

Figure 8A:
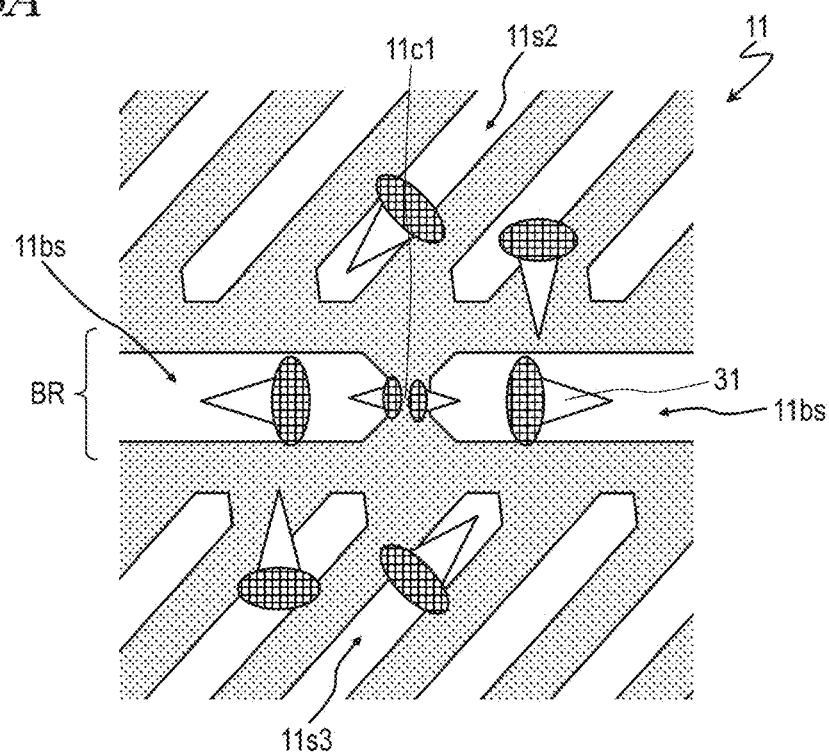
FIG. 8A is a diagram showing alignment states of liquid crystal molecules 31 near first bridging portions 11c1 of the boundary region BR.
Figure 8B:
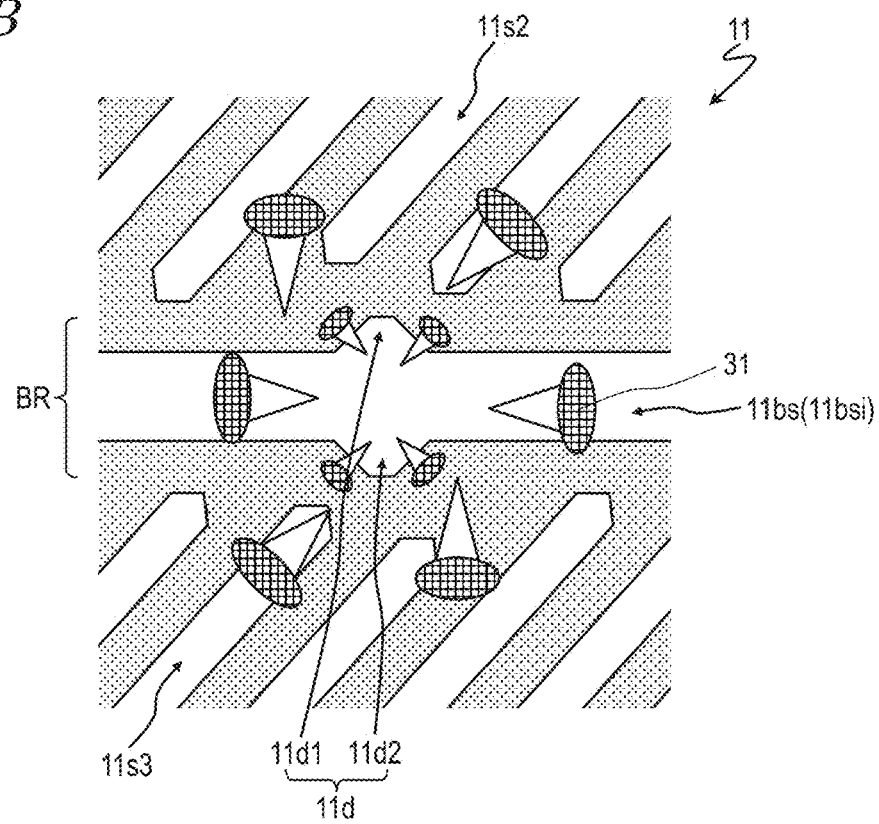
FIG. 8B is a diagram showing alignment states of liquid crystal molecules 31 near a dent pattern 11d of the boundary region BR.

The first bridging portions 11*cl* and the dent pattern 11*d* in the boundary region BR of the pixel electrode 11 may function as alignment stabilizing patterns to stabilize discontinuous points in liquid crystal alignment. FIG. 8A and FIG. 8B show alignment states of liquid crystal molecules 31 near the first bridging portions 11*cl* and the dent pattern 11*d*.

As can be seen from FIG. 8A, the first bridging portions 11*c*1 function as alignment stabilizing patterns to stabilize the type of discontinuous point shown in FIG. 7A. As can be seen from FIG. 8B, the dent pattern 11*d* functions as an alignment stabilizing pattern to stabilize the type of discontinuous point shown in FIG. 7B. Although not only the first bridging portions 11*cl* and the dent pattern 11*d* but also the second bridging portions 11*c*2 exist in the boundary region BR, the second bridging portions 11*c*2 do not function as alignment stabilizing patterns.

In the liquid crystal display apparatus 100 according to the present embodiment, because three alignment stabilizing patterns (i.e., the two first bridging portions 11*c*1 and one dent pattern 11*d*) are provided in the boundary region BR of the pixel electrode 11, it is possible to suitably stabilize the discontinuous point (or restrain unstabilized discontinuous points from occurring) even when the pixel size is relatively large.

FIG. 9 shows a transmittance distribution within the pixel P in a white displaying state, as resulting from a simulation with respect to the liquid crystal display apparatus 100 according to the present embodiment. From FIG. 9, it can be seen that discontinuous points are stabilized at positions corresponding to the respective alignment stabilizing patterns in the boundary region BR, while no discontinuous points exist in any positions other than above the alignment stabilizing patterns.

Figure 10A:
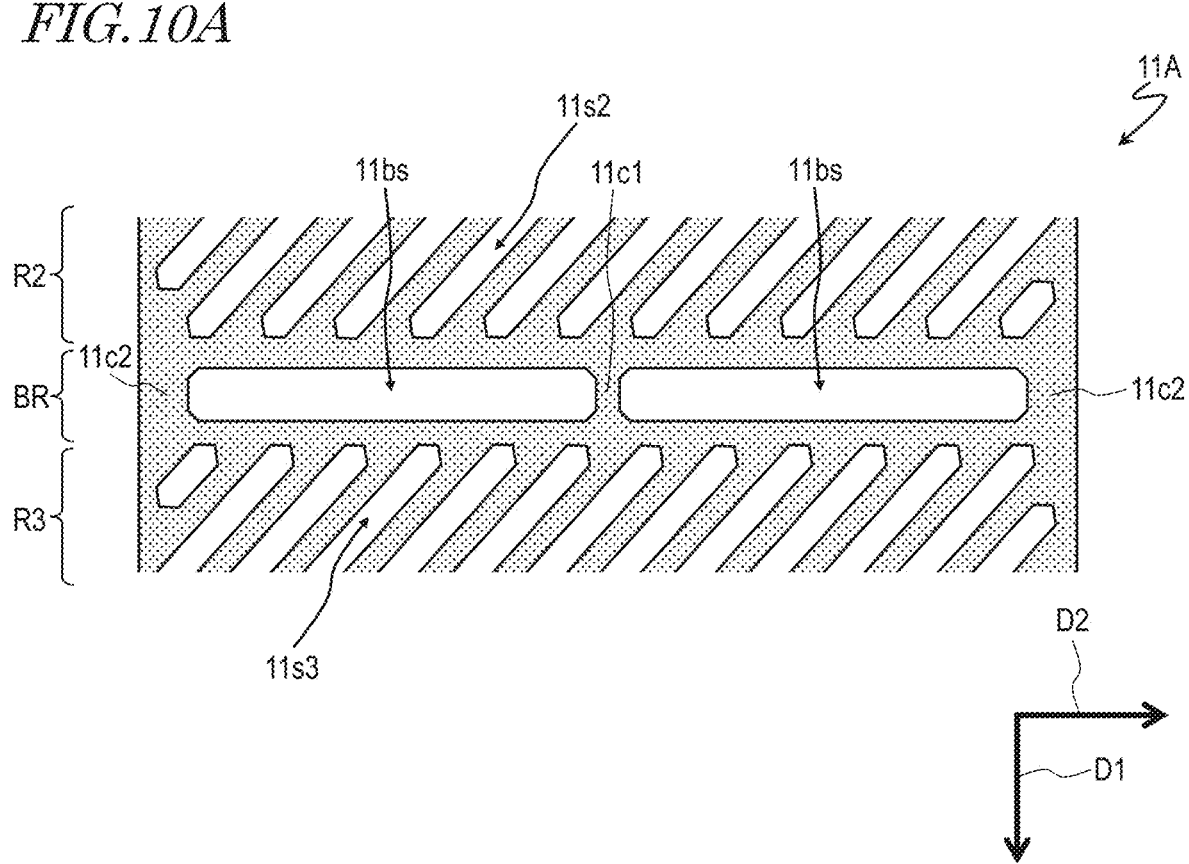
FIG. 10A is a plan view showing the neighborhood of the boundary region BR of a pixel electrode 11A according to Comparative Example 1.

FIG. 10A is a diagram showing the neighborhood of the boundary region BR of a pixel electrode 11A according to Comparative Example 1. In the pixel electrode 11A according to Comparative Example 1, the boundary region BR includes two boundary slits 11*bs*, one first bridging portion 11*c*1, and two second bridging portions 11*c*2. In other words, only one alignment stabilizing pattern is provided in the boundary region BR.

Figure 10B:
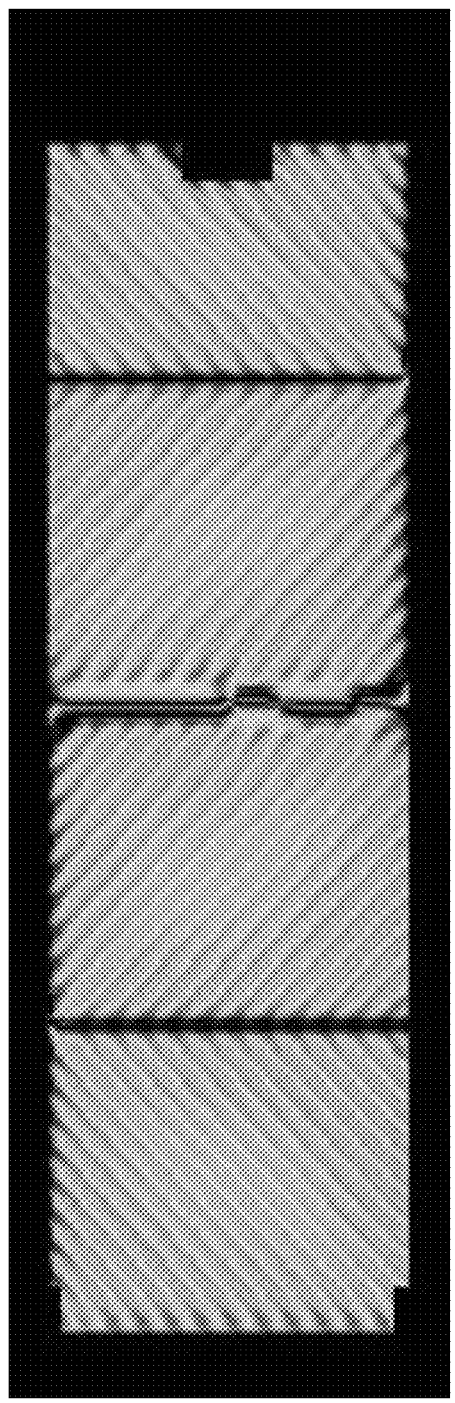
FIG. 10B is a diagram showing a transmittance distribution within the pixel P in a white displaying state, as resulting from a simulation in a case where the pixel electrode 11A according to Comparative Example 1 is used.

FIG. 10B shows a transmittance distribution within the pixel P in a case where the pixel electrode 11A according to Comparative Example 1 is used. From FIG. 10B, it can be seen that, in the boundary region BR, two discontinuous points exist above the right boundary slit 11*bs*, in addition to one discontinuous point that is stabilized at a position corresponding to the alignment stabilizing pattern.

Figure 11A:
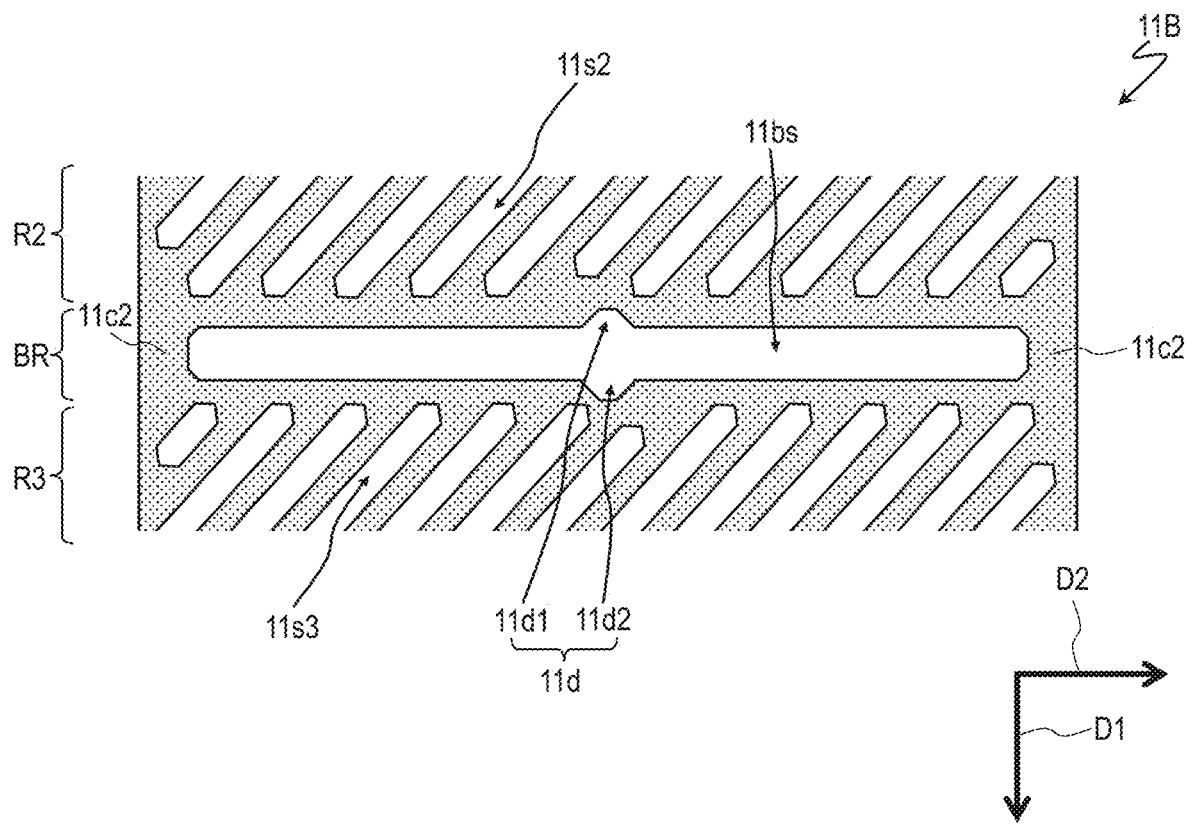
FIG. 11A is a plan view showing the neighborhood of the boundary region BR of a pixel electrode 11B according to Comparative Example 2.

FIG. 11A is a diagram showing the neighborhood of the boundary region BR of a pixel electrode 11B according to Comparative Example 2. In the pixel electrode 11B according to Comparative Example 2, the boundary region BR includes one boundary slit 11*bs*, one dent pattern 11*d*, and two second bridging portions 11*c*2. In other words, only one alignment stabilizing pattern is provided in the boundary region BR.

Figure 11B:
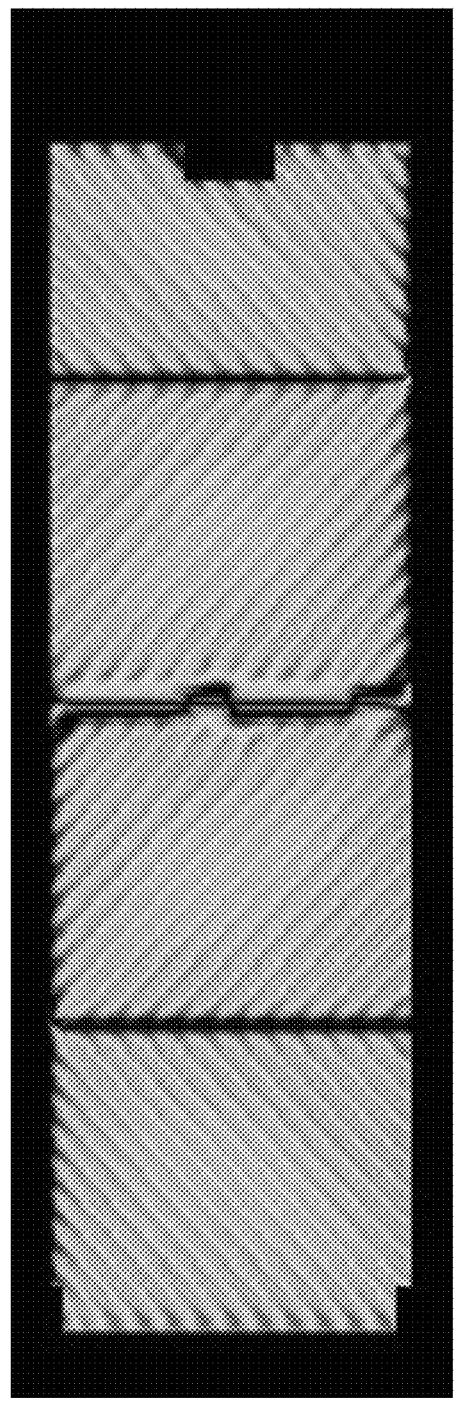
FIG. 11B is a diagram showing a transmittance distribution within the pixel P in a white displaying state, as resulting from a simulation in a case where the pixel electrode 11B according to Comparative Example 2 is used.

FIG. 11B shows a transmittance distribution within the pixel P in a case where the pixel electrode 11B according to Comparative Example 2 is used. From FIG. 11B, it can be seen that, in the boundary region BR, two discontinuous points exist above the boundary slit 11*bs*, in addition to one discontinuous point that is stabilized at a position corresponding to the alignment stabilizing pattern.

Thus, in the case where only one alignment stabilizing pattern is provided in the boundary region BR, unlike in the liquid crystal display apparatus 100 according to the present embodiment, new discontinuous points which are not stabilized by any alignment stabilizing patterns may occur above the boundary slit 11*bs*.

Moreover, in the liquid crystal display apparatus 100 according to the present embodiment, two types of alignment stabilizing patterns are alternately disposed in the boundary region BR, and the first bridging portions 11*cl*, rather than the dent pattern 11*d*, are provided in the outermost places along the pixel transverse direction D2. This configuration also contributes to suitable stabilization of discontinuous points.

Figure 12A:
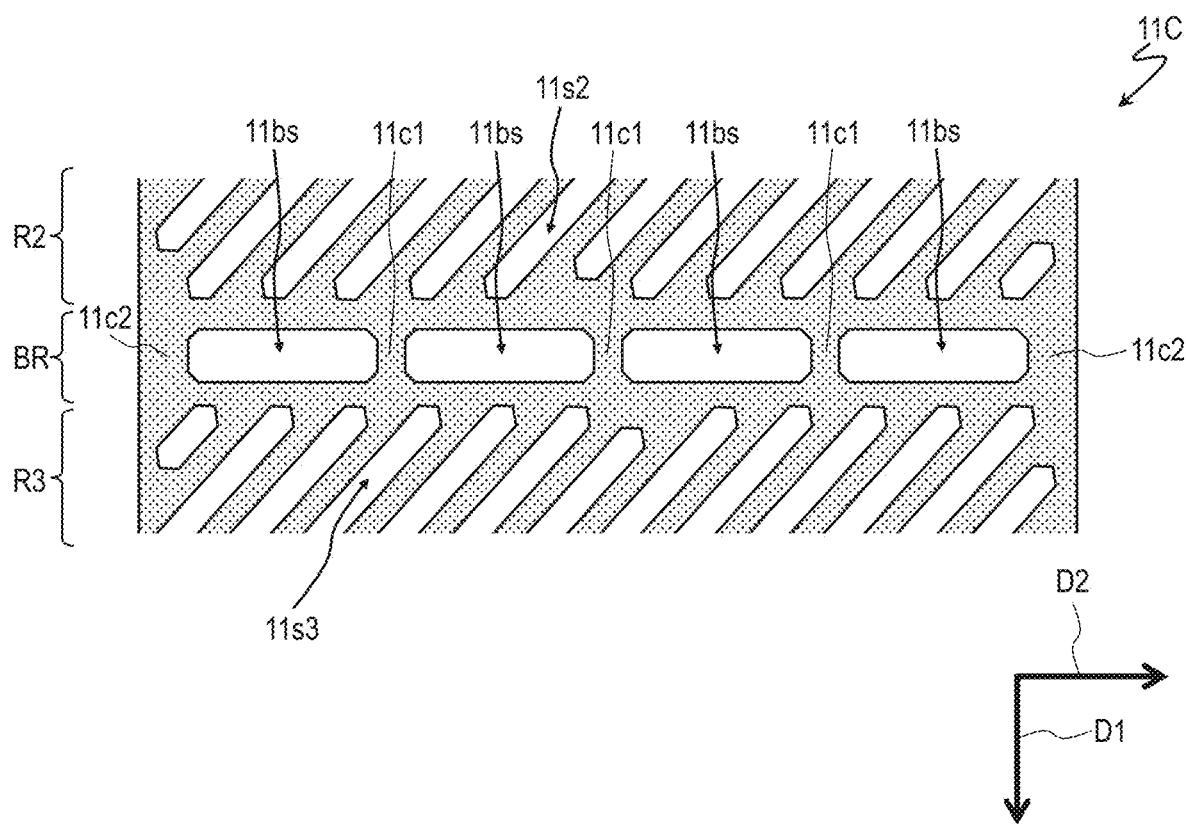
FIG. 12A is a plan view showing the neighborhood of the boundary region BR of a pixel electrode 11C according to Comparative Example 3.

FIG. 12A is a diagram showing the neighborhood of the boundary region BR of the pixel electrode 11C according to Comparative Example 3. In the pixel electrode 11C according to Comparative Example 3, the boundary region BR includes four boundary slits 11*bs*, three first bridging portions 11*c*1, and two second bridging portions 11*c*2. In other words, three alignment stabilizing patterns are provided in the boundary region BR. However, the three alignment stabilizing patterns are all first bridging portions 11*c*1 (i.e., one type of alignment stabilizing pattern), and it is not that two types of alignment stabilizing patterns are alternately provided.

Figure 12B:
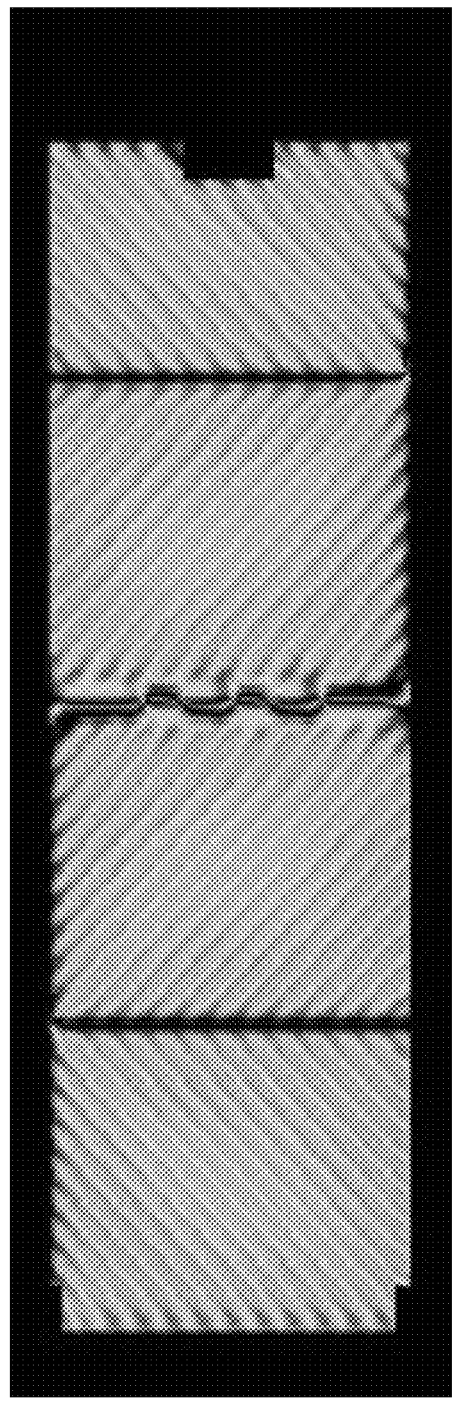
FIG. 12B is a diagram showing a transmittance distribution within the pixel P in a white displaying state, as resulting from a simulation in a case where the pixel electrode 11C according to Comparative Example 3 is used.

FIG. 12B shows a transmittance distribution within the pixel P in a case where the pixel electrode 11C according to Comparative Example 3 is used. From FIG. 12B, it can be seen that, in the boundary region BR, in addition to three discontinuous points that are stabilized at positions corresponding to three alignment stabilizing patterns, one discontinuous point exists above each of the second and third leftmost boundary slits 11*bs*.

Thus, in the case where a plurality of alignment stabilizing patterns of only a single type are provided in the boundary region BR, new discontinuous points may occur in between adjacent alignment stabilizing patterns. On the other hand, in the liquid crystal display apparatus 100 according to the present embodiment, an alternate provision of two types of alignment stabilizing patterns restrains discontinuous points from occurring in between adjacent alignment stabilizing patterns.

Figure 13A:
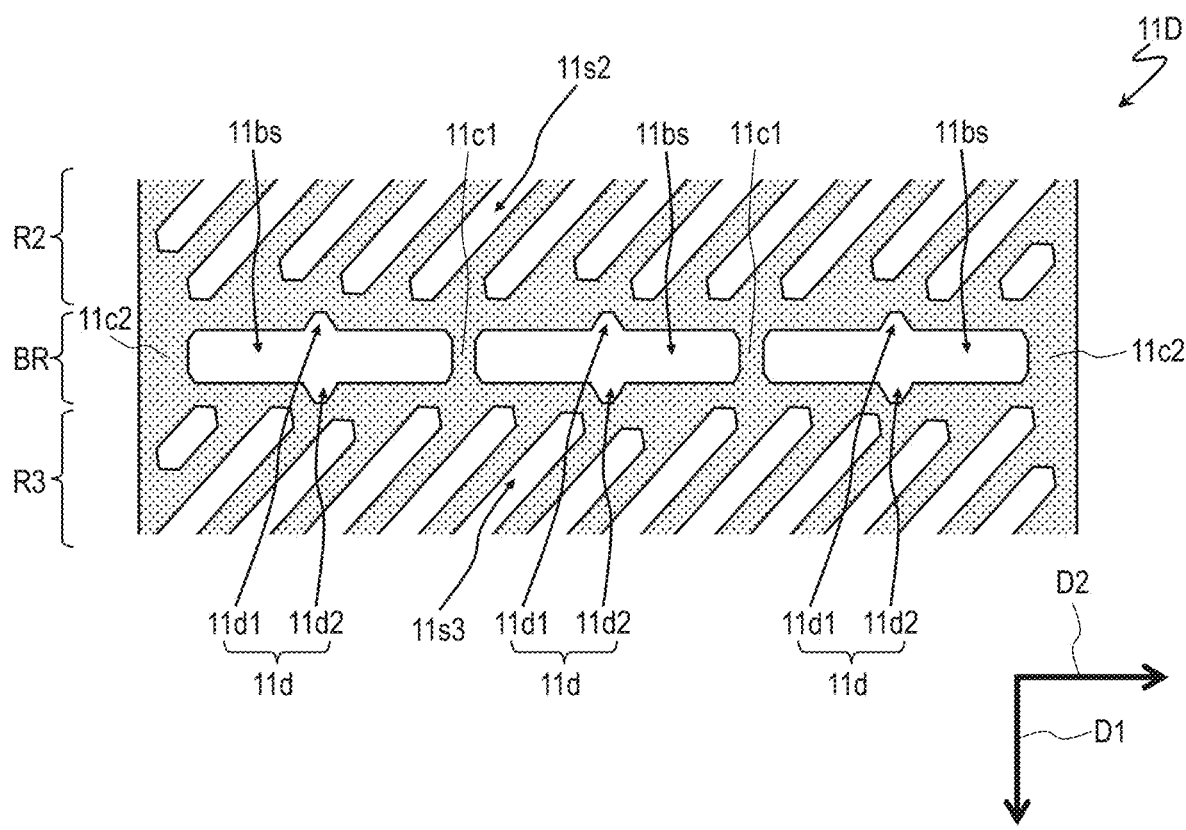
FIG. 13A is a plan view showing the neighborhood of the boundary region BR of a pixel electrode 11D according to Comparative Example 4.

FIG. 13A is a diagram showing the neighborhood of the boundary region BR of the pixel electrode 11D according to Comparative Example 4. In the pixel electrode 11D according to Comparative Example 4, the boundary region BR includes three boundary slits 11*bs*, two first bridging portions 11*c*1, three dent patterns 11*d*, and two second bridging portions 11*c*2. In other words, five alignment stabilizing patterns are provided in the boundary region BR. However, rather than the first bridging portions 11*c*1, the dent patterns 11*d* are provided in the outermost places along the pixel transverse direction D2.

Figure 13B:
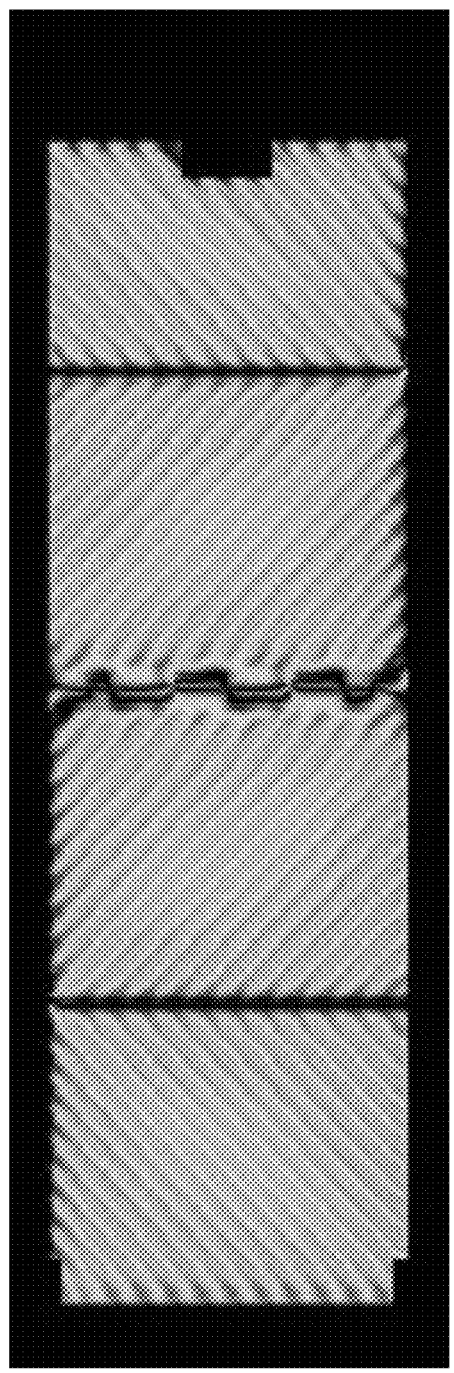
FIG. 13B is a diagram showing a transmittance distribution within the pixel P in a white displaying state, as resulting from a simulation in a case where the pixel electrode 11D according to Comparative Example 4 is used.

FIG. 13B shows a transmittance distribution within the pixel P in a case where a pixel electrode 11D according to Comparative Example 4 is used. From FIG. 13B, it can be seen that, in the boundary region BR, in addition to five discontinuous points that are stabilized at positions corresponding to five alignment stabilizing patterns, one discontinuous point exists above each of the leftmost and rightmost boundary slits 11*bs*.

Thus, in the case where the dent patterns 11*d* are provided in the outermost places along the pixel transverse direction D2, new discontinuous points may occur above the outermost boundary slits 11*bs*. On the other hand, in the liquid crystal display apparatus 100 according to the present embodiment, because the first bridging portions 11*cl* are disposed in the outermost places along the pixel transverse direction D2, alignment regulating forces (causing the liquid crystal molecules 31 to fall inwards into the pixel P) at ends of the pixel electrode 11 and the alignment regulating forces from the alignment stabilizing patterns in the outermost places along the pixel transverse direction match, thereby restraining discontinuous points from occurring above the outermost boundary slits 11*bs*.

As described above, in the liquid crystal display apparatus 100 according to the present embodiment, displaying problems associated with discontinuous points in liquid crystal alignment can be suitably suppressed.

FIG. 5 and other figures illustrate examples where the boundary region BR of the pixel electrode 11 includes three boundary slits 11*bs*, two first bridging portions 11*c*1, and one dent pattern 11*d*. However, the boundary region BR may include n boundary slits 11*bs* (where n is an integer equal to or greater than 3), (n-1) first bridging portions 11*c*1, and (n-2) dent patterns 11*d*; it is not that embodiments of the present invention are limited to the case where n=3. The boundary region BR may have a structure shown in FIG. 14A, for example. In the example shown in FIG. 14A, the boundary region BR includes four boundary slits 11*bs*, three first bridging portions 11*c*1, two second bridging portions 11*c*2, and two dent patterns 11*d* (i.e., n=4).

Figure 14A:
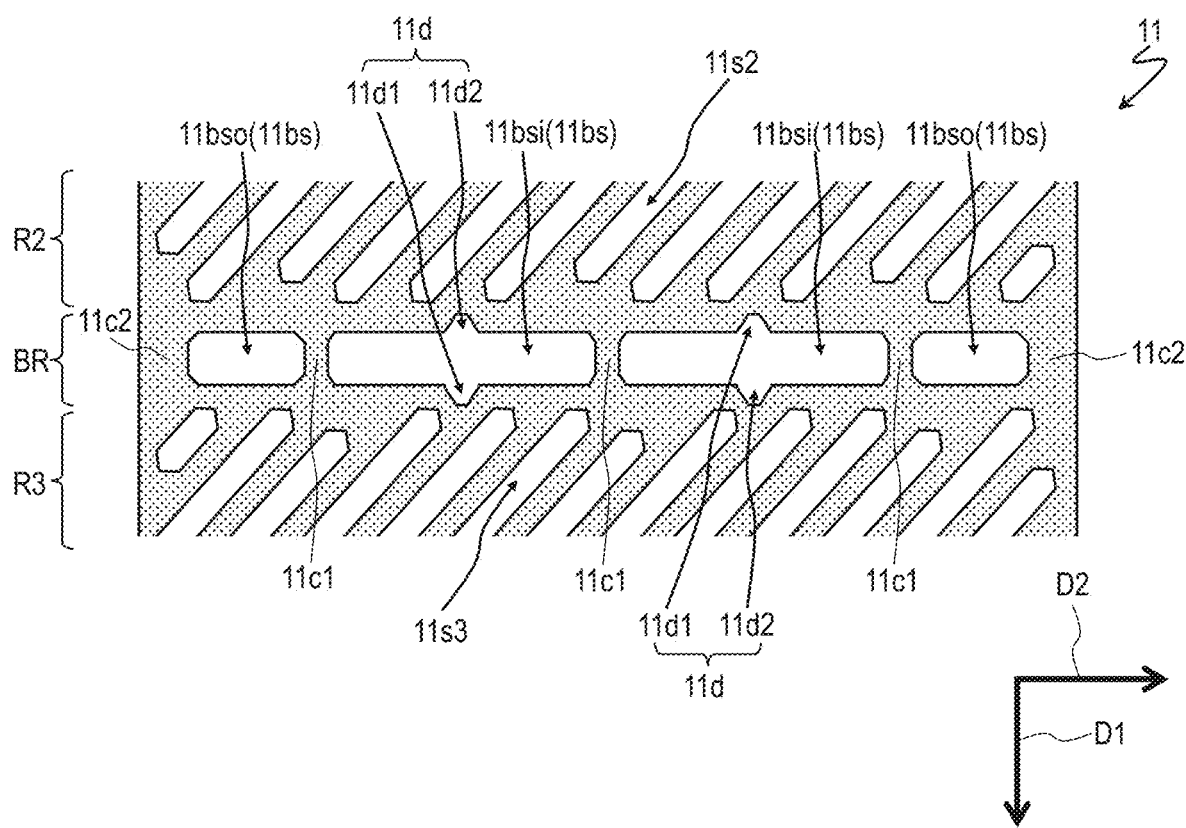
FIG. 14A is a plan view showing another example of the structure of the boundary region BR of the pixel electrode 11.
Figure 14B:
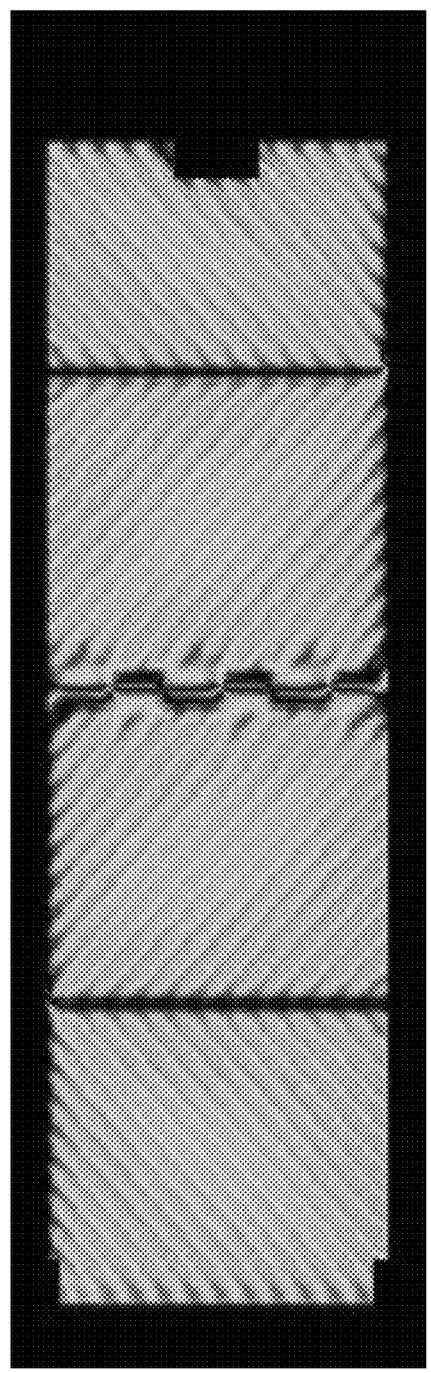
FIG. 14B is a diagram showing a transmittance distribution within the pixel P in a white displaying state, as resulting from a simulation in a case where the pixel electrode 11 shown in FIG. 14A is used.

FIG. 14B shows a transmittance distribution within the pixel P in a case where the pixel electrode 11 shown in FIG. 14A is used. From FIG. 14B, it can be seen that discontinuous points are stabilized at positions corresponding to the respective alignment stabilizing patterns (i.e., the three first bridging portions 11*cl* and the two dent patterns 11*d*) in the boundary region BR, while no discontinuous points exist in any positions other than above the alignment stabilizing patterns.

Figure 15:
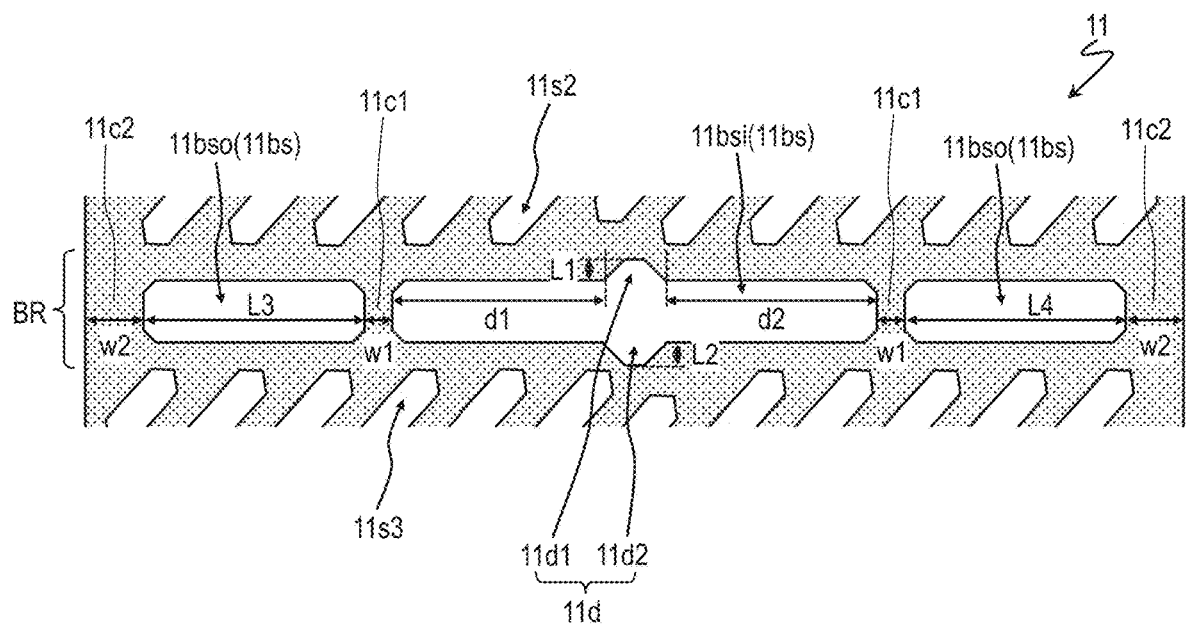
FIG. 15 is a plan view showing enlarged the neighborhood of a boundary region BR of the pixel electrode 11.

Now, with reference also to FIG. 15, a preferable structure for the boundary region BR of the pixel electrode 11 will be described.

Preferably, the respective distances d1 and d2 from a dent pattern 11*d* to two first bridging portions 11*c*1 that are adjacent to that dent pattern 11*d* are not less than 10 μm and not more than 30 μm. From the standpoint of realizing a high transmittance by reducing the total area of dark lines, distances d1 and d2 are preferably as large as possible; however, if the distances d1 and d2 are above 30 μm, discontinuous points may occur between the dent pattern 11*d* and the first bridging portions 11*c*1 that are adjacent thereto. On the other hand, if the distances d1 and d2 are below 10 μm, sufficient effect may not be obtained from the inner boundary slit 11*bsi*, and a loss of transmittance may result.

The smaller the width w1 of the first bridging portions 11*c*1 along the pixel transverse direction D2 is, the less disorderly the alignment is; but too small a width w1 may hinder manufacturing. Specifically, the width w1 of the first bridging portions 11*cl* is preferably not less than 2.5 μm and not more than 3.5 μm, and may be about 3 μm, for example.

From the standpoint of allowing the dent pattern 11*d* to adequately function as an alignment stabilizing pattern, the respective lengths L1 and L2 of the first dent 11*d*1 and the second dent 11*d*2 along the pixel longitudinal direction D1 are preferably 1.5 μm or more, and more preferably 2 μm or more.

As has already been described, the second bridging portions 11*c*2 do not function as alignment stabilizing patterns, but providing the second bridging portions 11*c*2 allows for more secure electrical connection between the second slitted region R2 and the third slitted region R3. In other words, the second bridging portions 11*c*2 may function as a redundant structure for electrical connection. From the standpoint of ensuring electrical connection, the width w2 of the second bridging portions 11*c*2 along the pixel transverse direction D2 is preferably 6.0 μm or more.

The respective lengths L3 and L4 of the two outer boundary slits 11*bso* along the pixel transverse direction D2 are preferably not less than 10 μm and not more than 30 μm for similar reasons to those described with respect to the distances d1 and d2.

From the standpoint of alignment stability, it is preferable that the aforementioned distances d1 and d2 and the lengths L3 and L4 are essentially equal (i.e., substantially d1=d2=L3=L4). In other words, when the plurality of boundary slits 11*bs* existing in the boundary region BR are to be regarded as one continuous slit, preferably that continuous slit is divided into essentially equal parts by the alignment stabilizing patterns.

Figure 16A:
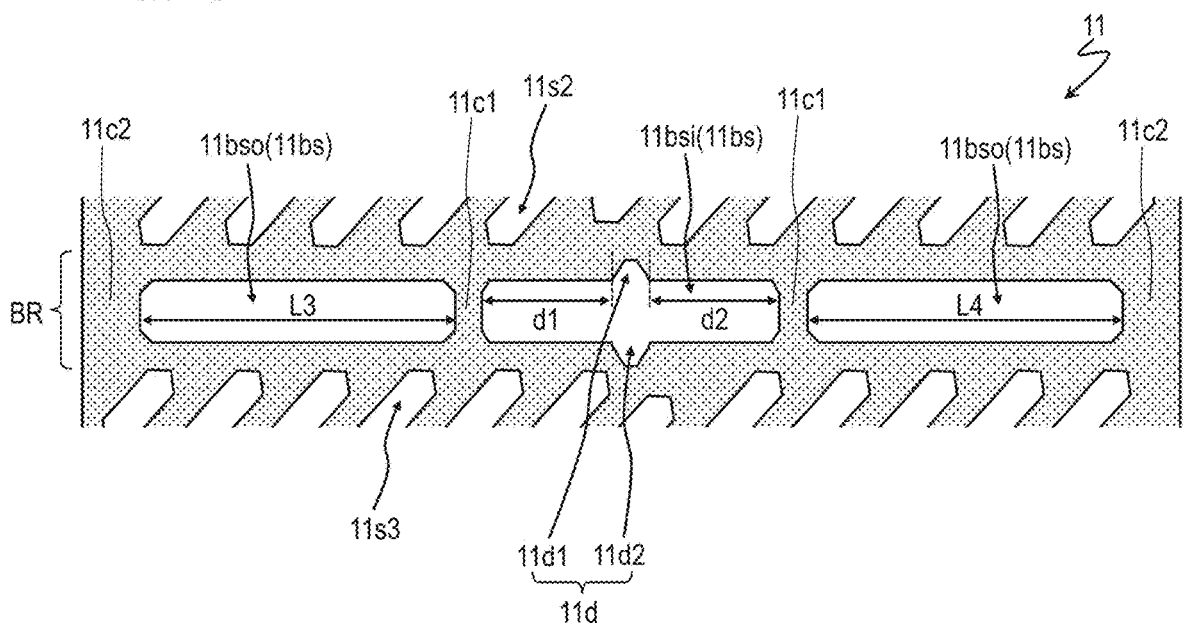
FIG. 16A is a plan view showing still another example of the structure of the boundary region BR of the pixel electrode 11.
Figure 16B:
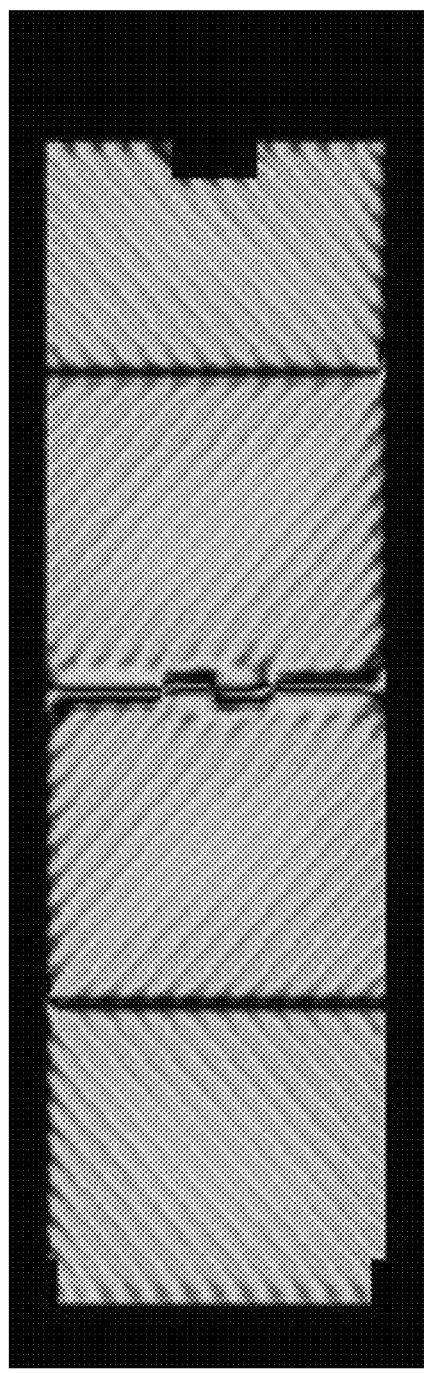
FIG. 16B is a diagram showing a transmittance distribution within the pixel P in a white displaying state, as resulting from a simulation in a case where the pixel electrode 11 shown in FIG. 16A is used.

However, shown in FIG. 16A, the alignment stabilizing patterns may not provide for an equal division. In the example shown in FIG. 16A, the lengths L3 and L4 are greater than the distances d1 and d2 (i.e., d1, d2<L3, L4). FIG. 16B shows a transmittance distribution within the pixel P in a case where the pixel electrode 11 shown in FIG. 16A is used. From FIG. 16B, it can be seen that discontinuous points are stabilized at positions corresponding to the respective alignment stabilizing patterns in the boundary region BR, while no discontinuous points exist in any positions other than above the alignment stabilizing patterns. Contrary to the example shown in FIG. 16A, the lengths L3 and L4 may be smaller than the distances d1 and d2 (i.e., d1, d2>L3, L4).

Embodiment 2

Figure 17:
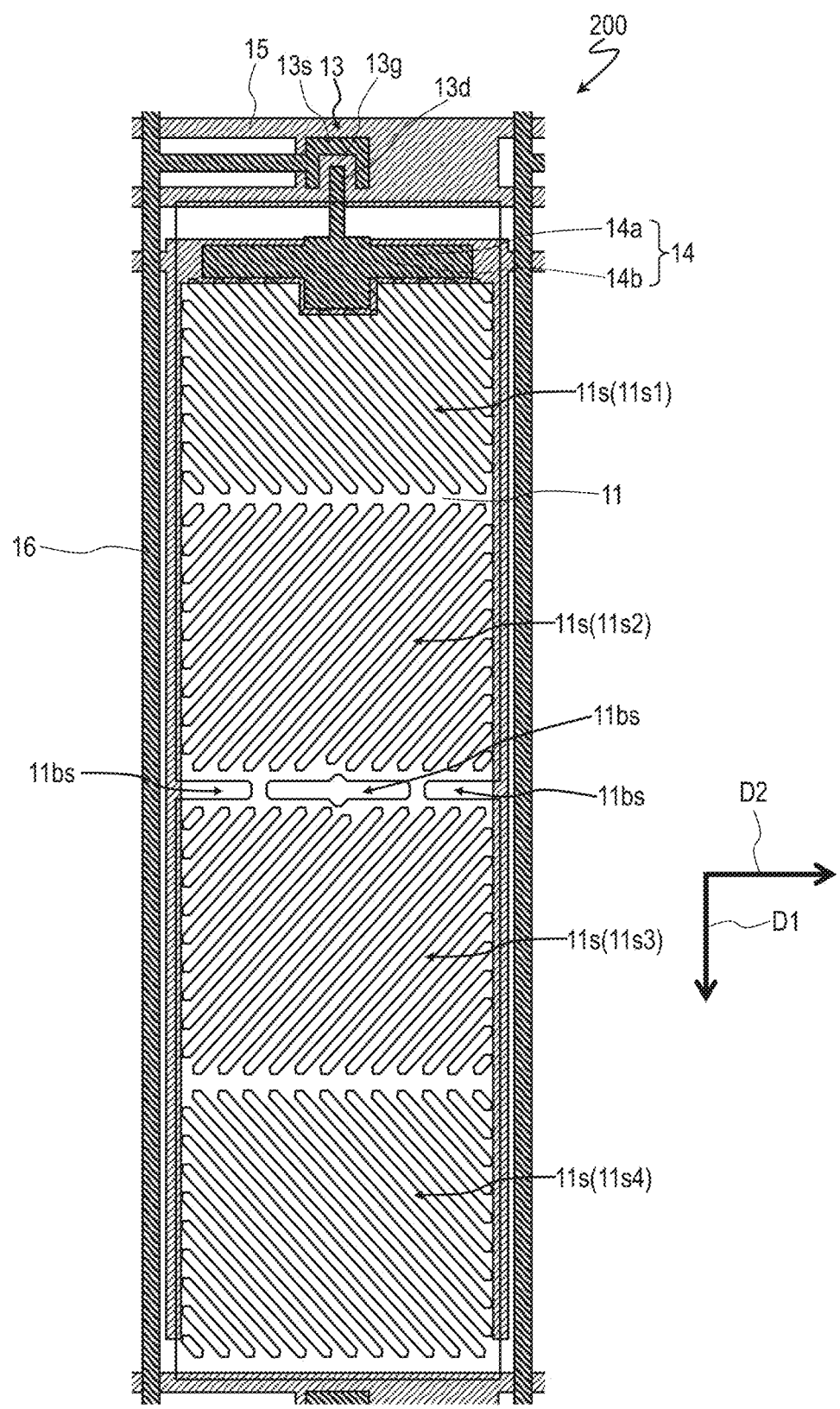
FIG. 17 is a plan view schematically showing another liquid crystal display apparatus 200 according to an embodiment of the present invention, showing a region corresponding to one pixel P.
Figure 18:
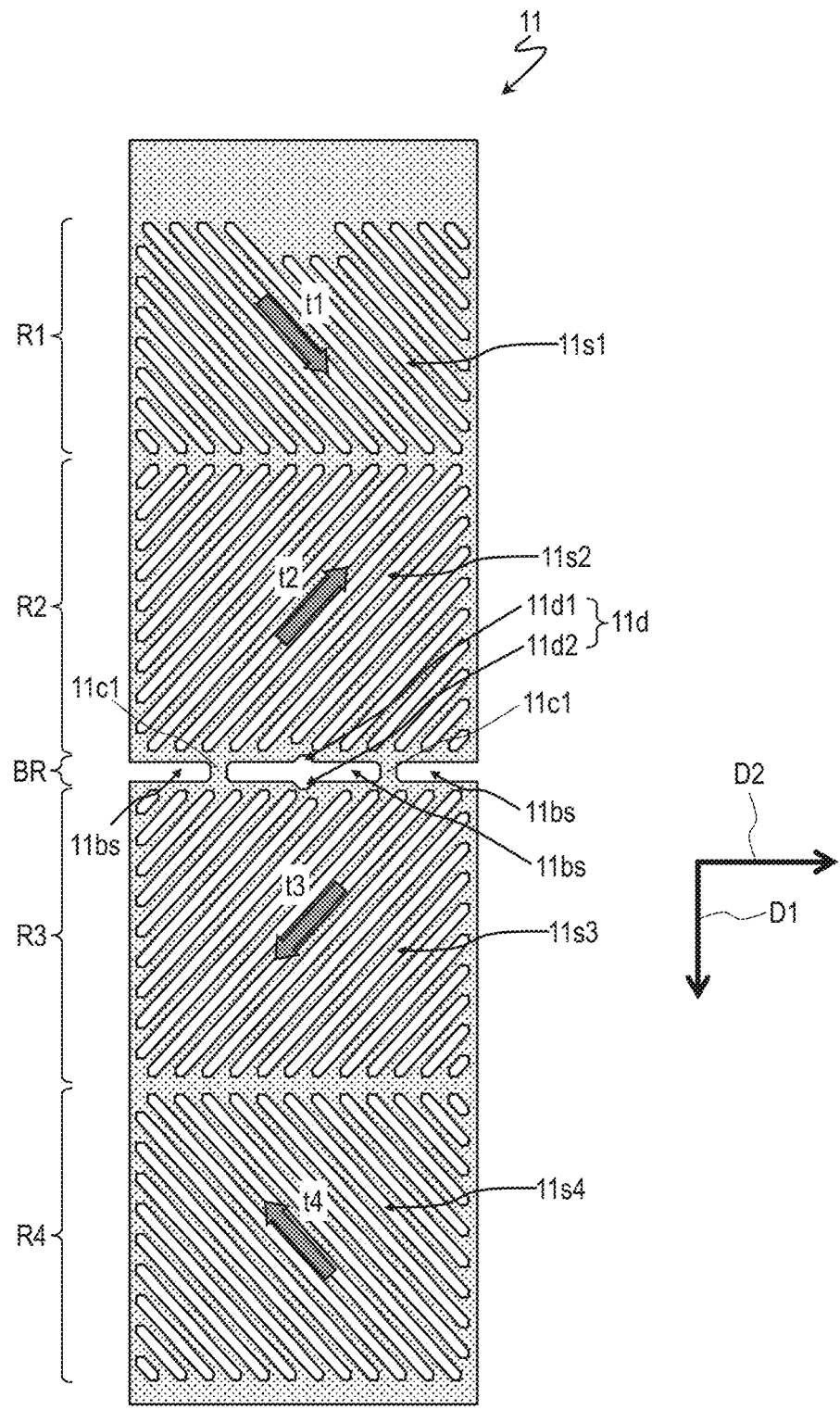
FIG. 18 is a plan view schematically showing a pixel electrode 11 of the liquid crystal display apparatus 200.
Figure 19:
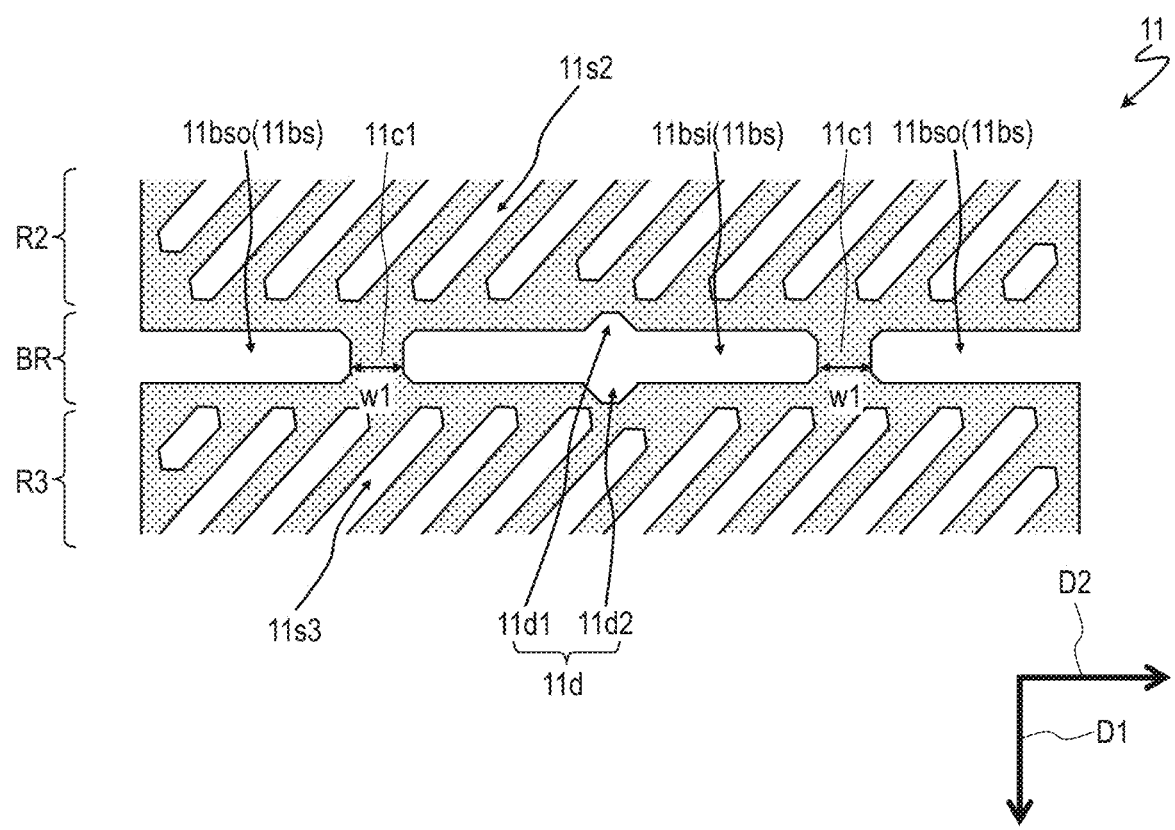
FIG. 19 is a plan view showing enlarged the neighborhood of a boundary region BR of the pixel electrode 11 of the liquid crystal display apparatus 200.

With reference to FIG. 17, FIG. 18, and FIG. 19, a liquid crystal display apparatus 200 according to the present embodiment will be described. FIG. 17 is a plan view showing a region corresponding to one pixel P of the liquid crystal display apparatus 200. FIG. 18 is a plan view showing a pixel electrode 11 of the liquid crystal display apparatus 200, and FIG. 19 is a diagram showing enlarged the neighborhood of a boundary region BR of the pixel electrode 11. In the following description, differences of the liquid crystal display apparatus 200 from the liquid crystal display apparatus 100 according to Embodiment 1 will mainly be described.

As shown in FIG. 17, FIG. 18, and FIG. 19, the liquid crystal display apparatus 200 differs from the liquid crystal display apparatus 100 according to Embodiment 1 in that the boundary region BR of the pixel electrode 11 does not include second bridging portions 11c2. Even though the second bridging portions 11c2 are omitted, as in the case of the liquid crystal display apparatus 100 according to Embodiment 1, the displaying problems associated with discontinuous points in liquid crystal alignment can be suppressed.

Figure 20:
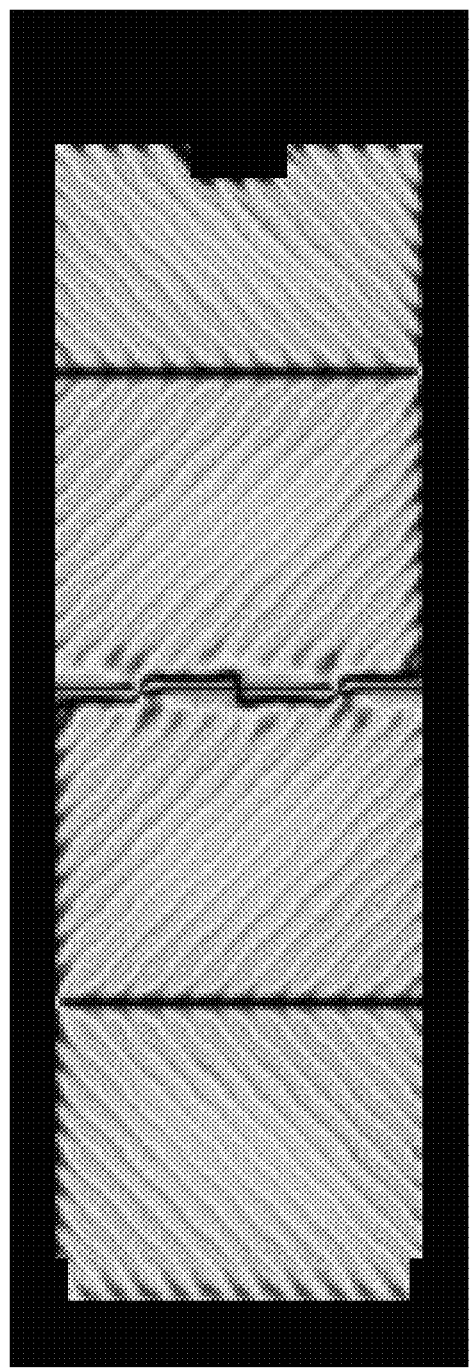
FIG. 20 is a diagram showing a transmittance distribution within the pixel P in a white displaying state, as resulting from a simulation with respect to the liquid crystal display apparatus 200.

FIG. 20 shows a transmittance distribution within one pixel P of the liquid crystal display apparatus 200 according to the present embodiment. From FIG. 20, it can be seen that discontinuous points are stabilized at positions corresponding to the respective alignment stabilizing patterns in the boundary region BR, while no discontinuous points exist in any positions other than above the alignment stabilizing patterns.

In the liquid crystal display apparatus 200 according to the present embodiment, the second bridging portions 11c2 are omitted. Therefore, from the standpoint of achieving more secure electrical connection between the second slitted region R2 and the third slitted region R3, the width w1 of the first bridging portions 11c1 along the pixel transverse direction D2 is preferably 6.0 μm or more.

Embodiment 3

Figure 21:
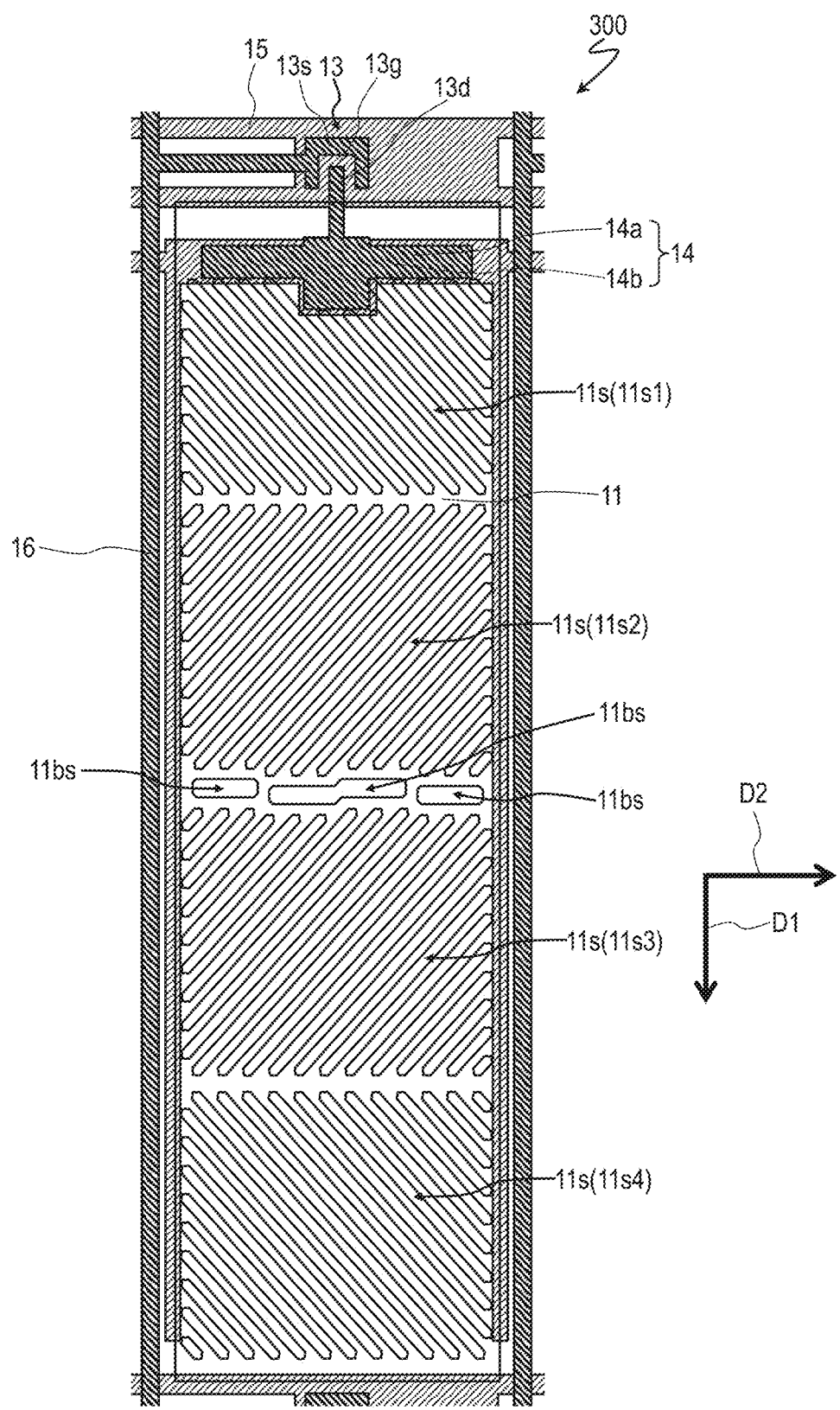
FIG. 21 is a plan view schematically showing still another liquid crystal display apparatus 300 according to an embodiment of the present invention, showing a region corresponding to one pixel P.
Figure 22:
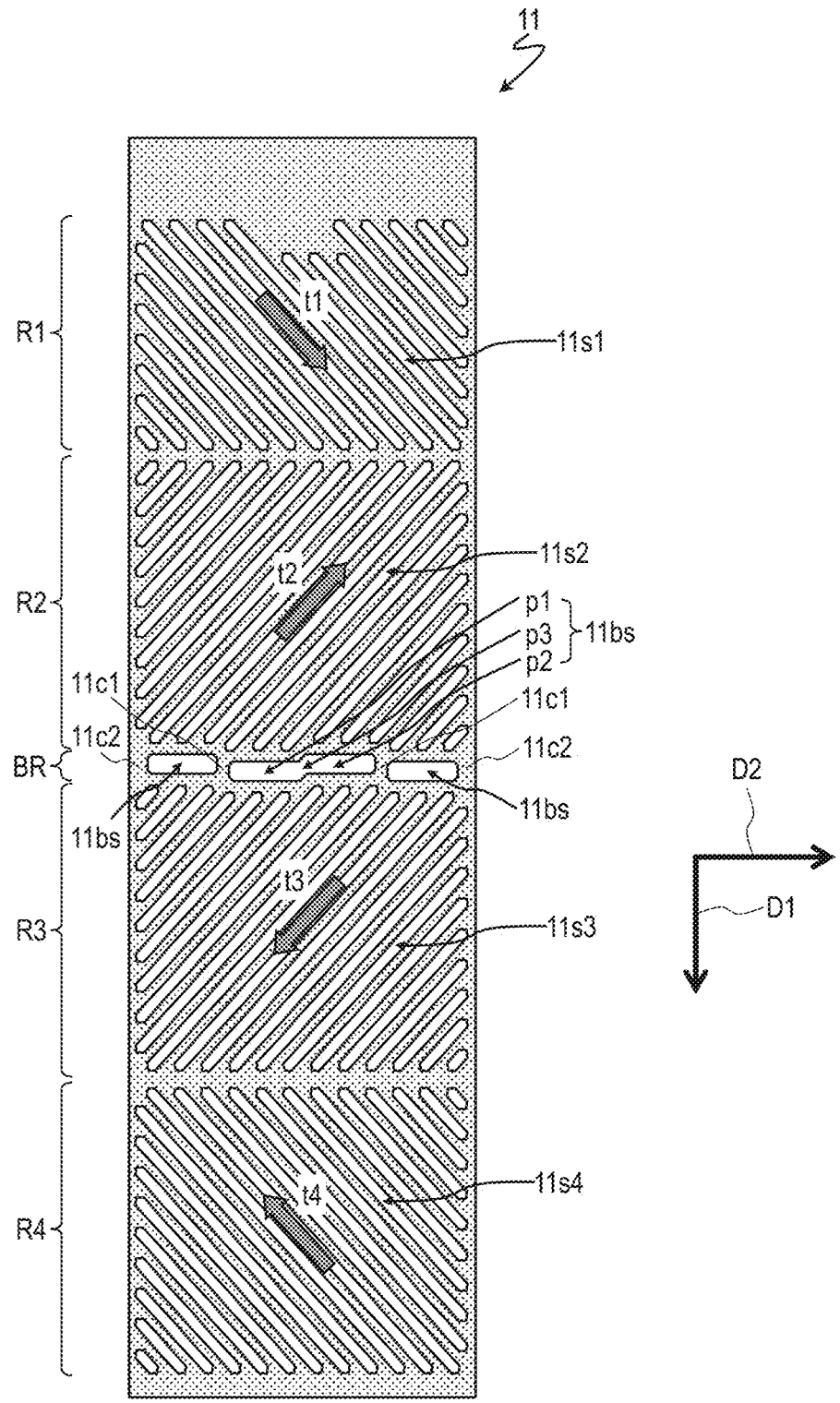
FIG. 22 is a plan view schematically showing a pixel electrode 11 of the liquid crystal display apparatus 300.
Figure 23:
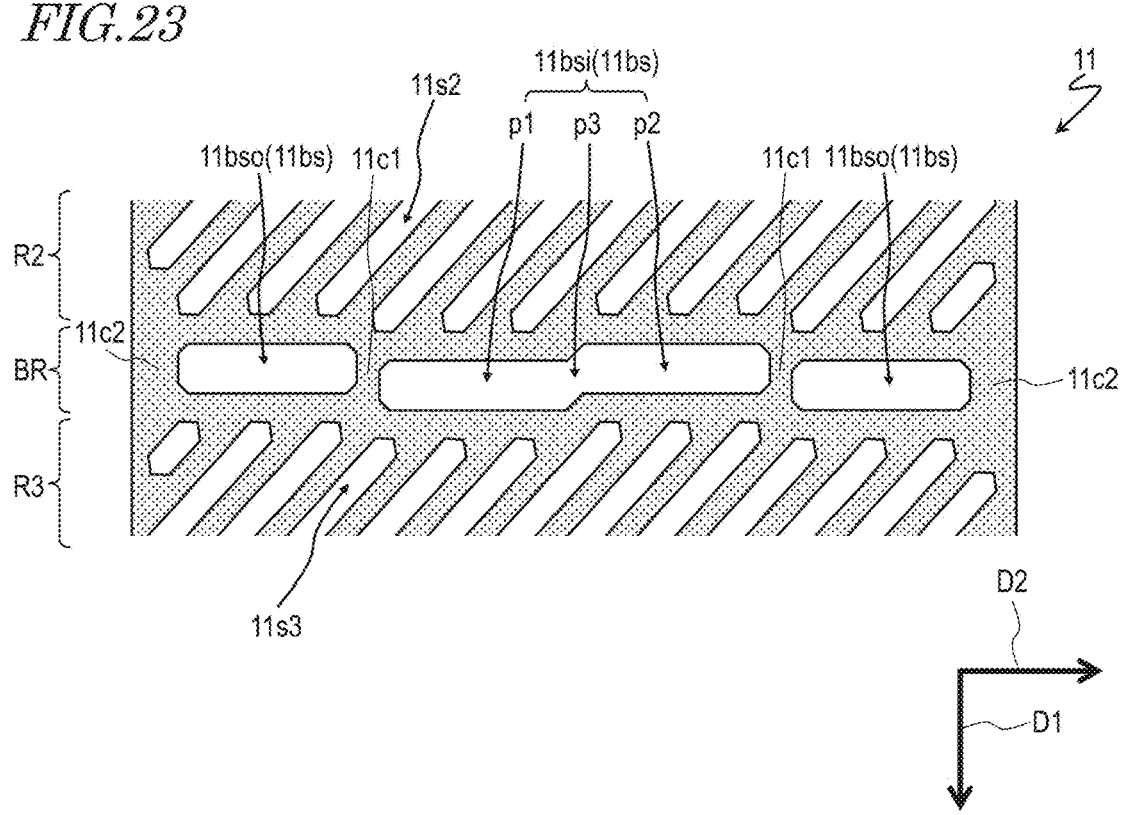
FIG. 23 is a plan view showing enlarged the neighborhood of a boundary region BR of the pixel electrode 11 of the liquid crystal display apparatus 300.

With reference to FIG. 21, FIG. 22, and FIG. 23, a liquid crystal display apparatus 300 according to the present embodiment will be described. FIG. 21 is a plan view showing a region corresponding to one pixel P of the liquid crystal display apparatus 300. FIG. 22 is a plan view showing a pixel electrode 11 of the liquid crystal display apparatus 300, and FIG. 23 is a diagram showing enlarged the neighborhood of a boundary region BR of the pixel electrode 11. In the following description, differences of the liquid crystal display apparatus 300 from the liquid crystal display apparatus 100 according to Embodiment 1 will mainly be described.

Similarly to the pixel electrode 11 of the liquid crystal display apparatus 100 according to Embodiment 1, the pixel electrode 11 of the liquid crystal display apparatus 300 according to the present embodiment includes a first slitted region R1, a second slitted region R2, a third slitted region R3, and a fourth slitted region R4, as well as the boundary region BR.

The boundary region BR of the pixel electrode 11 of the liquid crystal display apparatus 300 includes n boundary slits 11bs (where n is an integer equal to or greater than 3), (n-1) first bridging portions 11c1, and two second bridging portions 11c2. FIG. 21 and the associated figures illustrate a case where n=3. In other words, there are three boundary slits 11bs and two first bridging portions 11c1.

Each of the three boundary slits 11bs extends essentially in parallel to the pixel transverse direction D2. Moreover, three boundary slits 11bs are arranged along the pixel transverse direction D2.

Each of the two first bridging portions 11c1 is located between two adjacent boundary slits 11bs among the three boundary slits 11bs. The first bridging portions 11c1 interconnect the second slitted region R2 and the third slitted region R3.

The two second bridging portions 11c2 are located at opposite ends of the pixel electrode 11 along the pixel transverse direction D2. Similarly to the first bridging portions 11c1, the second bridging portions 11c2 interconnect the second slitted region R2 and the third slitted region R3.

Among the three boundary slits 11bs, a pair of boundary slits 11bso that are the outermost along the pixel transverse direction D2 are referred to as "outer boundary slits", whereas the other boundary slit 11bsi is referred to as an "inner boundary slit". The inner boundary slit 11bsi is located between two first bridging portions 11b1.

The inner boundary slit 11bsi includes a first portion p1 and a second portion p2 each extending along the pixel transverse direction D2. The second portion p2 adjoins the first portion p1 in essentially the 0° direction (i.e., on the right side in the figure). In other words, the first portion p1 is located relatively to the left, and the second portion p2 is located relatively to the right. Moreover, the second portion p2 is offset from the first portion p1 in terms of its position along the pixel longitudinal direction D1. More specifically, the position of the second portion p2 along the pixel longitudinal direction D1 is offset in the 90° direction (i.e., upward in the figure) from the first portion p1. The first portion p1 and the second portion p2 are connected by a connecting portion p3 that extends in a direction intersecting the pixel transverse direction D2. In the example shown, the connecting portion p3 is at a position which is in essentially the center of the inner boundary slit 11bsi along its length direction and which essentially bisects the inner boundary slit 11bsi.

Figure 24:
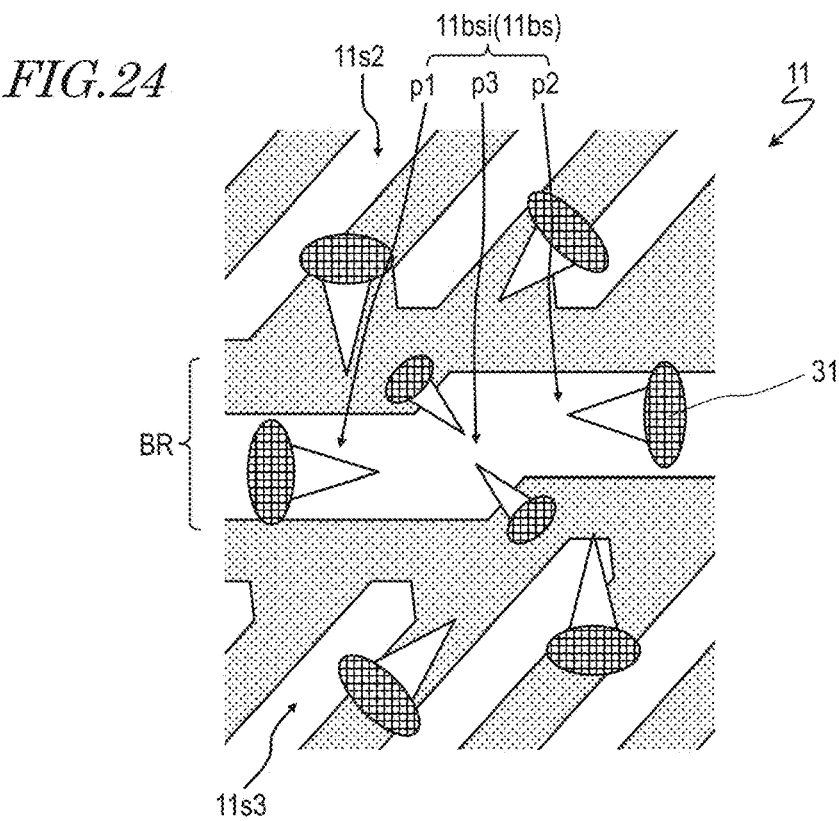
FIG. 24 is a diagram showing an alignment state of liquid crystal molecules 31 near a connecting portion p3 of an inner boundary slit 11bsi.

The structure in which the first portion p1 and the second portion p2 are offset can function as an alignment stabilizing pattern to stabilize discontinuous points in liquid crystal alignment, similarly to the dent pattern 11d. FIG. 24 shows an alignment state of liquid crystal molecules 31 near the connecting portion p3.

Figure 7B:
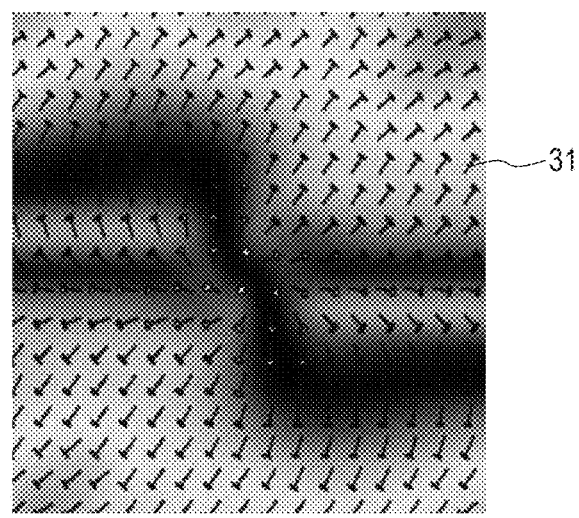
FIG. 7B is a diagram showing an alignment state of liquid crystal molecules 31 near a discontinuous point, regarding another of two types of discontinuous points in liquid crystal alignment.

As can be seen from FIG. 24, the structure in which the first portion p1 and the second portion p2 are offset (i.e., the region near the connecting portion p3) functions as an alignment stabilizing pattern to stabilize discontinuous points of the type shown in FIG. 7B. Hereinafter, the connecting portion p3 being located in the center of the alignment stabilizing pattern is also referred to as the "offset portion". In a way, it is this offset portion p3 that functions as the alignment stabilizing pattern.

In the liquid crystal display apparatus 300 according to the present embodiment, because three alignment stabilizing patterns (i.e., the two first bridging portions 11*cl* and one offset portion p3) are provided in the boundary region BR of the pixel electrode 11, it is possible to suitably stabilize the discontinuous point (or restrain unstabilized discontinuous points from occurring) even when the pixel size is relatively large.

Figure 25:
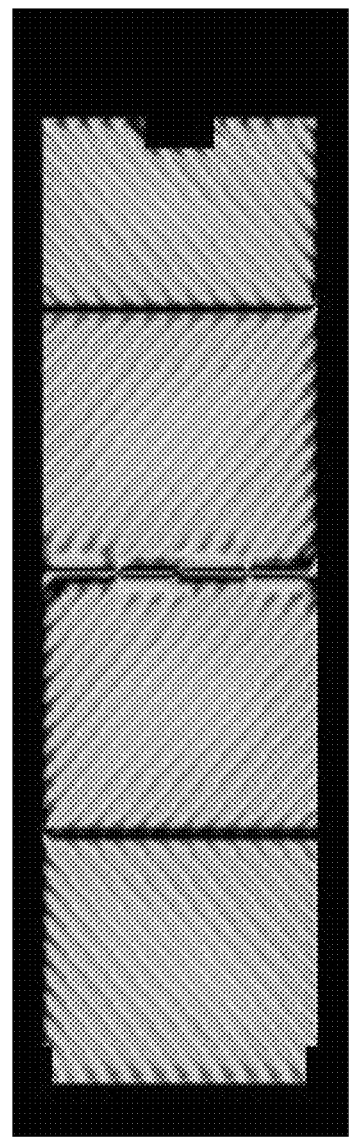
FIG. 25 is a diagram showing a transmittance distribution within the pixel P in a white displaying state, as resulting from a simulation with respect to the liquid crystal display apparatus 300.

FIG. 25 shows a transmittance distribution within one pixel P of the liquid crystal display apparatus 300 according to the present embodiment. From FIG. 25, it can be seen that discontinuous points are stabilized at positions corresponding to the respective alignment stabilizing patterns in the boundary region BR, while no discontinuous points exist in any positions other than above the alignment stabilizing patterns.

Figure 26A:
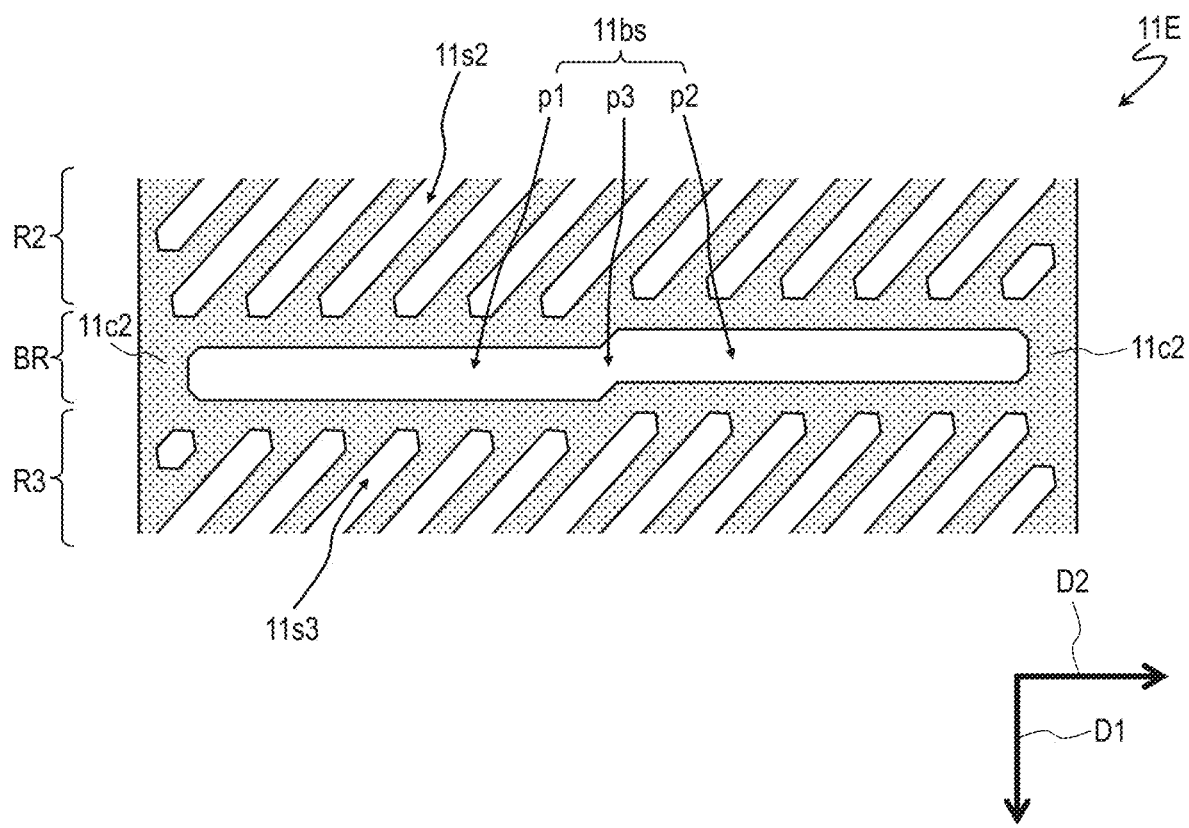
FIG. 26A is a plan view showing the neighborhood of the boundary region BR of a pixel electrode 11E according to Comparative Example 5.

FIG. 26A is a diagram showing the neighborhood of the boundary region BR of the pixel electrode 11E according to Comparative Example 5. In the pixel electrode 11E according to Comparative Example 5, the boundary region BR includes one boundary slit 11*bs* and two second bridging portions 11*c*2, with an offset portion p3 being provided in the boundary slit 11*bs*. In other words, only one alignment stabilizing pattern is provided in the boundary region BR.

Figure 26B:
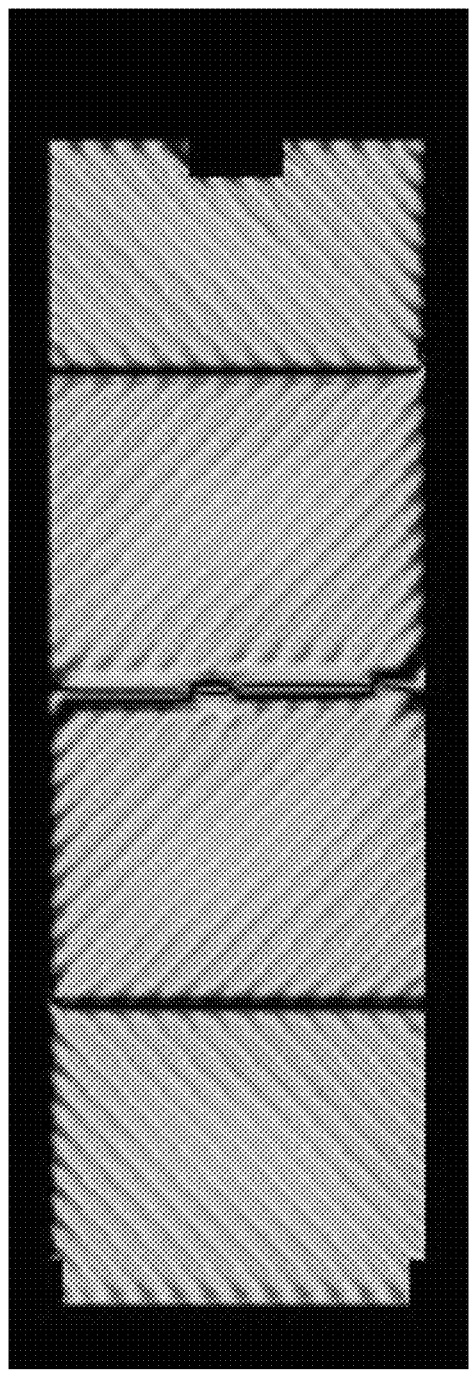
FIG. 26B is a diagram showing a transmittance distribution within the pixel P in a white displaying state, as resulting from a simulation in a case where the pixel electrode 11E according to Comparative Example 5 is used.

FIG. 26B shows a transmittance distribution within the pixel P in a case where the pixel electrode 11E according to Comparative Example 5 is used. From FIG. 26B, it can be seen that, in the boundary region BR, two discontinuous points exist above the boundary slit 11*bs*, in addition to one discontinuous point that is stabilized at a position corresponding to the alignment stabilizing pattern.

Thus, in the case where only one alignment stabilizing pattern is provided in the boundary region BR, unlike in the liquid crystal display apparatus 300 according to the present embodiment, new discontinuous points which are not stabilized by any alignment stabilizing patterns may occur above the boundary slit 11*bs*.

Moreover, in the liquid crystal display apparatus 300 according to the present embodiment, types of alignment stabilizing patterns are alternately disposed in the boundary region BR, and the first bridging portions 11*c*1, rather than the offset portion p3, are provided in the outermost places along the pixel transverse direction D2. This configuration also contributes to suitable stabilization of discontinuous points.

Figure 27A:
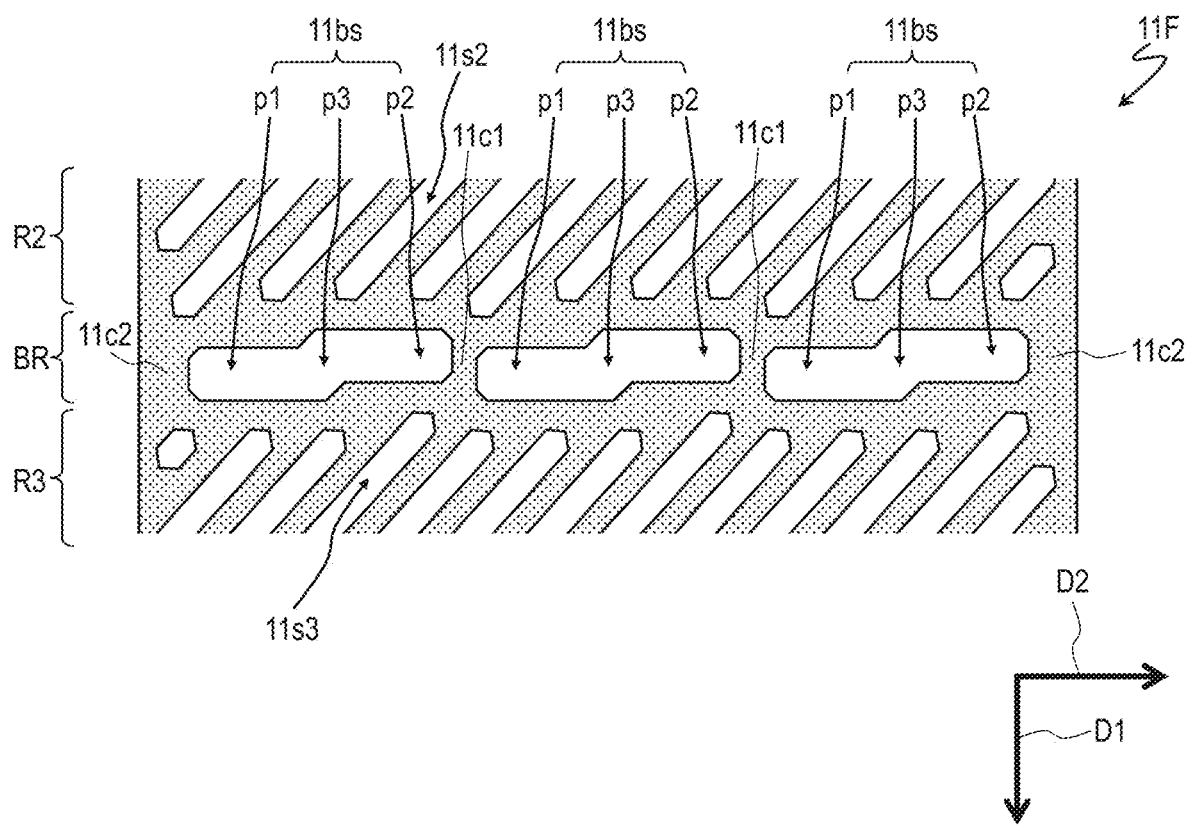
FIG. 27A is a plan view showing the neighborhood of the boundary region BR of a pixel electrode 11F according to Comparative Example 6.

FIG. 27A is a diagram showing the neighborhood of the boundary region BR of the pixel electrode 11F according to Comparative Example 6. In the pixel electrode 11F according to Comparative Example 6, the boundary region BR includes three boundary slits 11*bs*, two first bridging portions 11*c*1, and two second bridging portions 11*c*2, with an offset portion p3 being provided in each boundary slit 11*bs*. In other words, five alignment stabilizing patterns are provided in the boundary region BR. However, the offset portions p3, rather than the first bridging portions 11*c*1, are provided in the outermost places along the pixel transverse direction D2.

Figure 27B:
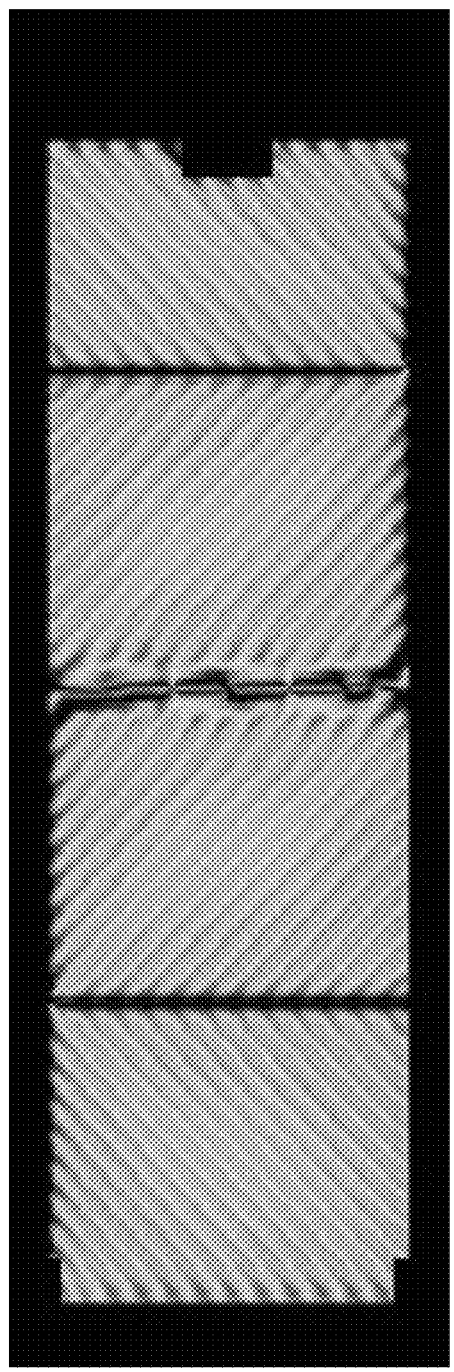
FIG. 27B is a diagram showing a transmittance distribution within the pixel P in a white displaying state, as resulting from a simulation in a case where the pixel electrode 11F according to Comparative Example 6 is used.

FIG. 27B shows a transmittance distribution within the pixel P in a case where the pixel electrode 11F according to Comparative Example 6 is used. From FIG. 27B, it can be seen that, in the boundary region BR, one discontinuous point exists above the right boundary slit 11*bs*, in addition to five discontinuous points that are stabilized at positions corresponding to five alignment stabilizing patterns.

Thus, in the case where offset portions p3 are disposed in the outermost places along the pixel transverse direction D2, new discontinuous point may occur above the outermost boundary slits 11*bs*. On the other hand, in the liquid crystal display apparatus 300 according to the present embodiment, because the first bridging portions 11*c*1 are provided in the outermost places along the pixel transverse direction D2, alignment regulating forces (causing the liquid crystal molecules 31 to fall inwards into the pixel P) at ends of the pixel electrode 11 and the alignment regulating forces from the alignment stabilizing patterns in the outermost places along the pixel transverse direction D2 match up to restrain discontinuous points from occurring above the outermost boundary slits 11*bs*.

As described above, in the liquid crystal display apparatus 300 according to the present embodiment, displaying problems associated with discontinuous points in liquid crystal alignment can be suitably suppressed. As can be seen from a comparison between FIG. 9 and FIG. 25, in the liquid crystal display apparatus 300 according to the present embodiment, the width of the double dark lines occurring in the boundary region BR is more reduced than in the liquid crystal display apparatus 100 according to Embodiment 1, whereby a further improvement in transmittance can be obtained. Therefore, even when wiring lines made of a metal material are to be disposed in the boundary region BR, the double dark lines will be well within the width of each such wiring line, whereby losses of transmittance can be minimized.

FIG. 22 and the associated figures illustrate an example where the boundary region BR of the pixel electrode 11 includes three boundary slits 11*bs*, two first bridging portions 11*c*1, and one offset portion p3. However, the boundary region BR may include n boundary slits 11*bs* (where n is an integer equal to or greater than 3), (n-1) first bridging portions 11*c*1, and (n-2) offset portions p3; it is not that embodiments of the present invention are limited to the case where n=3. The boundary region BR may have a structure shown in FIG. 28A, for example. In the example shown in FIG. 28A, the boundary region BR includes four boundary slits 11*bs*, three first bridging portions 11*c*1, two second bridging portions 11*c*2, and two offset portions p3 (i.e., n=4).

Figure 28A:
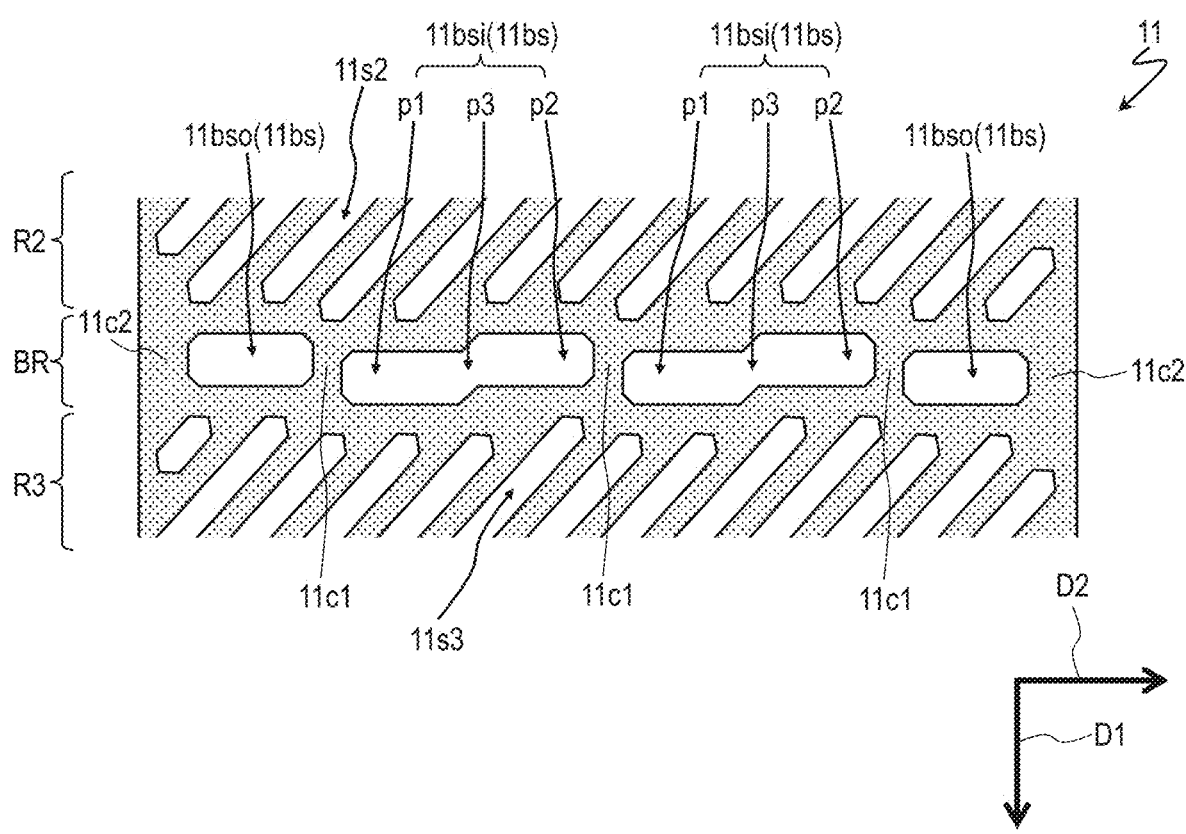
FIG. 28A is a plan view showing another example of the structure of the boundary region BR of the pixel electrode 11 of the liquid crystal display apparatus 300.
Figure 28B:
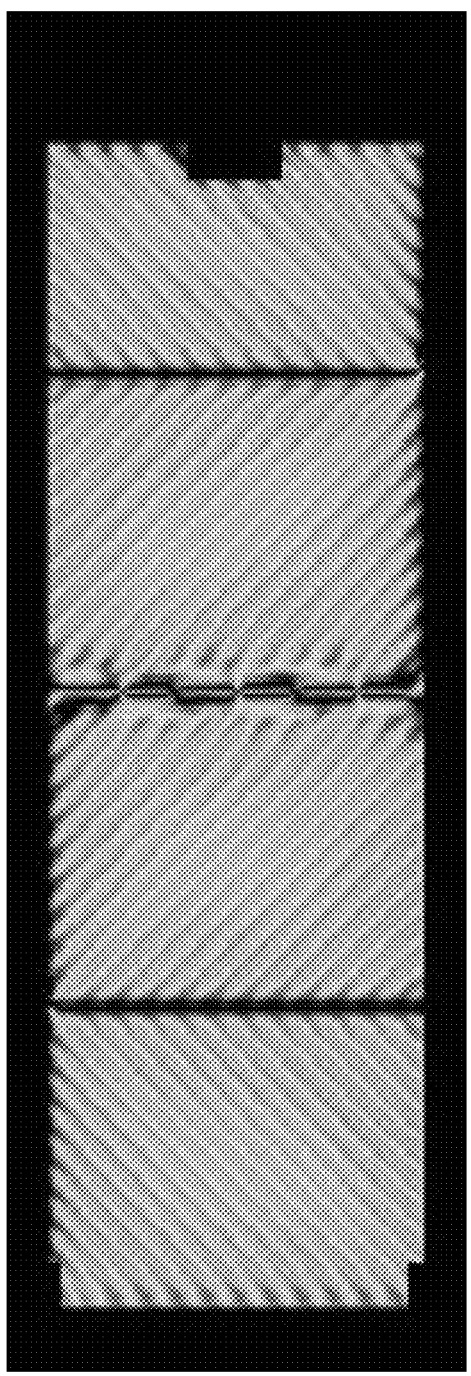
FIG. 28B is a diagram showing a transmittance distribution within the pixel P in a white displaying state, as resulting from a simulation in a case where the pixel electrode 11 shown in FIG. 28A is used.

FIG. 28B shows a transmittance distribution within the pixel P in a case where the pixel electrode 11 shown in FIG. 28A is used. From FIG. 28B, it can be seen that discontinuous points are stabilized at positions corresponding to the respective alignment stabilizing patterns (i.e., the three first bridging portions 11*cl* and the two offset portions P3) in the boundary region BR, while no discontinuous points exist in any positions other than above the alignment stabilizing patterns.

What is illustrated here is an example where the azimuth of the director t2 of the second liquid crystal domain (liquid crystal domain B) is essentially the 45° direction and the azimuth of the director t3 of the third liquid crystal domain (liquid crystal domain C) is essentially the 225° direction; in such cases, in order for the offset portions Ps of the inner boundary slit 11*bsi* to suitably function as alignment stabilizing patterns, it is preferable that the position of the second portion p2 along the pixel longitudinal direction D1 is offset in the 90° direction from the first portion p1.

Figure 29A:
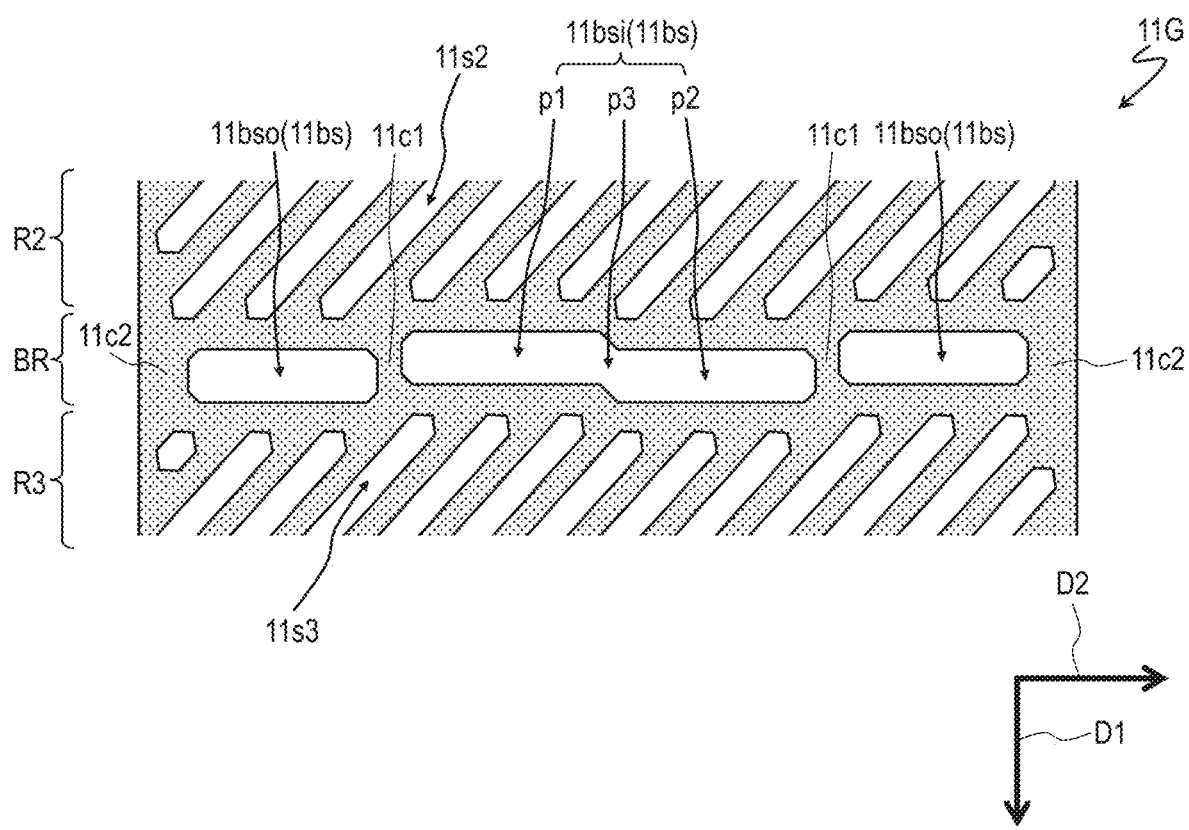
FIG. 29A is a plan view showing the neighborhood of the boundary region BR of a pixel electrode 11G of Comparative Example 7.

FIG. 29A is a diagram showing the neighborhood of the boundary region BR of the pixel electrode 11G of Comparative Example 7. In the pixel electrode 11G of Comparative Example 7, the position of the second portion p2 of the inner boundary slit 11*bsi* along the pixel longitudinal direction D1 is offset in the 270° direction (i.e., downward in the figure) from the first portion p1.

Figure 29B:
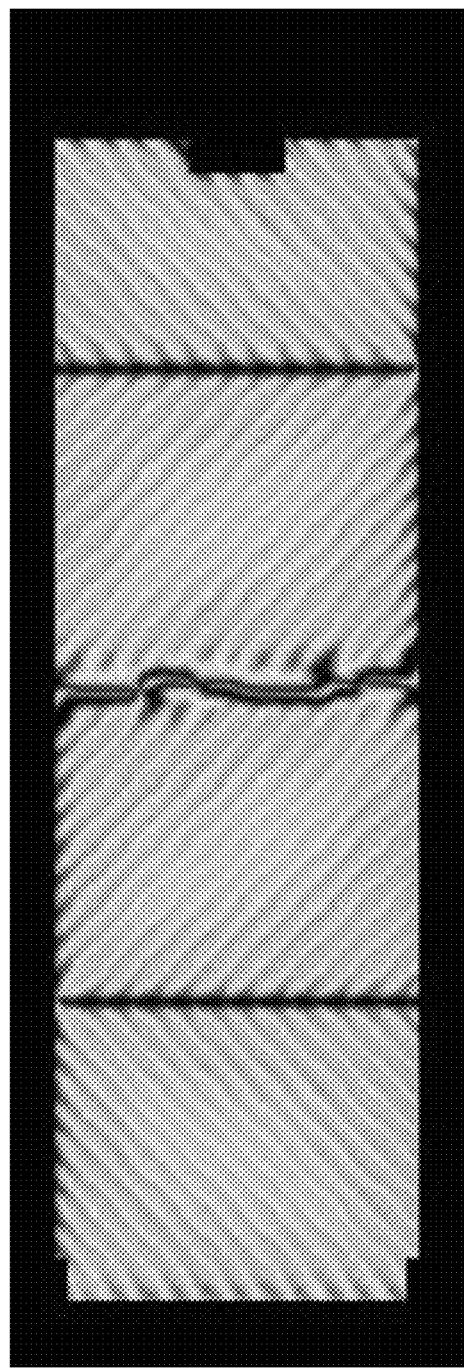
FIG. 29B is a diagram showing a transmittance distribution within the pixel P in a white displaying state, as resulting from a simulation in a case where the pixel electrode 11G of Comparative Example 7 is used.

FIG. 29B shows a transmittance distribution within the pixel P in a case where the pixel electrode 11G of Comparative Example 7 is used. From FIG. 29B, it can be seen that, in the inner boundary slit 11*bsi*, the discontinuous point is not stabilized at a position corresponding to the offset portion P3.

Figure 30:
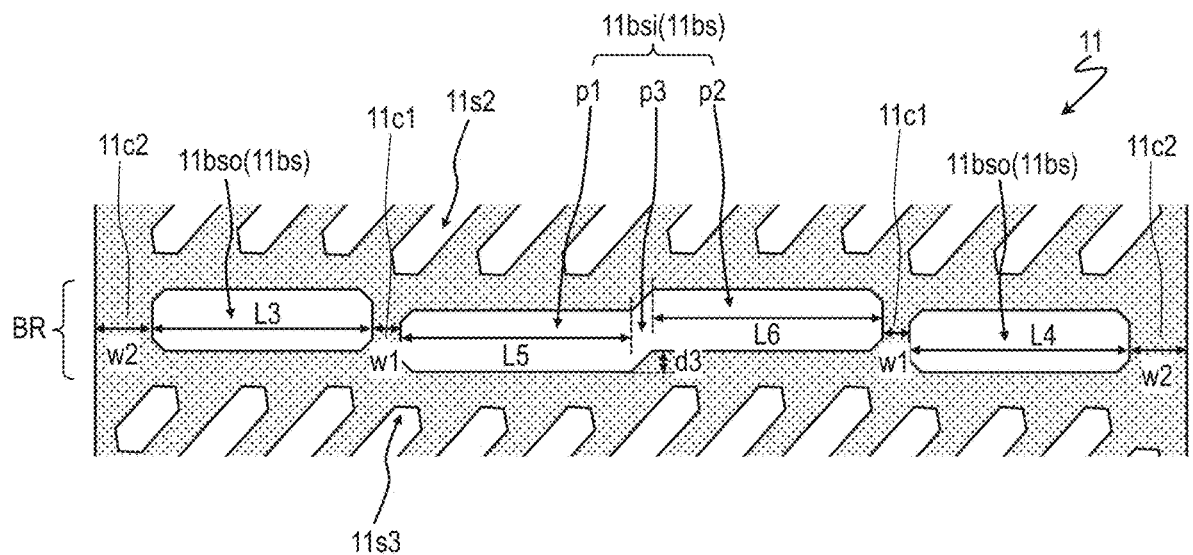
FIG. 30 is a plan view showing enlarged the neighborhood of a boundary region BR of the pixel electrode 11 of the liquid crystal display apparatus 300.

Now, with reference also to FIG. 30, a preferable structure for the boundary region BR of the pixel electrode 11 will be described.

The respective lengths L5 and L6 of the first portion p1 and second portion p2 of the inner boundary slit 11*bsi* along the pixel transverse direction D2 are preferably not less than 10 µm and not more than 30 µm. From the standpoint of realizing a high transmittance by reducing the total area of dark lines, the lengths L5 and L6 are preferably as large as possible; however, if the lengths L5 and L6 are above 30 µm, discontinuous points may occur between the offset portion P3 and the first bridging portions 11*c*1 that are adjacent thereto. On the other hand, if the lengths L5 and L6 are below 10 µm, sufficient effect may not be obtained from the inner boundary slit 11*bsi*, and a loss of transmittance may result.

The smaller the width w1 of the first bridging portions 11*c*1 along the pixel transverse direction D2 is, the less disorderly the alignment is; but too small a width w1 may hinder manufacturing. Specifically, the width w1 of the first bridging portions 11*c*1 is preferably not less than 2.5 µm and not more than 3.5 µm, and may be about 3 µm, for example.

From the standpoint of allowing offset portion p3 of the inner boundary slit 11*bsi* to adequately function as an alignment stabilizing pattern, the amount of offset d3 in position between the first portion p1 and the second portion p2 along the pixel longitudinal direction D1 is preferably 1.5 µm or more, and more preferably 2 µm or more.

As has already been described, the second bridging portions 11*c*2 do not function as alignment stabilizing patterns, but providing the second bridging portions 11*c*2 allows for more secure electrical connection between the second slitted region R2 and the third slitted region R3. In other words, the second bridging portions 11*c*2 may function as a redundant structure for electrical connection. From the standpoint of ensuring electrical connection, the width w2 of the second bridging portions 11*c*2 along the pixel transverse direction D2 is preferably 6.0 µm or more.

The respective lengths L3 and L4 of the two outer boundary slits 11*bso* along the pixel transverse direction D2 are preferably not less than 10 µm and not more than 30 µm, for similar reasons to those described with respect to the lengths L5 and L6.

From the standpoint of alignment stability, it is preferable that the aforementioned lengths L3, L4, L5 and L6 are essentially equal (i.e., substantially L3=L4=L5=L6). In other words, when the plurality of boundary slits 11*bs* existing in the boundary region BR are to be regarded as one continuous slit, preferably that continuous slit is divided into essentially equal parts by the alignment stabilizing patterns. However, the alignment stabilizing patterns may not provide for an equal division. For example, the lengths L3 and L4 may be greater than the lengths L5 and L6 (i.e., L5, L6<L3, L4), or the lengths L3 and L4 may be smaller than the lengths L5 and L6 (i.e., L5, L6>L3, L4).

Moreover, the second bridging portions 11*c*2 may be omitted. Even if the second bridging portions 11*c*2 are omitted, displaying problems associated with discontinuous points in liquid crystal alignment can be suppressed.

In the case where the second bridging portions 11*c*2 are omitted, from the standpoint of achieving more secure electrical connection between the second slitted region R2 and the third slitted region R3, the width w1 of each first bridging portion 11*c*1 along the pixel transverse direction D2 is preferably 6.0 µm or more.

[Other Domain Arrangements]

The arrangement of liquid crystal domains within the pixel P is not limited to the example shown in FIG. 2. In the example shown in FIG. 2, along the longitudinal direction D1 of the pixel, the liquid crystal domain A (whose reference alignment direction is essentially the 315° direction), the liquid crystal domain B (whose reference alignment direction is essentially the 45° direction), the liquid crystal domain C (whose reference alignment direction is essentially the 225° direction), and the liquid crystal domain D (whose reference alignment direction is essentially the 135° direction) are arranged in this order.

Figure 31:
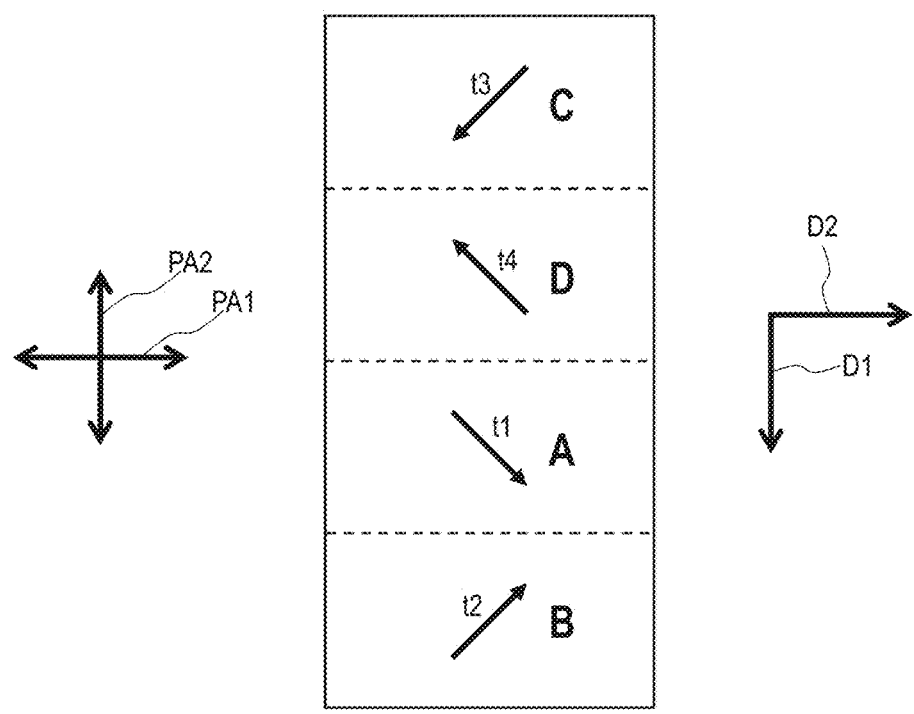
FIG. 31 is a diagram showing another example of an alignment division structure in the pixel P of the liquid crystal display apparatuses 100, 200 and 300.

Instead, an arrangement shown in FIG. 31 may be adopted. In the example shown in FIG. 31, in the pixel P, the liquid crystal domains C, D, A and B are arranged in this order from above to below (i.e., along the pixel longitudinal direction D1). The four liquid crystal domains as counted consecutively from above (i.e., the liquid crystal domains C, D, A and B) may respectively be referred to as the "first liquid crystal domain", the "second liquid crystal domain", the "third liquid crystal domain", and the "fourth liquid crystal domain". Then, between the first liquid crystal domain (liquid crystal domain C) and the second liquid crystal domain (liquid crystal domain D), the azimuth of the director differs by essentially 90°. Between the second liquid crystal domain (liquid crystal domain D) and the third liquid crystal domain (liquid crystal domain A), the azimuth of the director differs by essentially 180°. Between the third liquid crystal domain (liquid crystal domain A) and the fourth liquid crystal domain (liquid crystal domain B), the azimuth of the director differs by essentially 90°.

Figure 32:
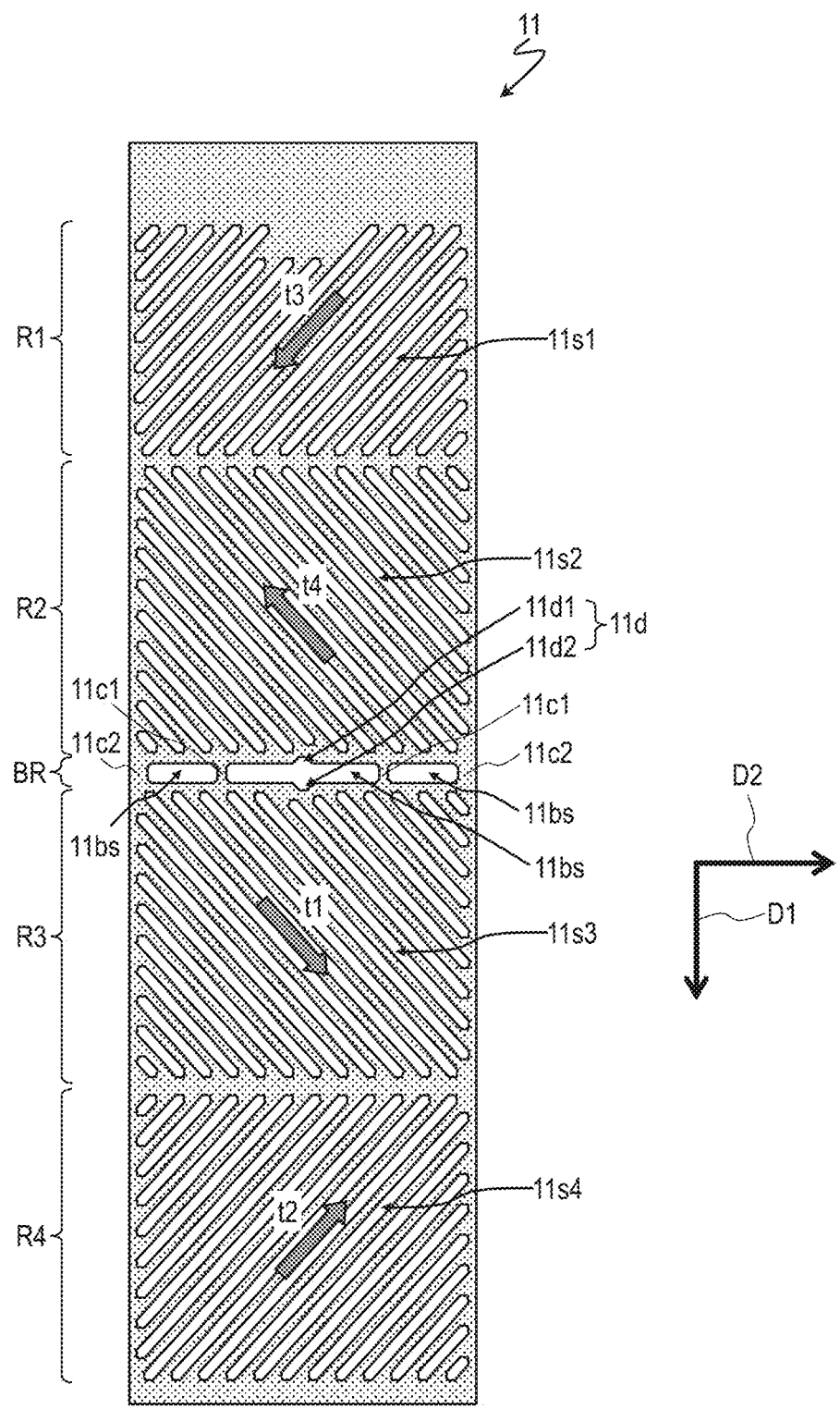
FIG. 32 is a plan view showing an example structure of the pixel electrode 11 in a case where the alignment division structure shown in FIG. 31 is adopted.

When an arrangement as in the example shown in FIG. 31 is adopted, the structure shown in FIG. 32 may be adopted as the structure of the pixel electrode 11, for example. The pixel electrode 11 shown in FIG. 32 includes; a first slitted region R1, which is a region corresponding to the liquid crystal domain C (first liquid crystal domain); a second slitted region R2, which is a region corresponding to the liquid crystal domain D (second liquid crystal domain); a third slitted region R3, which is a region corresponding to the liquid crystal domain A (third liquid crystal domain); and a fourth slitted region R4, which is a region corresponding to the liquid crystal domain B (fourth liquid crystal domain).

In the first slitted region R1, a plurality of first slits 11*s*1 extending essentially in parallel to the tilt direction (director t3) of the liquid crystal domain C are formed. In the second slitted region R2, a plurality of second slits 11*s*2 extending essentially in parallel to the tilt direction (director t4) of the liquid crystal domain D are formed. In the third slitted region R3, a plurality of third slits 11*s*3 extending essentially in parallel to the tilt direction (t1) of the liquid crystal domain A are formed. In the fourth slitted region R4, a plurality of fourth slits 11*s*4 extending essentially in parallel to the tilt direction (director t2) of the liquid crystal domain B are formed.

Figure 33:
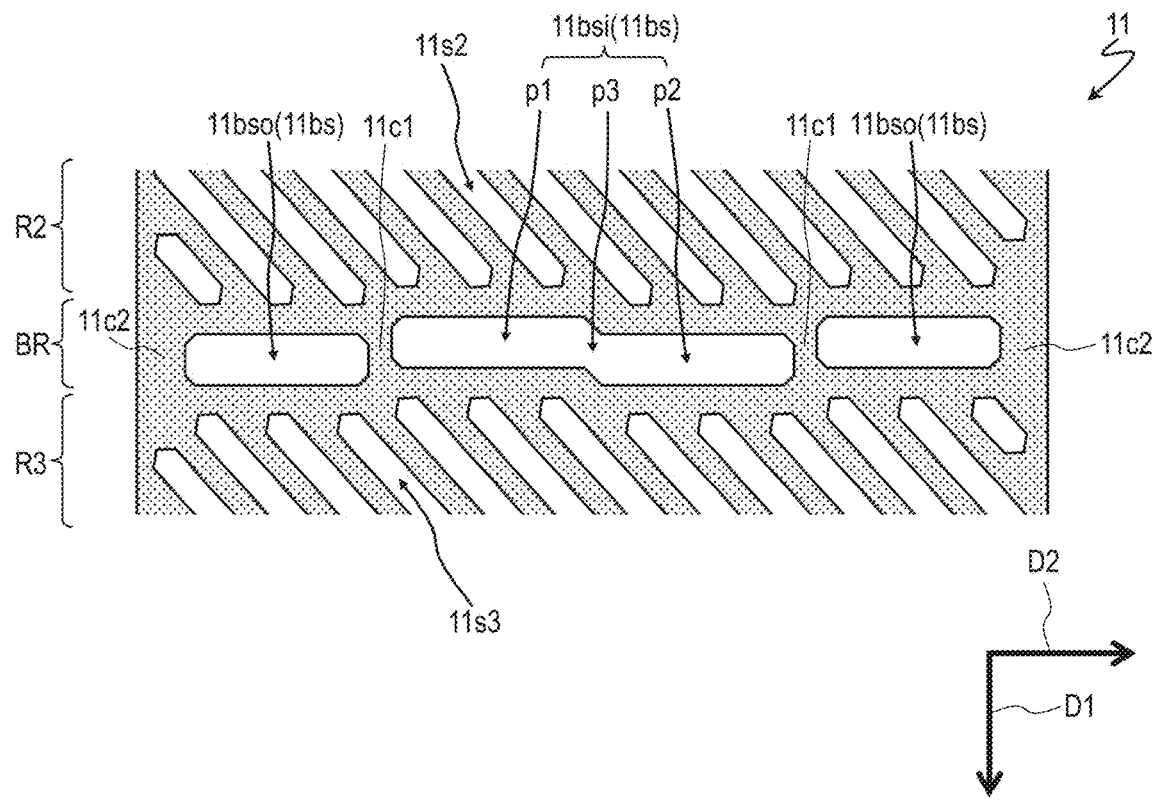
FIG. 33 is a plan view showing an example structure of the boundary region BR of the pixel electrode 11 in a case where the alignment division structure shown in FIG. 31 is adopted.
Figure 34:
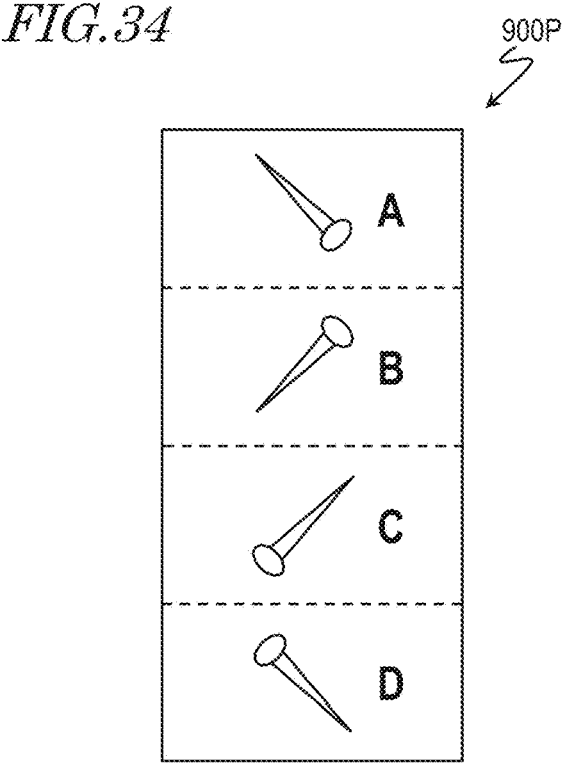
FIG. 34 is a diagram showing a domain arrangement of a pixel 900P disclosed in Patent Document 2.

The boundary region BR of the pixel electrode 11 shown in FIG. 32 is identical in structure to the boundary region BR of the pixel electrode 11 shown in FIG. 5. Also when the domain arrangement shown in FIG. 31 is adopted, because the boundary region BR of the pixel electrode 11 has the aforementioned structure, similar effects to those obtained with the domain arrangement shown in FIG. 2 can be achieved. It will be appreciated that the boundary region BR of the pixel electrode 11 shown in FIG. 32 may be identical in structure to the boundary region BR shown in FIG. 14A, FIG. 16A, FIG. 19, FIG. 23, or FIG. 28A. When adopting the same structure as that of the boundary region BR shown in FIG. 23, as shown in FIG. 33, the position of the second portion p2 of the inner boundary slit 11*bsi* along the pixel longitudinal direction D1 is preferably offset in the 270° direction (i.e., downward in the figure) from the first portion p1. In a case where the azimuth of the director t4 of the second liquid crystal domain (liquid crystal domain D) is essentially the 135° direction and the azimuth of the director t1 of the third liquid crystal domain (liquid crystal domain A) is essentially the 315° direction, because of the position of the second portion p2 along the pixel longitudinal direction D1 being offset in the 270° direction from the first portion p1, the offset portion P3 suitably functions as an alignment stabilizing pattern. The same is also true of the case of adopting the same structure as that of the boundary region BR shown in FIG. 28A.

A liquid crystal display apparatus according to an embodiment of the present invention is suitably used for applications requiring high quality display, such as a television set. Embodiments of the present invention are particularly suitably used in liquid crystal display apparatuses having a relatively large pixel size.

This application is based on Japanese Patent Application No. 2023-69061 filed on Apr. 20, 2023, the entire contents of which are hereby incorporated by reference.

What is claimed is:

1. A liquid crystal display apparatus comprising:
   a first substrate and a second substrate positioned opposite each other; and
   a liquid crystal layer of a vertical alignment type interposed between the first substrate and the second substrate, wherein:
   the liquid crystal display apparatus has a plurality of pixels,
   the first substrate includes a pixel electrode provided in each of the plurality of pixels, and a first alignment film is provided between the pixel electrode and the liquid crystal layer,
   the second substrate includes a counter electrode opposite the pixel electrode, and a second alignment film provided between the counter electrode and the liquid crystal layer,
   each of the plurality of pixels includes a first liquid crystal domain, a second liquid crystal domain, a third liquid crystal domain, and a fourth liquid crystal domain, each of the first to fourth liquid crystal domains having a reference alignment direction defined by the first alignment film and the second alignment film, and the first to fourth liquid crystal domains having respectively different reference alignment directions,
   a longitudinal direction and a transverse direction of each of the plurality of pixels respectively define a pixel longitudinal direction and a pixel transverse direction of that pixel, and the reference alignment directions of the first liquid crystal domain, the second liquid crystal domain, the third liquid crystal domain, and the fourth liquid crystal domain respectively define a first direction, a second direction, a third direction, and a fourth direction,
   the first direction, the second direction, the third direction, and the fourth direction, each makes an angle, which is essentially equal to an odd multiple of 45°, with respect to the pixel transverse direction of each pixel,
   the first liquid crystal domain, the second liquid crystal domain, the third liquid crystal domain, and the fourth liquid crystal domain are arranged in this order along the pixel longitudinal direction of the pixel,
   the second direction and the third direction are respectively essentially the 135° direction and essentially the 315° direction, or are respectively essentially the 45° direction and essentially the 225° direction, wherein an azimuth angle of the pixel transverse direction is defined as 0°;
   the pixel electrode includes:
     a first slitted region which is a region corresponding to the first liquid crystal domain, and in which a plurality of first slits extending essentially in parallel to the first direction is formed,
     a second slitted region which is a region corresponding to the second liquid crystal domain, and in which a plurality of second slits extending essentially in parallel to the second direction is formed,
     a third slitted region which is a region corresponding to the third liquid crystal domain, and in which a plurality of third slits extending essentially in parallel to the third direction is formed,
     a fourth slitted region which is a region corresponding to the fourth liquid crystal domain, and in which a plurality of fourth slits extending essentially in parallel to the fourth direction is formed, and
     a boundary region located between the second slitted region and the third slitted region, and
   the boundary region includes:
     n boundary slits, where n is an integer equal to or greater than 3, each boundary slit extending essentially in parallel to the pixel transverse direction, the n boundary slits being arranged along the pixel transverse direction,
     (n-1) first bridging portions each being located between two adjacent boundary slits among the n boundary slits, the (n-1) first bridging portions interconnecting the second slitted region and the third slitted region, and
     (n-2) dent patterns each being located between two adjacent first bridging portions, among the (n-1) first bridging portions, and each including a first dent formed so as to be dented into the second slitted region from a boundary slit that is located between the two first bridging portions, and a second dent formed so as to be dented into the third slitted region from the boundary slit that is located between the two first bridging portions.

2. The liquid crystal display apparatus of claim 1, wherein a distance from each of the (n-2) dent patterns to each of two first bridging portions that are adjacent to the dent pattern is not less than 10 μm and not more than 30 μm.

3. The liquid crystal display apparatus of claim 1, wherein a width of each of the (n-1) first bridging portions along the pixel transverse direction is not less than 2.5 μm and not more than 3.5 μm.

4. The liquid crystal display apparatus of claim 1, wherein a length of each of the first dent and the second dent, along the pixel longitudinal direction, is 1.5 μm or more.

5. The liquid crystal display apparatus of claim 1, wherein the boundary region further includes two second bridging portions being located at opposite ends of the pixel electrode, along the pixel transverse direction, and interconnects the second slitted region and the third slitted region.

6. The liquid crystal display apparatus of claim 5, wherein a width of each of the two second bridging portions, along the pixel transverse direction, is 6.0 µm or more.

7. The liquid crystal display apparatus of claim 1, wherein each of the first alignment film and the second alignment film is a photo-alignment film.

8. The liquid crystal display apparatus of claim 1, wherein, in each of the first liquid crystal domain, the second liquid crystal domain, the third liquid crystal domain, and the fourth liquid crystal domain, a pretilt direction that is defined by the first alignment film and a pretilt direction that is defined by the second alignment film are essentially antiparallel.

9. A liquid crystal display apparatus comprising:
a first substrate and a second substrate positioned opposite each other; and
a liquid crystal layer of a vertical alignment type interposed between the first substrate and the second substrate, wherein:
the liquid crystal display apparatus has a plurality of pixels,
the first substrate includes a pixel electrode provided in each of the plurality of pixels, and a first alignment film is provided between the pixel electrode and the liquid crystal layer,
the second substrate includes a counter electrode opposite the pixel electrode, and a second alignment film provided between the counter electrode and the liquid crystal layer,
each of the plurality of pixels includes a first liquid crystal domain, a second liquid crystal domain, a third liquid crystal domain, and a fourth liquid crystal domain, each of the first to fourth liquid crystal domains having a reference alignment direction defined by the first alignment film and the second alignment film, and the first to fourth liquid crystal domains having respectively different reference alignment directions,
a longitudinal direction and a transverse direction of each of the plurality of pixels respectively define a pixel longitudinal direction and a pixel transverse direction of that pixel, and the reference alignment directions of the first liquid crystal domain, the second liquid crystal domain, the third liquid crystal domain, and the fourth liquid crystal domain respectively define a first direction, a second direction, a third direction, and a fourth direction,
the first direction, the second direction, the third direction, and the fourth direction, each makes an angle, which is essentially equal to an odd multiple of 45°, with respect to the pixel transverse direction of each pixel,
the first liquid crystal domain, the second liquid crystal domain, the third liquid crystal domain, and the fourth liquid crystal domain are arranged in this order along the pixel longitudinal direction of the pixel,
the second direction and the third direction are respectively essentially the 135° direction and essentially the 315° direction, or are respectively essentially the 45° direction and essentially the 225° direction, wherein an azimuth angle of the pixel transverse direction is defined as 0°,
the pixel electrode includes:
a first slitted region which is a region corresponding to the first liquid crystal domain, and in which a plurality of first slits extending essentially in parallel to the first direction is formed,
a second slitted region which is a region corresponding to the second liquid crystal domain, and in which a plurality of second slits extending essentially in parallel to the second direction is formed,
a third slitted region which is a region corresponding to the third liquid crystal domain, and in which a plurality of third slits extending essentially in parallel to the third direction is formed,
a fourth slitted region which is a region corresponding to the fourth liquid crystal domain, and in which a plurality of fourth slits extending essentially in parallel to the fourth direction is formed, and
a boundary region located between the second slitted region and the third slitted region, and
the boundary region includes:
n boundary slits, where n is an integer equal to or greater than 3, each boundary slit extending essentially in parallel to the pixel transverse direction, the n boundary slits being arranged along the pixel transverse direction,
(n-1) first bridging portions each being located between two adjacent boundary slits among the n boundary slits, the (n-1) first bridging portions interconnecting the second slitted region and the third slitted region, and
a boundary slit that is located between two adjacent first bridging portions among the n boundary slits includes a first portion extending essentially in parallel to the pixel transverse direction, a second portion extending essentially in parallel to the pixel transverse direction and being offset in position from the first portion along the pixel longitudinal direction, and a connecting portion connecting the first portion and the second portion.

10. The liquid crystal display apparatus of claim 9, wherein:
the second direction and the third direction are essentially the 45° direction and essentially the 225° direction, respectively,
the second portion adjoins the first portion in essentially the 0° direction, and
along the pixel longitudinal direction, the second portion is offset in position in the 90° direction from the first portion.

11. The liquid crystal display apparatus of claim 9, wherein:
the second direction and the third direction are essentially the 135° direction and essentially the 315° direction, respectively,
the second portion adjoins the first portion in essentially the 0° direction, and
along the pixel longitudinal direction, the second portion is offset in position in the 270° direction from the first portion.

12. The liquid crystal display apparatus of claim 9, wherein an amount of offset in position between the first portion and the second portion, along the pixel longitudinal direction, is 1.5 µm or more.

13. The liquid crystal display apparatus of claim 9, wherein the boundary region further includes two second bridging portions being located at opposite ends of the pixel electrode, along the pixel transverse direction, and interconnecting the second slitted region and the third slitted region.

14. The liquid crystal display apparatus of claim 13, wherein a width of each of the two second bridging portions, along the pixel transverse direction, is 6.0 µm or more.

15. A liquid crystal display apparatus comprising:
a first substrate and a second substrate positioned opposite each other; and
a liquid crystal layer of a vertical alignment type interposed between the first substrate and the second substrate, wherein:
the liquid crystal display apparatus has a plurality of pixels,
the first substrate includes a pixel electrode provided in each of the plurality of pixels, and a first alignment film provided between the pixel electrode and the liquid crystal layer,
the second substrate includes a counter electrode opposite the pixel electrode, and a second alignment film provided between the counter electrode and the liquid crystal layer,
each of the plurality of pixels includes a first liquid crystal domain, a second liquid crystal domain, a third liquid crystal domain, and a fourth liquid crystal domain, each of the first to fourth liquid crystal domains having a reference alignment direction defined by the first alignment film and the second alignment film, and the first to fourth liquid crystal domains having respectively different reference alignment directions,
a longitudinal direction and a transverse direction of each of the plurality of pixels respectively define a pixel longitudinal direction and a pixel transverse direction of that pixel, and the reference alignment directions of the first liquid crystal domain, the second liquid crystal domain, the third liquid crystal domain, and the fourth liquid crystal domain respectively define a first direction, a second direction, a third direction, and a fourth direction,
the first direction, the second direction, the third direction, and the fourth direction, each makes an angle, which is essentially equal to an odd multiple of 45°, with respect to the pixel transverse direction of each pixel,
the first liquid crystal domain, the second liquid crystal domain, the third liquid crystal domain, and the fourth liquid crystal domain are arranged in this order along the pixel longitudinal direction of the pixel,
the second direction and the third direction are respectively essentially the 135° direction and essentially the 315° direction, or are respectively essentially the 45° direction and essentially the 225° direction, wherein an azimuth angle of the pixel transverse direction is defined as 0°,
the pixel electrode includes:
  a first slitted region which is a region corresponding to the first liquid crystal domain, and in which a plurality of first slits extending essentially in parallel to the first direction is formed,
  a second slitted region which is a region corresponding to the second liquid crystal domain, and in which a plurality of second slits extending essentially in parallel to the second direction is formed,
  a third slitted region which is a region corresponding to the third liquid crystal domain, and in which a plurality of third slits extending essentially in parallel to the third direction is formed,
  a fourth slitted region which is a region corresponding to the fourth liquid crystal domain, and in which a plurality of fourth slits extending essentially in parallel to the fourth direction is formed, and
  a boundary region located between the second slitted region and the third slitted region, the boundary region includes:
  n boundary slits, where n is an integer equal to or greater than 3, each boundary slit extending essentially in parallel to the pixel transverse direction, the n boundary slits being arranged along the pixel transverse direction, and
  (n-1) first bridging portions each being located between two adjacent boundary slits among the n boundary slits, the (n-1) first bridging portions interconnecting the second slitted region and the third slitted region,
a boundary slit that is located between two adjacent first bridging portions among the n boundary slits includes a first portion extending essentially in parallel to the pixel transverse direction, and a second portion extending essentially in parallel to the pixel transverse direction and being offset in position from the first portion along the pixel longitudinal direction, and
a length of each of the first portion and the second portion along the pixel transverse direction is more than or equal to 10 μm and less than or equal to 30 μm.

16. A liquid crystal display apparatus comprising:
a first substrate and a second substrate positioned opposite each other; and
a liquid crystal layer of a vertical alignment type interposed between the first substrate and the second substrate, wherein:
the liquid crystal display apparatus has a plurality of pixels,
the first substrate includes a pixel electrode provided in each of the plurality of pixels, and a first alignment film provided between the pixel electrode and the liquid crystal layer,
the second substrate includes a counter electrode opposite the pixel electrode, and a second alignment film provided between the counter electrode and the liquid crystal layer,
each of the plurality of pixels includes a first liquid crystal domain, a second liquid crystal domain, a third liquid crystal domain, and a fourth liquid crystal domain, each of the first to fourth liquid crystal domains having a reference alignment direction defined by the first alignment film and the second alignment film, and the first to fourth liquid crystal domains having respectively different reference alignment directions,
a longitudinal direction and a transverse direction of each of the plurality of pixels respectively define a pixel longitudinal direction and a pixel transverse direction of that pixel, and the reference alignment directions of the first liquid crystal domain, the second liquid crystal domain, the third liquid crystal domain, and the fourth liquid crystal domain respectively define a first direction, a second direction, a third direction, and a fourth direction,
the first direction, the second direction, the third direction, and the fourth direction, each makes an angle, which is essentially equal to an odd multiple of 45°, with respect to the pixel transverse direction of each pixel,
the first liquid crystal domain, the second liquid crystal domain, the third liquid crystal domain, and the fourth liquid crystal domain are arranged in this order along the pixel longitudinal direction of the pixel,
the second direction and the third direction are respectively essentially the 135° direction and essentially the 315° direction, or are respectively essentially the 45° direction and essentially the 225° direction, wherein an azimuth angle of the pixel transverse direction is defined as 0°, the pixel electrode includes:
- a first slitted region which is a region corresponding to the first liquid crystal domain, and in which a plurality of first slits extending essentially in parallel to the first direction is formed,
- a second slitted region which is a region corresponding to the second liquid crystal domain, and in which a plurality of second slits extending essentially in parallel to the second direction is formed,
- a third slitted region which is a region corresponding to the third liquid crystal domain, and in which a plurality of third slits extending essentially in parallel to the third direction is formed,
- a fourth slitted region which is a region corresponding to the fourth liquid crystal domain, and in which a plurality of fourth slits extending essentially in parallel to the fourth direction is formed, and
- a boundary region located between the second slitted region and the third slitted region, the boundary region includes:
- n boundary slits, where n is an integer equal to or greater than 3, each boundary slit extending essentially in parallel to the pixel transverse direction, the n boundary slits being arranged along the pixel transverse direction, and
- (n-1) first bridging portions each being located between two adjacent boundary slits among the n boundary slits, the (n-1) first bridging portions interconnecting the second slitted region and the third slitted region,
- a boundary slit that is located between two adjacent first bridging portions among the n boundary slits includes a first portion extending essentially in parallel to the pixel transverse direction, and a second portion extending essentially in parallel to the pixel transverse direction and being offset in position from the first portion along the pixel longitudinal direction, and
- a width of each of the (n-1) first bridging portions along the pixel transverse direction is more than or equal to 2.5 μm and less than or equal to 3.5 μm.

\* \* \* \* \*